(12) United States Patent
Malik et al.

(10) Patent No.: US 11,386,096 B2
(45) Date of Patent: Jul. 12, 2022

(54) ENTITY FINGERPRINTS

(71) Applicant: REFINITIV US ORGANIZATION LLC, New York, NY (US)

(72) Inventors: Hassan Malik, Monmouth Junction, NJ (US); Mans Olof-Ors, Lucerne (CH); Ian MacGillivray, Astoria, NY (US); Christy Hatch, Thalwil (CH)

(73) Assignee: REFINITIV US ORGANIZATION LLC, New York, NY (US)

( * ) Notice: Subject to any disclaimer, the term of this patent is extended or adjusted under 35 U.S.C. 154(b) by 548 days.

(21) Appl. No.: 16/357,314

(22) Filed: Mar. 18, 2019

(65) Prior Publication Data

US 2019/0278777 A1    Sep. 12, 2019

Related U.S. Application Data

(63) Continuation-in-part of application No. 15/609,800, filed on May 31, 2017, now Pat. No. 10,303,999, (Continued)

(51) Int. Cl.
*G06F 16/21* (2019.01)
*G06F 16/901* (2019.01)
(Continued)

(52) U.S. Cl.
CPC ...... *G06F 16/24578* (2019.01); *G06F 16/211* (2019.01); *G06F 16/367* (2019.01); (Continued)

(58) Field of Classification Search
CPC ............... G06F 16/288; G06F 16/338; G06F 16/24578; G06F 16/951; G06F 3/0482; (Continued)

(56) References Cited

U.S. PATENT DOCUMENTS

| 2017/0011092 A1* | 1/2017 | Huddleston | ......... G06F 16/2455 |
| 2017/0351752 A1* | 12/2017 | Meehan | ............... G06F 16/2379 |
| 2018/0373959 A1* | 12/2018 | Rhoads | ............... G06F 16/5866 |

* cited by examiner

*Primary Examiner* — Marcin R Filipczyk
(74) *Attorney, Agent, or Firm* — Ducan Galloway Greenwald PLLC; Kevin T. Duncan

(57) ABSTRACT

Systems and techniques for exploring relationships among entities are disclosed. The systems and techniques provide an entity-based information analysis and content aggregation platform that uses heterogeneous data sources to construct and maintain an ecosystem around tangible and logical entities. Entities are represented as vertices in a directed graph, and edges are generated using entity co-occurrences in unstructured documents and supervised information from structured data sources. Significance scores for the edges are computed using a method that combines supervised, unsupervised and temporal factors into a single score. Important entity attributes from the structured content and the entity neighborhood in the graph are automatically summarized as the entity fingerprint. Entities may be compared to one another based on similarity of their entity fingerprints. An interactive user interface is also disclosed that provides exploratory access to the graph and supports decision support processes.

19 Claims, 34 Drawing Sheets

Related U.S. Application Data which is a continuation-in-part of application No. 15/351,256, filed on Nov. 14, 2016, now Pat. No. 10,650,049, and a continuation-in-part of application No. 15/077,713, filed on Mar. 22, 2016, now Pat. No. 10,235,425, which is a continuation of application No. 14/834,317, filed on Aug. 24, 2015, now abandoned, which is a continuation of application No. 13/213,324, filed on Aug. 19, 2011, now Pat. No. 9,292,545, which is a continuation-in-part of application No. 13/107,665, filed on May 13, 2011, now Pat. No. 9,495,635.

(60) Provisional application No. 61/519,592, filed on May 25, 2011, provisional application No. 61/486,098, filed on May 13, 2011, provisional application No. 61/445,236, filed on Feb. 22, 2011.

(51) Int. Cl.
*G06F 16/2457* (2019.01)
*G06F 16/9535* (2019.01)
*G06F 16/36* (2019.01)
*G06F 40/30* (2020.01)

(52) U.S. Cl.
CPC ...... *G06F 16/9024* (2019.01); *G06F 16/9535* (2019.01); *G06F 40/30* (2020.01)

(58) Field of Classification Search
CPC ............... G06F 16/583; G06F 16/5838; G06F 16/5866; G06F 16/211; G06F 16/367; G06F 16/9024; G06F 16/9535; G06F 40/30
See application file for complete search history.

| Similar Fingerprints: | Common Attributes: | Common Connections: | Uncommon Connections: | Emerging Connection: | Charts: |
|---|---|---|---|---|---|
| Windrunner Inc<br>Html5; event; isonp; plugin; ygl; form; literary; slideshow; greghinch; dayclass, encf | 65%; | 89%; | 15 | 5 items | Chart 1 |
| Sun Systems<br>lsfl; node; candy' lsmith; tlyac; rgrove; alloyui | 65%; | 89%; | 15 | 5 items | Chart 2 |
| Golden Panels<br>Html5; event; isonp; plugin; ygl; form; literary; slideshow; greghinch; dayclass, encf | 65% | 89% | 15 | 5 items | Chart 3 |

Matrix Frame – listing of entities having similar fingerprints to that of entity specified in query frame

Fig. 7

| Similar Fingerprints: | Common Attributes | Common Connections: | Uncommon Connections: | Emerging Connection: | Charts: |
|---|---|---|---|---|---|
| Windrunner Inc | 65%; | 89%; | 15 | 5 items | Chart 1 |
| Html5; event; isonp; plugin; ygl; form; literary; slideshow; greghinch; dayclass, ericf; | Att1<br>Att2<br>Att3<br>Att4<br>.<br>.<br>AttN | Conn1<br>Conn2<br>Conn3<br>Conn4<br>.<br>.<br>ConnN | Conn1<br>Conn2<br>Conn3<br>Conn4<br>.<br>.<br>ConnN | Conn1<br>Conn2<br>Conn3<br>Conn4<br>.<br>.<br>ConnN | Emerging item \| date<br>Headline<br>Emerging item \| date<br>Headline<br>Emerging item \| date<br>Headline<br>Emerging item \| date<br>Headline |
| Html5; event; isonp; plugin; ygl; form; literary; slideshow; greghinch; dayclass, ericf | | | | | |

Fig. 8

HEADLINES

Taxes, inflation data to dominate week; SAIC to take GM strake if China approves: source; Ireland does not rule out rescue, no talks as yet; Greenspan: High deficits could spark bond crisis; Canada to unveil investment guidelines post: Potash; Canada to unveil investment guidelines post: Potash; IMF says Ireland's economy stabilizing; Canada to unveil investment guidelines post: Potash; IMF says Ireland's economy stabilizing; Canada to unveil investment guidelines post: Potash; IMF says Ireland's economy stabilizing; Canada to unveil investment guidelines pot: Potash; IMF says Ireland's economy stabilizing; Canada to unveil investment guidelines pot: Potash; IMF says Ireland's economy stabilizing; Canada to unveil investment guidelines pot: Potash; IMF says Ireland's economy stabilizing; Canada to unveil investment guidelines pot: Potash; IMF says Ireland's economy stabilizing; Canada to unveil investment guidelines pot: Potash; IMF says Ireland's economy stabilizing; Canada to unveil investment guidelines pot: Potash;

Fig. 10

| # | Measure | Formula |
|---|---------|---------|
| 1 | $\phi$-coefficient | $\dfrac{P(A,B) - P(A)P(B)}{\sqrt{P(A)P(B)(1-P(A))(1-P(B))}}$ |
| 2 | Goodman-Kruskal's ($\lambda$) | $\dfrac{\sum_j \max_k P(A_j, B_k) + \sum_k \max_j P(A_j, B_k) - \max_j P(A_j) - \max_k P(B_k)}{2 - \max_j P(A_j) - \max_k P(B_k)}$ |
| 3 | Odds ratio ($\alpha$) | $\dfrac{P(A,B)P(\overline{A},\overline{B})}{P(A,\overline{B})P(\overline{A},B)}$ |
| 4 | Yule's $Q$ | $\dfrac{P(A,B)P(\overline{A}\overline{B}) - P(A,\overline{B})P(\overline{A},B)}{P(A,B)P(\overline{A}\overline{B}) + P(A,\overline{B})P(\overline{A},B)} = \dfrac{\alpha - 1}{\alpha + 1}$ |
| 5 | Yule's $Y$ | $\dfrac{\sqrt{P(A,B)P(\overline{A}\overline{B})} - \sqrt{P(A,\overline{B})P(\overline{A},B)}}{\sqrt{P(A,B)P(\overline{A}\overline{B})} + \sqrt{P(A,\overline{B})P(\overline{A},B)}} = \dfrac{\sqrt{\alpha} - 1}{\sqrt{\alpha} + 1}$ |
| 6 | Kappa ($\kappa$) | $\dfrac{P(A,B) + P(\overline{A},\overline{B}) - P(A)P(B) - P(\overline{A})P(\overline{B})}{1 - P(A)P(B) - P(\overline{A})P(\overline{B})}$ |
| 7 | Mutual Information ($M$) | $\dfrac{\sum_i \sum_j P(A_i, B_j) \log \dfrac{P(A_i, B_j)}{P(A_i)P(B_j)}}{\min(-\sum_i P(A_i) \log P(A_i), -\sum_j P(B_j) \log P(B_j))}$ |
| 8 | J-Measure ($J$) | $\max\left( P(A,B) \log(\dfrac{P(B\|A)}{P(B)}) + P(A\overline{B}) \log(\dfrac{P(\overline{B}\|A)}{P(\overline{B})}), \right.$ $\left. P(A,B) \log(\dfrac{P(A\|B)}{P(A)}) + P(\overline{A}B) \log(\dfrac{P(\overline{A}\|B)}{P(\overline{A})}) \right)$ |
| 9 | Gini index ($G$) | $\max\left( P(A)[P(B\|A)^2 + P(\overline{B}\|A)^2] + P(\overline{A})[P(B\|\overline{A})^2 + P(\overline{B}\|\overline{A})^2] \right.$ $-P(B)^2 - P(\overline{B})^2,$ $P(B)[P(A\|B)^2 + P(\overline{A}\|B)^2] + P(\overline{B})[P(A\|\overline{B})^2 - P(\overline{A}\|\overline{B})^2]$ $\left. -P(A)^2 - P(\overline{A})^2 \right)$ |
| 10 | Support ($s$) | $P(A,B)$ |
| 11 | Confidence ($c$) | $\max(P(B\|A), P(A\|B))$ |
| 12 | Laplace ($L$) | $\max\left( \dfrac{NP(A,B)+1}{NP(A)+2}, \dfrac{NP(A,B)+1}{NP(B)+2} \right)$ |
| 13 | Conviction ($V$) | $\max\left( \dfrac{P(A)P(\overline{B})}{P(A\overline{B})}, \dfrac{P(B)P(\overline{A})}{P(B\overline{A})} \right)$ |
| 14 | Interest ($I$) | $\dfrac{P(A,B)}{P(A)P(B)}$ |
| 15 | cosine ($IS$) | $\dfrac{P(A,B)}{\sqrt{P(A)P(B)}}$ |
| 16 | Piatetsky-Shapiro's ($PS$) | $P(A,B) - P(A)P(B)$ |
| 17 | Certainty factor ($F$) | $\max\left( \dfrac{P(B\|A)-P(B)}{1-P(B)}, \dfrac{P(A\|B)-P(A)}{1-P(A)} \right)$ |
| 18 | Added Value ($AV$) | $\max(P(B\|A) - P(B), P(A\|B) - P(A))$ |
| 19 | Collective strength ($S$) | $\dfrac{P(A,B) + P(\overline{AB})}{P(A)P(B) + P(\overline{A})P(\overline{B})} \times \dfrac{1 - P(A)P(B) - P(\overline{A})P(\overline{B})}{1 - P(A,B) - P(\overline{AB})}$ |
| 20 | Jaccard ($\zeta$) | $\dfrac{P(A,B)}{P(A) + P(B) - P(A,B)}$ |
| 21 | Klosgen ($K$) | $\sqrt{P(A,B)} \max(P(B\|A) - P(B), P(A\|B) - P(A))$ |

Fig. 17

ENTITY FINGERPRINTS

CROSS-REFERENCE TO RELATED APPLICATION

This application is a continuation-in-part of and claims benefit of priority to U.S. patent application Ser. No. 15/077,713, filed Mar. 22, 2016, entitled 'Entity Fingerprints', which claims benefit of priority to U.S. patent application Ser. No. 14/834,317, filed Aug. 24, 2015, entitled 'Entity Fingerprints', and to U.S. patent application Ser. No. 13/213,324, filed Aug. 19, 2011, entitled 'Entity Fingerprints', issued as U.S. Pat. No. 9,292,545 on Mar. 22, 2016, which claims the benefit of priority to U.S. Provisional Application No. 61/445,236 filed Feb. 22, 2011 entitled 'Information Processing and Visualization Methods and Systems', to U.S. Provisional Application No. 61/486,098 filed May 13, 2011 entitled 'Entity-Based Information Analysis', and to U.S. Provisional Application No. 61/519,592 filed May 25, 2011, entitled 'Entity-Based Information Analysis'; the present application is also a continuation-in-part of and claims benefit of priority to U.S. patent application Ser. No. 15/609,800, filed May 31, 2017, entitled 'Machine Learning-Based Relationship Association and Related Discovery and Search Engines', which is a continuation-in-part of and claims benefit of priority U.S. patent application Ser. No. 15/351,256, entitled 'Association Significance', which is a continuation of U.S. patent application Ser. No. 13/107,665, entitled 'Association Significance', now issued as U.S. Pat. No. 9,495,635 on Nov. 15, 2016, which claims priority to U.S. Provisional Application No. 61/445,236 filed Feb. 22, 2011, entitled 'Information Processing and Visualization Methods and Systems', the contents of which are all incorporated herein in their entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2011, Thomson Reuters.

TECHNICAL FIELD

The disclosure relates to natural language processing, information extraction, information retrieval and text mining and more particularly to entity associations and to systems and techniques for identifying and measuring entity relationships and association significance, and more particularly to systems and techniques for computing and analyzing entity fingerprints. The disclosure also relates to discovery and search interfaces to enhance linked data used in generating results for delivery, including graphical representations, in response to user input.

BACKGROUND

Entity-centric models are traditionally built with strong reference to structured content: a database of people's personal details or of geographical information, for example. Representations of these entities are then simply a call-back to the structured content that was used to generate them, and comparisons between entities are simply comparisons of the various attributes in the database.

However, there exists a large amount of other interesting information relating to an entity in unstructured content (such as free-text data; for example a news story, a blog, or a press release) where that entity is mentioned. Further, information regarding the entities most closely related to a given entity can also be seen as an interesting property of that given entity.

As an example, consider Egypt—a country whose landmass, GBP, head of state, prime imports (in this case, wheat) and other such attributes are well known and available in structured data sets. By perusing free-text documents either published by Egyptian authorities, or documents that mention Egypt, further attributes may be discovered, such as Egypt's recent connection with Arabic states' civil unrest. Further, consider two companies that both depend on the price of wheat, but that are not directly related to one another: their common connection to Egypt creates a dependency between the two companies that may only be inferred through understanding their connections.

Moreover, with computer-implemented word processing and mass data storage, the amount of information generated by mankind has risen dramatically and with an ever-quickening pace. As a result, there is a continuing and growing need to collect and store, identify, track, classify and catalogue, and link for retrieval and distribution this growing sea of information.

Much of the world's information or data is in the form of text, the majority of which is unstructured (without metadata or in that the substance of the content is not asymmetrical and unpredictable, i.e., prose, rather than formatted in predictable data tables). Much of this textual data is available in digital form [either originally created in this form or somehow converted to digital—by means of OCR (optical character recognition), for example] and is stored and available via the Internet or other networks. Unstructured text is difficult to effectively handle in large volumes even when using state of the art processing capabilities. Content is outstripping the processing power needed to effectively manage and assimilate information from a variety of sources for refinement and delivery to users. Although advances have made it possible to investigate, retrieve, extract and categorize information contained in vast repositories of documents, files, or other text "containers," systems are needed to more efficiently manage and classify the ever-growing volume of data generated daily and to more effectively deliver such information to consumers.

This proliferation of text-based information in electronic form has resulted in a growing need for tools that facilitate organization of the information and allow users to query systems for desired information. One such tool is information extraction software that, typically, analyzes electronic documents written in a natural language and populates a database with information extracted from such documents. Applied against a given textual document, the process of information extraction (IE) is used to identify entities of predefined types appearing within the text and then to list them (e.g., people, companies, geographical locations, currencies, units of time, etc.). IE may also be applied to extract other words or terms or strings of words or phrases.

Knowledge workers, such as scientists, lawyers, traders or accountants, have to deal with a greater than ever amount of data with an increased level of variety. Their information needs are often focused on entities and their relations, rather than on documents. To satisfy these needs, information providers must pull information from wherever it happens to be stored and bring it together in a summary result. As a concrete example, suppose a user is interested in companies with the highest operating profit in 2015 currently involved in Intellectual Property (IP) lawsuits. In order to answer this query, one needs to extract company entities from free text documents, such as financial reports and court documents, and then integrate the information extracted from different documents about the same company together.

Content and enhanced experience providers, such as Thomson Reuters Corporation, identify, collect, analyze and process key data for use in generating content, such as news articles and reports, financial reports, scientific reports and studies, law related reports, articles, etc., for consumption by professionals and others. The delivery of such content and services may be tailored to meet the particular interests of certain professions or industries, e.g., wealth managers and advisors, fund managers, financial planners, investors, scientists, lawyers, etc. Professional services companies, like Thomson Reuters, continually develop products and services for use by subscribers, clients and other customers and with such developments distinguish their products and services over those offered by their competition.

Companies, such as Thomson Reuters—with many businesses involved in delivery of content and research tools to aid a wide variety of research and professional service providers—generate, collect and store a vast spectrum of documents, including news, from all over the world. These companies provide users with electronic access to a system of databases and research tools. Professional services providers also provide enhanced services through various techniques to augment content of documents and to streamline searching and more efficiently deliver content of interest to users. For example, Thomson Reuters structures documents by tagging them with metadata for use in internal processes and for delivery to users.

"Term" refers to single words or strings of highly-related or linked words or noun phrases. "Term extraction" (also term recognition or term mining) is a type of IE process used to identify or find and extract relevant terms from a given document, and therefore have some relevance, to the content of the document. Such activities are often referred to as "Named Entity Extraction" and "Named Entity Recognition" and "Named Entity Mining" and in connection with additional processes, e.g., Calais "Named Entity Tagging" (or more generally special noun phrase tagger) and the like. There are differences in how these activities are performed. For example, term recognition might only require setting a flag when a certain expression is identified in a text span, while term extraction would be identifying it and its boundaries and writing it out for storage in, for example, a database, noting exactly where in the text it came from. Techniques employed in term extraction may include linguistic or grammar-based techniques, natural language or pattern recognition, tagging or structuring, data visualizing and predictive formulae. For example, all names of companies mentioned in the text of a document can be identified, extracted and listed. Similarly, events (e.g., Exxon-Valdez oil spill or BP Horizon explosion), sub-events related to events (e.g., cleanup effort associated with Exxon Valdez oil spill or BP Horizon explosion), names of people, products, countries, organizations, geographic locations, etc., are additional examples of "event" or "entity" type terms that are identified and may be included in a list or in database records. This IE process may be referred to as "event or entity extraction" or "event or entity recognition." As implemented, known IE systems may operate in terms of "entity" recognition and extraction wherein "events" are considered a type of entity and are treated as an entity along with individuals, companies, industries, governmental entities, etc.

There are a variety of methods available for automatic event or entity extraction, including linguistic or semantic processors to identify, based on known terms or applied syntax, likely noun phrases. Filtering may be applied to discern true events or entities from unlikely events or entities. The output of the IE process is a list of events or entities of each type and may include pointers to all occurrences or locations of each event and/or entity in the text from which the terms were extracted. The IE process may or may not rank the events/entities, process to determine which events/entities are more "central" or "relevant" to the text or document, compare terms against a collection of documents or "corpus" to further determine relevancy of the term to the document.

Systems and methods for identifying risks, entities, relationships, supply chains, and for generating visualizations related to risks, entities, relationships, and supply chains are described in at least: SYSTEMS, METHODS, AND SOFTWARE FOR ENTITY EXTRACTION AND RESOLUTION COUPLED WITH EVENT AND RELATIONSHIP EXTRACTION, U.S. patent application Ser. No. 12/341,926, filed Dec. 22, 2008, Light et al.; SYSTEMS, METHODS, SOFTWARE AND INTERFACES FOR ENTITY EXTRACTION AND RESOLUTION AND TAGGING, U.S. patent application Ser. No. 12/806,116, filed Aug. 5, 2010, issued as U.S. Pat. No. 9,501,467, on Nov. 11, 2016, Light et al.; FINANCIAL EVENT AND RELATIONSHIP EXTRACTION, U.S. patent application Ser. No. 12/363,524, filed Jan. 30, 2009, Schilder et al.; SYSTEMS, METHODS, AND SOFTWARE FOR ENTITY RELATIONSHIP RESOLUTION, U.S. patent application Ser. No. 12/341,913, filed Dec. 22, 2008, issued as U.S. Pat. No. 9,600,509, on Mar. 1, 2017, Conrad et al.; METHODS AND SYSTEMS FOR MANAGING SUPPLY CHAIN PROCESSES AND INTELLIGENCE, U.S. patent application Ser. No. 13/594,864, filed Aug. 26, 2012, Siig et al.; METHODS AND SYSTEMS FOR GENERATING SUPPLY CHAIN REPRESENTATIONS, U.S. patent application Ser. No. 13/795,022, filed Mar. 12, 2013, Leidner et al.; and RISK IDENTIFICATION AND RISK REGISTER GENERATION SYSTEM AND ENGINE, U.S. patent application Ser. No. 15/181,194, filed Jun. 13, 2016, Leidner et al.; each and all of which are incorporated herein by reference in their entirety.

Thomson Reuters' Text Metadata Services group ("TMS") formerly known as ClearForest prior to acquisition in 2007, is one exemplary IE-based solution provider offering text analytics software used to "tag," or categorize, unstructured information and to extract facts about people, organizations, places or other details from news articles, Web pages and other documents. TMS's Calais is a web service that includes the ability to extract entities such as company, person or industry terms along with some basic facts and events. OpenCalais is an available community tool to foster development around the Calais web service. APIs (Application Programming Interfaces) are provided around an open rule development platform to foster development of extraction modules. Other providers include Autonomy Corp., Nstein and Inxight. Examples of Information Extraction software in addition to OpenCalais include: AlchemyAPI; CRF++; LingPipe; TermExtractor; TermFinder; and TextRunner. IE may be a separate process or a component or part of a larger process or application, such as business intelligence software.

Currently, the dominant technology for providing non-technical users with access to Linked Data is keyword-based search. This is problematic because keywords are often inadequate as a means for expressing user intent. In addition, while a structured query language can provide convenient access to the information needed by advanced analytics, unstructured keyword-based search cannot meet this extremely common need. This makes it harder than necessary for non-technical users to generate analytics.

What is needed is a natural language-based system that utilizes the benefits of structured query language capabilities to allow non-technical users to create well-formed questions.

Today, investment decisions in the financial markets require careful analysis of information available from multiple sources. To meet this challenge, financial institutions typical maintain very large datasets that provide a foundation for this analysis. For example, forecasting stock market, currency exchange rate, bank bankruptcies, understanding and managing financial risk, trading futures, credit rating, loan management, bank customer profiling, and money laundering analyses all require large datasets of information for analysis. The datasets of information can be structured datasets as well as unstructured data sets.

Typically, the datasets of information are used to model one or more different entities, each of which may have a relationship with other entities. For example, a company entity may be impacted by, and thereby have a relationship with, any of the following entities: a commodity or natural resource (e.g., aluminum, corn, crude oil, sugar, etc.), a source of the commodity or natural resource, a currency (e.g., euro, sterling, yen, etc.), and one or more competitor, supplier or customer. Any change in one entity can have an impact on another entity. For example, rising crude oil prices can impact a transportation company's revenues, which can affect the company's valuation. In another example, an acquisition of a supplier by a competitor puts an entity's supply chain at risk, as would political upheaval or natural disaster (e.g., tsunami, earthquake) affecting availability or operations of a supplier.

Given the quantity and nature of these datasets, each modeled entity tends to have multiple relationships with a large number of other entities. As such, it is difficult to identify which entities are more significant than others for a given entity.

Accordingly, there is a need for systems and techniques to automatically analyze all available supply chain related data to identify relationships and assign significance scores to entity relationships.

Event detection and relation extraction is an active field of academic research. State of the art systems employ statistical machine learning models to identify and classify relations between entities mentioned in natural language texts. Recently, deep learning-based systems have been shown to achieve similar quality, requiring less feature engineering. Knowledge base building systems make use of known machine learning models to create or augment knowledge graphs, depicting relations between entities.

What is needed is, a system configured to be applied to the identification of supply chain relationship between companies. Supply chain identification is still based on manual work and on extracting relations from structured data (financial reports, piers records etc.).

Supplier—Customer relations are very valuable to investors, among other interested classes of users, but are oftentimes hard to detect. Some information is available in structured data, but many more indications are available only in unstructured data, such as news stories, company SEC filings, blogs and company and other web sites. A lot of highly informative data is publicly available, but is too voluminous and unfeasible for manual processing to systematically identify supply chain relations.

Accordingly, what is needed is an automated system capable of processing the large volumes of available data to detect indications for supply chain relationship between companies and aggregate these indications across data sources to generate a single confidence score for the relation between such companies.

Accordingly, there exists a need for systems and techniques that address the need to represent entities by the unstructured content surrounding them, and information regarding the entities to which they are connected; and the corollary need to perform meaningful comparison between entities that may have no direct connection.

SUMMARY

Systems and techniques for exploring relationships among entities are disclosed. The systems and techniques provide an entity-based information analysis and content aggregation platform that uses heterogeneous data sources to construct and maintain an ecosystem around tangible and logical entities such as, but not limited to, organizations, people, products, industries, geographies, commodities, financial indicators, economic indicators, events, topics, subject codes, unique identifiers, social tags, industry terms, general terms, metadata elements, classification codes, and combinations thereof.

Entities are represented as vertices in a directed graph, and edges are generated using entity co-occurrences in unstructured documents and supervised information from structured data sources. Significance scores for the edges are computed using a technique that combines supervised, unsupervised and temporal factors into a single score. Important entity attributes from the structured content and the entity neighborhood in the graph are automatically summarized as the entity fingerprint. Entities may be compared to one another based on similarity of their entity fingerprints. An interactive user interface is also disclosed that provides exploratory access to the graph and supports decision support processes.

Various aspects of the invention relate to computing and analyzing entity fingerprints.

For example, according to one aspect, a method of analyzing an entity includes identifying a first entity from a plurality of entities, each of the plurality of entities associated with an entity fingerprint comprising at least one assigned attribute, comparing the entity fingerprint associated with the first entity to each of the entity fingerprints associated with the plurality of entities, and identifying at least one similar entity to the first entity from the plurality of entities based on the fingerprint comparisons. The method also includes generating a signal associated with the at least one identified similar entity and the first entity, and transmitting the signal.

Additionally, over the past few decades the amount of electronic data has grown to massive levels and the desire to search, manipulate, assimilate and otherwise make full use of such data has grown in kind. Such growth will only increase over the foreseeable future with sources of data growing rapidly. Not all data is in the same format or language and some data is structured (including metadata, i.e., data concerning or about the document, subjects of the document, source of data, field descriptors, signature data, etc.) and some data is unstructured, e.g., free text. Given data reaching an unprecedented amount, coming from diverse sources, and covering a variety of domains in heterogeneous formats, information providers are faced with the critical challenge to process, retrieve and present information to their users to satisfy their complex information needs. In one manner of implementation, the present invention is used in a family of services for building and querying an enterprise knowledge graph in order to address this challenge. We first acquire data from various sources via different approaches. Furthermore, we mine useful information from the data by adopting a variety of techniques, including Named Entity Recognition (NER) and Relation Extraction (RE); such mined information is further integrated with existing structured data (e.g., via Entity Linking (EL) techniques) to obtain relatively comprehensive descriptions of the entities. Modeling the data as an RDF graph model enables easy data management and embedding of rich semantics in processed data. Finally, to facilitate the querying of this mined and integrated data, i.e., the knowledge graph, the invention is described with a natural language interface, e.g., Thomson Reuters Discover, that allows users to ask questions of the knowledge graph in their own words; these natural language questions are translated into executable queries for answer retrieval.

The present invention provides a system configured to automatically and systematically access numerous data sources and process large volumes of natural unstructured texts to identify supply chain relations between companies. In addition to Natural Language Processing (NLP) features, as typically used in academic relation extraction works, the present invention includes processes adapted to consider additional information, such as from available knowledge graphs, to enhance accuracy and efficiency. Knowledge graphs are known and offered by several companies with some being public facing and others private or proprietary or available as part of a fee-based service. A knowledge graph comprises semantic-search information from a variety of sources, including public and private sources, and often is used as part of a search engine/platform. A knowledge graph is dynamic in that it is updated, preferably in real time, upon entity/member profile changes and upon identifying and adding new entities/members.

For example, Thomson Reuters includes as part of its service offerings a Knowledge Graph facility that may be used by the present invention in connection with delivery of services, such as via Thomson Reuters Eikon platform. In this manner, the present invention may be used in a system to build supply chain graphs to feed Eikon value chain offering by using proprietary, authority information, e.g., industries and past information about supply chain between a set of companies (either from evidence previously discovered by the system or from manually curated data), to reliably compute a confidence score. The invention may be used to extract supplier-customer relations from news stories, newsroom sources, blogs, company web sites, and company SEC filings, building a knowledge graph and exposing it via Eikon. The invention is used in a system preferably capable of being scaled to handle additional/different document sources and aggregate multiple evidences to one confidence score. A search engine may be used as a vehicle to allow users to enter company names of interest and to yield a set of supply chain related relationship data of interest to the user. Other companies that have knowledge graph facilities include Google, Microsoft Bing Satori, Yahoo!, Baidu, LinkedIn, Yandex Object Answer, and others.

Systems and techniques for determining significance between entities are disclosed. The systems and techniques identify a first entity having a relationship or an association with a second entity, apply a plurality of relationship or association criteria to the relationship/association, weight each of the criteria based on defined weight values, and compute a significance score for the first entity with respect to the second entity based on a sum of a plurality of weighted criteria values. The system identifies text representing or signifying a connection between two or more entities and in particular in the context of a supply chain environment. As used herein the terms "association" and "relationship" include their respective ordinary meanings and as used include the meaning of one within the other. The systems and techniques, including deep learning and machine learning processes, utilize information, including unstructured text data from disparate sources, to create one or more uniquely powerful informational representations including in the form of signals, feed, knowledge graphs, supply chain graphical interfaces and more. The systems and techniques disclosed can be used to identify and quantify the significance of relationships (e.g., associations) among various entities including, but not limited to, organizations, people, products, industries, geographies, commodities, financial indicators, economic indicators, events, topics, subject codes, unique identifiers, social tags, industry terms, general terms, metadata elements, classification codes, and combinations thereof.

The present invention provides a method and system to automatically identify supply chain relationships between companies and/or entities, based on, among other things, unstructured text corpora. The system combines Machine Learning and/or deep learning models to identify sentences mentioning or referencing or representing a supply chain connection between two companies (evidence). The present invention also applies an aggregation layer to take into account the evidence found and assign a confidence score to the relationship between companies. This supply chain relationship information and aggregation data may be used to build and present one or more supply chain graphical representations and/or knowledge graphs.

The invention may use specific Machine Learning features and make use of existing supply chain knowledge and other information in generating and presenting knowledge graphs, e.g., in connection with an enterprise content platform such as Thomson Reuters Eikon. The invention identifies customer-supplier relations, which feeds the Eikon value chain module and allows Eikon users to investigate relations which might affect companies of interest and generate a measure of performance on a risk-adjusted basis "Alpha." The invention may also be used in connection with other technical risk ratios or metrics, including beta, standard deviation, R-squared, and the Sharpe ratio. In this manner, the invention may be used, particularly in the supply chain/distribution risk environment, to provide or enhance statistical measurements used in modern portfolio theory to help investors determine a risk-return profile.

The present invention provides, in one exemplary manner of operation, a Supply Chain Analytics & Risk "SCAR" (aka "Value Chains") engine or application adapted to exploit vast amounts of structured and unstructured data across news, research, filings, transcripts, industry classifications, and economics. The Machine Learning and aggregating features of the present invention may be used to fine-tune existing text analytics technologies (e.g., Thomson Reuters Eikon and DataScope data and analytics platforms) to develop an improved Supply Chain Analytics and Risk offering within such platforms. The present invention utilizes supply chain data to deliver enhanced supply chain relationship feeds and tools to professionals for use in advising clients and making decisions. For example, the invention may be used to deliver information and tools to financial professionals looking for improved insights in their search for investment opportunities and returns, while better understanding risk in their portfolios. Supply chain data can create value for several different types of users and use cases. In one example, the invention enables research analysts on both buy and sell sides to leverage supply chain data to gain insights into revenue risks based on relationships and geographic revenue distribution. Also, the invention provides portfolio managers with a new insightful view of risks and returns of their portfolio by providing "supply chain" driven views of their holdings. In addition, the invention enables quant analysts and Hedge Funds to leverage supply chain data to build predictive analytics on performance of companies based on overall supply chain performance. Traders can use information and tools delivered in connection with the invention to, for example, track market movement of prices by looking at intra-supply arbitrage opportunities (e.g., effect of revenue trends from suppliers through distributors) and second-order impact of breaking news.

In one embodiment, identifying the first entity comprises receiving a unique identifier associated with the first entity. The at least one assigned attribute associated with each entity fingerprint is based on a relevancy of the assigned attribute to the associated entity over a particular time interval. The assigned attribute may also be associated with a weight value indicating a relevancy of the assigned attribute to the associated entity as compared to other assigned attributes of the entity.

In one embodiment, for example, the method further includes ranking a plurality of similar entities in order of similarity to the first entity, generating a second signal associated with the ranking; and transmitting the second signal in response to a request. The method may also include providing a graphical user interface for viewing at least one attribute of the entity fingerprint, at least one attribute of at least one similar entity, at least one document related to the first entity, at least one document related to the first entity and the at least one similar entity, or combination thereof.

In one embodiment, the method further includes comparing entity fingerprints by computing a first weighted value for each unique attribute-type associated with the first entity by applying an aggregate function to attribute weights associated with attributes corresponding to each unique attribute-type of the first entity, computing a second weighted value for each unique attribute-type associated with the at least one similar entity by applying the aggregate function to attribute weights associated with attributes corresponding to each unique attribute type of the similar entity, and normalizing the attributes associated with each attribute-type of the first entity using the computed first weighted value and of the second entity using the computed second weighted value. A similarity score is then computed for the first and second fingerprints by applying a similarity function to the normalized attributes of the first entity and the similar entity.

In one embodiment, the aggregate function may be, but is not limited to an average function, a minimum function, a maximum function, and the like, and the similarity function may be, but is not limited to a cosine similarity, a Euclidean distance, a Manhattan distance, and the like.

In another aspect, a method of computing an entity fingerprint includes reading data representative of a set of attributes associated with an entity for which an entity fingerprint is desired, and processing the data in accordance with at least one fingerprint extraction algorithm. The fingerprint extraction algorithm computing the entity fingerprint by representing a plurality of entities including the entity as vertices of a directed graph, generating at least one edge of the directed graph using entity co-occurrences in a set of unstructured documents and structured information sources, and summarizing the set of attributes associated with the entity for which the entity fingerprint is desired using the structured information sources and an entity neighborhood of the directed graph.

In one embodiment, processing the data further includes initializing a data structure for association with the entity, the data structure including at least one attribute identifier, associated attribute-type identifier, associated attribute value, and associated attribute weight, comparing the entity with a set of pre-defined entities, each of the pre-defined entities optionally associated with an attribute identifier, attribute-type identifier, and attribute value, and importing values for the data structure based on the comparison.

The method also includes identifying information sources for association with the data structure from the set of structured information sources. Each of the set of structured information sources is optionally associated with an attribute identifier, an attribute-type identifier, an attribute value, and an information-source identifier, importing values for the data structure based on the identification of the information sources comprising information associated with the entity, identifying vertices of the directed graph that connect to the entity and comprise the entity neighborhood. Values are imported into the data structure based on at least one of the vertices and set of edges of the directed graph that connect to the entity and comprise the entity neighborhood.

The method further includes identifying documents for association with the entity based on metadata associated with each document of a set of documents, importing values for the data structure based on the identified documents, and associating the data structure with the entity.

In one embodiment, for example, the method further includes storing a reference to each of the identified documents in at least one of the vertices and the set of edges of the directed graph. In one embodiment, the at least one associated attribute is determined from the directed graph and the at least one associated attribute weight is determined from a set of pre-defined weights. Each of the set of pre-defined weights includes a weight value and at least one of an information-source identifier, an attribute-type identifier, an obtained-from-neighborhood identifier and a validated identifier. In yet another embodiment, each edge of the directed graph optionally includes an attribute identifier, an attribute-type identifier, and an attribute value.

In one embodiment, the method includes comparing a significant score attribute associated with an edge of the directed graph to a user-defined threshold value, and importing values for the data structure based on the comparison. The method may also include comparing the metadata associated with each document of the set of documents to an entity identifier associated with the entity, and importing values for the data structure based on the comparison.

In one embodiment, the method may include comparing metadata associated with each document of the set of documents to user-defined criteria, the user-defined criteria identifying at least one peer entity to the entity and not including the entity, and importing values for the data structure based on the comparison. The method may also include, for example, ranking one of entities and metadata optionally associated with each document of the set of documents for each attribute type associated therewith, and selecting a subset of documents for association with the data structure based on the ranking.

In another embodiment, the present invention provides a system for providing remote users over a communication network supply-chain relationship data via a centralized Knowledge Graph user interface, the system comprising: a Knowledge Graph data store comprising a plurality of Knowledge Graphs, each Knowledge Graph related to an associated entity, and including a first Knowledge Graph associated with a first company and comprising supplier-customer data; an input adapted to receive electronic documents from a plurality of data sources via a communications network, the received electronic documents including unstructured text; a pre-processing interface adapted to perform one or more of named entity recognition, relation extraction, and entity linking on the received electronic documents and generate a set of tagged data, and further adapted to parse the electronic documents into sentences and identify a set of sentences with each identified sentence having at least two identified companies as an entity-pair; a pattern matching module adapted to perform a pattern-matching set of rules to extract sentences from the set of sentences as supply chain evidence candidate sentences; a classifier adapted to utilize natural language processing on the supply chain evidence candidate sentences and calculate a probability of a supply-chain relationship between an entity-pair associated with the supply chain evidence candidate sentences; and an aggregator adapted to aggregate at least some of the supply chain evidence candidates based on the calculated probability to arrive at an aggregate evidence score for a given entity-pair, wherein a Knowledge Graph associated with at least one company from the entity-pair is generated or updated based at least in part on the aggregate evidence score.

The system of this embodiment may also be characterized in one or more of the following ways. The system may further comprise a user interface adapted to receive an input signal from a remote user-operated device, the input signal representing a user query, wherein an output is generated for delivery to the remote user-operated device and related to a Knowledge Graph associated with a company in response to the user query. The system may further comprise a query execution module adapted to translate the user query into an executable query set and execute the executable query set to generate a result set for presenting to the user via the remote user-operated device. The system may further comprise a graph-based data model for describing entities and relationships as a set of triples comprising a subject, predicate and object and stored in a triple store. The graph-based data model may be a Resource Description Framework (RDF) model. The triples may be queried using SPARQL query language. The system may further comprise a fourth element added to the set of triples to result in a quad. The system may further comprise a machine learning-based algorithm adapted to detect relationships between entities in an unstructured text document. The classifier may predict a probability of a relationship based on an extracted set of features from a sentence. The extracted set of features may include context-based features comprising one or more of n-grams and patterns. The system may further comprise wherein updating the Knowledge Graph is based on the aggregate evidence score satisfying a threshold value. The pre-processing interface may further be adapted to compute significance between entities by: identifying a first entity and a second entity from a plurality of entities, the first entity having a first association with the second entity, and the second entity having a second association with the first entity; weighting a plurality of criteria values assigned to the first association, the plurality of criteria values based on a plurality of association criteria selected from the group consisting essentially of interestingness, recent interestingness, validation, shared neighbor, temporal significance, context consistency, recent activity, current clusters, and surprise element; and computing a significance score for the first entity with respect to the second entity based on a sum of the plurality of weighted criteria values for the first association, the significance score indicating a level of significance of the second entity to the first entity.

In another embodiment, the present invention provides A method for providing remote users over a communication network supply-chain relationship data via a centralized Knowledge Graph user interface, the method comprising: storing at a Knowledge Graph data store a plurality of Knowledge Graphs, each Knowledge Graph related to an associated entity, and including a first Knowledge Graph associated with a first company and comprising supplier-customer data; receiving, by an input, electronic documents from a plurality of data sources via a communications network, the received electronic documents including unstructured text; performing, by a pre-processing interface, one or more of named entity recognition, relation extraction, and entity linking on the received electronic documents and generate a set of tagged data, and further adapted to parse the electronic documents into sentences and identify a set of sentences with each identified sentence having at least two identified companies as an entity-pair; performing, by a pattern matching module, a pattern-matching set of rules to extract sentences from the set of sentences as supply chain evidence candidate sentences; utilizing, by a classifier, natural language processing on the supply chain evidence candidate sentences and calculate a probability of a supply-chain relationship between an entity-pair associated with the supply chain evidence candidate sentences; and aggregating, by an aggregator, at least some of the supply chain evidence candidates based on the calculated probability to arrive at an aggregate evidence score for a given entity-pair, wherein a Knowledge Graph associated with at least one company from the entity-pair is generated or updated based at least in part on the aggregate evidence score.

The method of this embodiment may further comprise receiving, by a user interface, an input signal from a remote user-operated device, the input signal representing a user query, wherein an output is generated for delivery to the remote user-operated device and related to a Knowledge Graph associated with a company in response to the user query; and translating, by a query execution module, the user query into an executable query set and execute the executable query set to generate a result set for presenting to the user via the remote user-operated device. The method may further comprise describing, by a graph-based data model, entities and relationships as a set of triples comprising a subject, predicate and object and stored in a triple store. The graph-based data model may be a Resource Description Framework (RDF) model. The triples may be queried using SPARQL query language. The method may further comprise a fourth element added to the set of triples to result in a quad. The method may further comprise detecting, by a machine learning-based algorithm, relationships between entities in an unstructured text document. The predicting, by the classifier, may further comprise a probability of a relationship is based on an extracted set of features from a sentence. The extracted set of features may include context-based features comprising one or more of n-grams and patterns. The updating the Knowledge Graph may be based on the aggregate evidence score satisfying a threshold value. The method may further comprise: identifying, by the pre-processing interface, a first entity and a second entity from a plurality of entities, the first entity having a first association with the second entity, and the second entity having a second association with the first entity; weighting, by the pre-processing interface, a plurality of criteria values assigned to the first association, the plurality of criteria values based on a plurality of association criteria selected from the group consisting essentially of interestingness, recent interestingness, validation, shared neighbor, temporal significance, context consistency, recent activity, current clusters, and surprise element; and computing, by the pre-processing interface, a significance score for the first entity with respect to the second entity based on a sum of the plurality of weighted criteria values for the first association, the significance score indicating a level of significance of the second entity to the first entity.

In another embodiment, the present invention provides a system for automatically identifying supply chain relationships between companies based on unstructured text and for generating Knowledge Graphs. The system comprises: a Knowledge Graph data store comprising a plurality of Knowledge Graphs, each Knowledge Graph related to an associated company, and including a first Knowledge Graph associated with a first company and comprising supplier-customer data; a machine-learning module adapted to identify sentences containing text data representing at least two companies, to determine a probability of a supply chain relationship between a first company and a second company, and to generate a value representing the probability; an aggregation module adapted to aggregate a set of values determined by the machine-learning module representing a supply chain relationship between the first company and the second company and further adapted to generate and aggregate evidence score representing a degree of confidence in the existence of the supply chain relationship.

In another embodiment, the present invention provides a system for generating an improved user interface for displaying a significance of an association between one entity and a set of other entities, the system comprising: a processor and a memory, the memory comprising a set of services accessible using client-based applications on an other system, the set of services adapted to: generate, by a fingerprint extraction module, a fingerprint for the one entity and a set of fingerprints for the set of other entities, wherein each fingerprint in the set of fingerprints is associated with an entity in the set of other entities; determine the significance of the association between the one entity and each of the entities in the set of other entities based at least in part on the fingerprint and the set of fingerprints, and based at least in part on a set of association criteria, the significance of the relationship being a derived numerical value; generate an interactive user interface that provides access to a graphical representation of the significance of the association between the one entity and the set of other entities, the interactive user interface comprising: a query frame adapted to provide for user specification of the one entity; a matrix frame adapted to display a set of significantly associated entities from the set of other entities and corresponding fingerprints from the set fingerprints, the set of significantly associated entities being entities from the set of other entities meeting a threshold value for the significance of the association with the one entity.

The fingerprint of the above embodiment may comprise a data structure, the data structure comprising a quadruple that identifies a characteristic of the one entity. The fingerprint extraction module may add a new quadruple to the data structure based on each entity in the set of other entities determined to be associated with the one entity. The fingerprint extraction module may add a new quadruple to the data structure based on an information source determined to be associated with the one entity. The system may further comprise: wherein the fingerprint extraction module adds a new quadruple to the data structure based on a connected vertex in the graphical representation between the one entity and an entity in the set of other entities; wherein the connected vertex is defined by user-specified criteria; and wherein the connected vertex is identified by processing a set of edges in the graphical representation. The fingerprint extraction module may add a new quadruple to the data structure based on an identified document that meets a set of user-specified criteria. The graphical representation may be a directed graph distributed between a plurality of nodes in a decentralized peer network, each node in the plurality of nodes comprising a subset of documents and entities. The graphical representation may be represented by a persisted, serialized Java object. The fingerprint, the set of fingerprints, and the set of significantly associated entities may be stored in a data store, and the data store may be a lightweight directory access protocol relational database. The association criteria may comprise a set of contingency tables associated with a set of interestingness measures. The graphical representation may further comprise a selectable trend line associated with the one entity and the set of significantly associated entities. The interactive user interface may further comprise: an overlay adapted to provide a detailed set of information for an event related to the one entity; and a headline frame adapted to display items of interest related to the one entity and the significantly related entities. The interactive user interface may further comprise a plurality of adjacent navigation options for viewing entities in the set of significantly associated entities and entities in the set of other entities having a higher or lower significance of the association with the one entity. The interactive user interface may be further adapted to display the one entity and an entity from the set of significantly associated entities side-by-side in the graphical representation.

In yet another embodiment, the present invention provides a computer-implemented method for generating, by a system comprising a processor and a memory, an improved user interface for displaying a significance of an association between one entity and a set of other entities, the improved user interface accessible by a client-based application on another system, the method comprising: generating, by a fingerprint extraction module, a fingerprint for the one entity and a set of fingerprints for the set of other entities, wherein each fingerprint in the set of fingerprints is associated with an entity in the set of other entities; determining, by an association module, the significance of the association between the one entity and each of the entities in the set of other entities based at least in part on the fingerprint and the set of fingerprints, and based at least in part on a set of association criteria, the significance of the relationship being a derived numerical value; generating, by an interface module, an interactive user interface that provides access to a graphical representation of the significance of the association between the one entity and the set of other entities, the generated interactive user interface comprising: a query frame adapted to provide for user specification of the one entity; a matrix frame adapted to display a set of significantly associated entities from the set of other entities and corresponding fingerprints from the set fingerprints, the set of significantly associated entities being entities from the set of other entities meeting a threshold value for the significance of the association with the one entity.

The fingerprint of the above embodiment may comprise a data structure, the data structure comprising a quadruple that identifies a characteristic of the one entity. The graphical representation may be a directed graph distributed between a plurality of nodes in a decentralized peer network, each node in the plurality of nodes comprising a subset of documents and entities. The graphical representation may be represented by a persisted, serialized Java object. The graphical representation may further comprise a selectable trend line associated with the one entity and the set of significantly associated entities. The interactive user interface may further comprise: an overlay adapted to provide a detailed set of information for an event related to the one entity; and a headline frame adapted to display items of interest related to the one entity and the significantly related entities. The interactive user interface may further comprise a plurality of adjacent navigation options for viewing entities in the set of significantly associated entities and entities in the set of other entities having a higher or lower significance of the association with the one entity. The interactive user interface may be further adapted to display the one entity and an entity from the set of significantly associated entities side-by-side in the graphical representation.

Systems, methods, as well as articles that include a machine-readable medium storing machine-readable instructions for implementing the various techniques, are disclosed. Details of various implementations are discussed in greater detail below.

Additional features and advantages will be readily apparent from the following detailed description, the accompanying drawings and the claims.

BRIEF DESCRIPTION OF THE DRAWINGS

FIGS. 7-8 show example matrix frames of the graphical user interface shown in FIG. 5.

FIG. 10 illustrates a headline frame of the graphical user interface shown in FIG. 5.

FIG. 17 illustrates exemplary interestingness measures.

FIG. 23($d$) is an exemplary user interface providing a question built by the question building process and the answers retrieved by executing the question as a query according to the present invention.

Like reference symbols in the various drawings indicate like elements.

DETAILED DESCRIPTION

A novel entity-based information analysis and content aggregation system that uses heterogeneous data sources to construct and model tangible and logical entities is disclosed. The tangible and logical entities may include, but are not limited to, organizations, people, products, industries, geographies, commodities, financial indicators, economic indicators, events, topics, subject codes, unique identifiers, social tags, industry terms, general terms, metadata elements, classification codes, technologies, facilities, media, and combinations thereof.

In one embodiment, entities are represented as vertices in a directed graph, and edges of the directed graph are generated using entity co-occurrences in unstructured documents and structured information available from structured data sources. Vertices and edges of the directed graph may include properties and references to relevant documents, and a single edge of the graph may represent multiple types of relationships between entities. In one embodiment, some entities are validated by mapping each entity to a known entity from a structured data source (which may be human-maintained) while other entities are discovered and are solely obtained from unstructured data sources.

Significance scores for the edges of the graph are computed using a technique that combines supervised, unsupervised and temporal factors into a single score. The technique is disclosed in U.S. patent application Ser. No. 13/107,665 filed May 13, 2011, entitled 'Association Significance', the content of which is incorporated herein in its entirety.

Entity attributes derived from the structured content and the entity neighborhood in the graph are automatically summarized as an entity fingerprint. While the present invention is discussed in connection with a directed graph, it will be appreciated that the present invention is not limited to a directed graph implementation, and that other computer-implemented data structures capable of modeling entity relationships may be used with the present invention, such as a mixed graph and a multigraph. Further, in one embodiment, the system also includes an interactive user interface that provides exploratory access to the graph and supports common business use cases, such as determining entity similarity and comparing entities.

Figure 1:
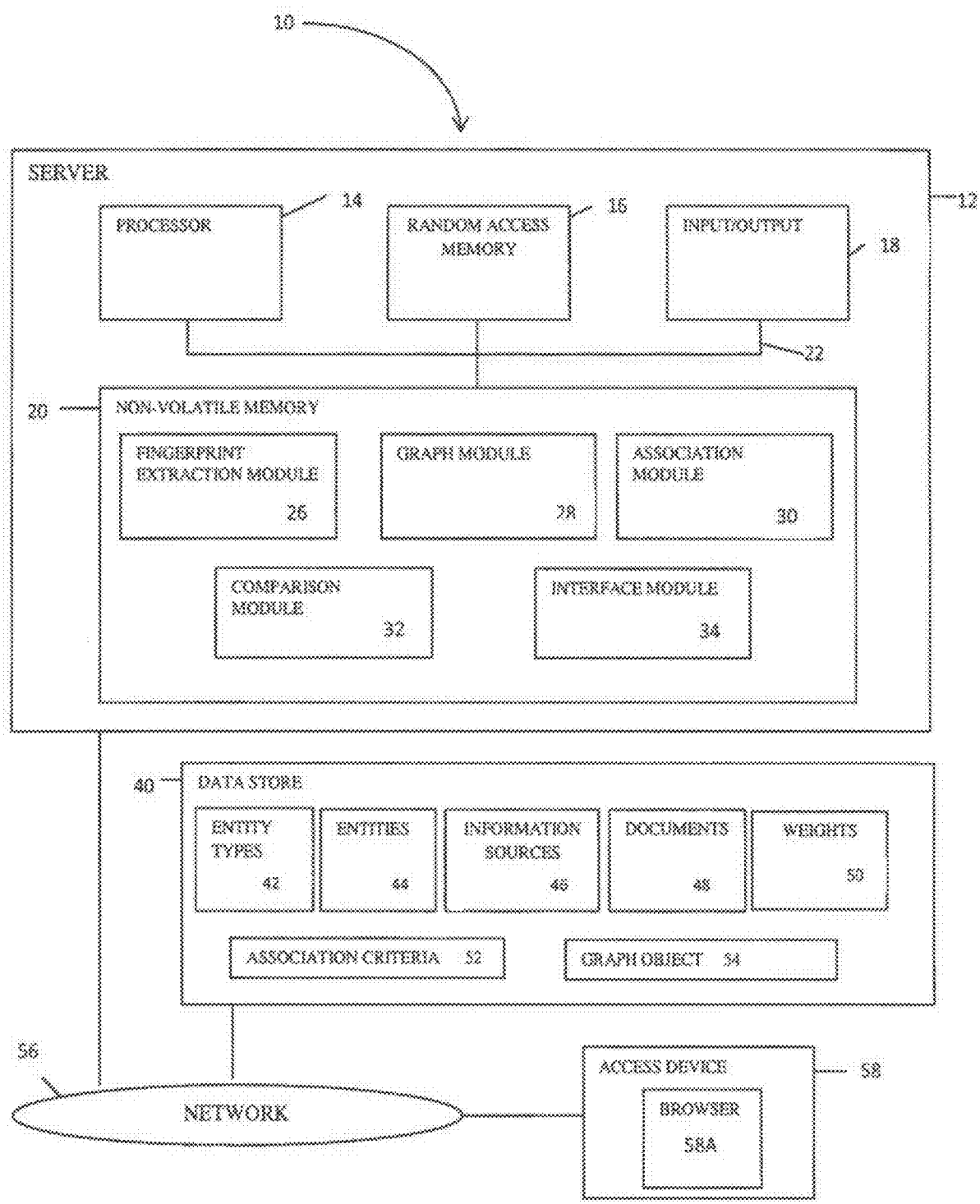
FIG. 1 is a schematic of an exemplary computer-based system for computing and comparing an entity fingerprint.

Turning now to FIG. 1, an example of a suitable computing system 10 within which embodiments of the present invention may be implemented is disclosed. The computing system 10 is only one example and is not intended to suggest any limitation as to the scope of use or functionality of the invention. Neither should the computing system 10 be interpreted as having any dependency or requirement relating to any one or combination of illustrated components.

For example, the present invention is operational with numerous other general purpose or special purpose computing consumer electronics, network PCs, minicomputers, mainframe computers, laptop computers, as well as distributed computing environments that include any of the above systems or devices, and the like.

The invention may be described in the general context of computer-executable instructions, such as program modules, being executed by a computer. Generally, program modules include routines, programs, objects, components, data structures, loop code segments and constructs, etc. that perform particular tasks or implement particular abstract data types. The invention can be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

Various programming languages may be used to implement aspects of the present invention. In one embodiment, the programming language used is Java. The directed graph is loaded into a computer memory as a runtime Java object, and is persisted to a data store, such as a file system, as a serialized Java object. Information needed to generate the directed graph is stored in one or more structured data sources, such as a relational database. The following software libraries may be used to implement components of the system. These include, but are not limited to, Apache Lucene 3.0.1, text search engine library, and Apache XML Beans 2.4. Further, to generate Java objects from XML schemas, the following may also be utilized: Jetty 6.01, a HTTP Web server and client; and a fast XML parser, such as VTD-XML.

As shown in the exemplary computer system 10 of FIG. 1, in one embodiment, the system 10 includes a server device 12 configured to include a processor 14, such as a central processing unit ('CPU'), random access memory ('RAM') 16, one or more input-output devices 18, such as a display device (not shown) and keyboard (not shown), and non-volatile memory 20, all of which are interconnected via a common bus 22 and controlled by the processor 14.

The non-volatile memory 20 is configured to include a fingerprint extraction module 26 for computing and comparing entity fingerprints to one another. As used herein, the term 'fingerprint' refers to an abstract representation of an entity based on a number of its attributes and/or characteristics. Once a fingerprint is computed for an entity, the entity fingerprint may be compared to other entity fingerprints to understand similarities and differences that may exist. In one embodiment, computed entity fingerprints are used to generate feature vectors to be used in classification and clustering tasks.

Factors used by the fingerprint extraction module 26 to generate an entity fingerprint relate to the neighborhood of the entity determined from the directed graph. In one embodiment, the fingerprint extraction module 26 identifies neighborhood entities of a given type to which the entity is related and temporal aspects of these neighbors (e.g. one attribute being 'emerging neighbor'). Accordingly, entity fingerprints computed by the fingerprint-extraction module 26 may represent a point-in-time view of an entity. Structured information about the entity may also be incorporated into the fingerprint.

For example, considering an organizational entity, information such as the country in which the organization is incorporated and the industries in which the organization is known to operate may also be incorporated into the fingerprints. Further, in one embodiment, the fingerprint extraction module 26 uses entity to document relationships to add the top-k classification codes and top-k social tags (i.e., Wikipedia article titles related to a document) to organizational fingerprints. This is achieved by sorting each classification code or social tag with respect to the number of documents that include the organization and are also assigned with the classification code or social tag, and selecting the k most frequent results, where k is an integer value.

Accordingly, in one embodiment, each organizational fingerprint computed by the fingerprint extraction module 26 includes one or more of the following attribute groups: industry hierarchy; geography hierarchy; related industries; related geographies; related macroeconomic indicators; related commodities; related TRCS codes; related social tags; and related entities (in two groupings—those that are emerging and those that are stable.) An exemplary method of computing an entity fingerprint executed by the fingerprint-extraction module 26 is disclosed in connection with FIG. 2.

Referring to FIG. 1, a graph module 28 is included in the non-volatile memory 20 to construct the directed graph. In one embodiment, the graph module 28 initiates construction of the directed graph by selecting documents from available data sources and processing these documents. The processing of these documents includes extracting entities based on metadata associated with a document, and resolving any inconsistencies that may be detected with structured data sources. The graph module 28 then generates vertices of the directed graph based on the extracted entities and generates edges between the extracted entities. Once entities are extracted, the graph module 28 generates edges of the graph between resolved entities.

As shown in FIG. 1, an association module 30 also is provided in the non-volatile memory 20. The association module 30 computes a significance score for an association between entities, the significance score being an indication of the level of significance of one entity to another entity. In one embodiment, the association module 30 uses entity co-occurrences in unstructured documents to establish connections (e.g., edges) between entities. The association module 30 may assign a significance score to one or more edges of the directed graph, where higher values indicate stronger connections. As entity relationships may be represented using a directed graph, there exists two edges between each pair of connected entities, each of which may be assigned a different significance score by the association module 30. Advantageously, this allows the system 10 to model a common real-life situation where a given entity E1 may be very significant for a connected entity E2, but the connected entity E2 may not be equally significant for entity E1.

Figure 4:
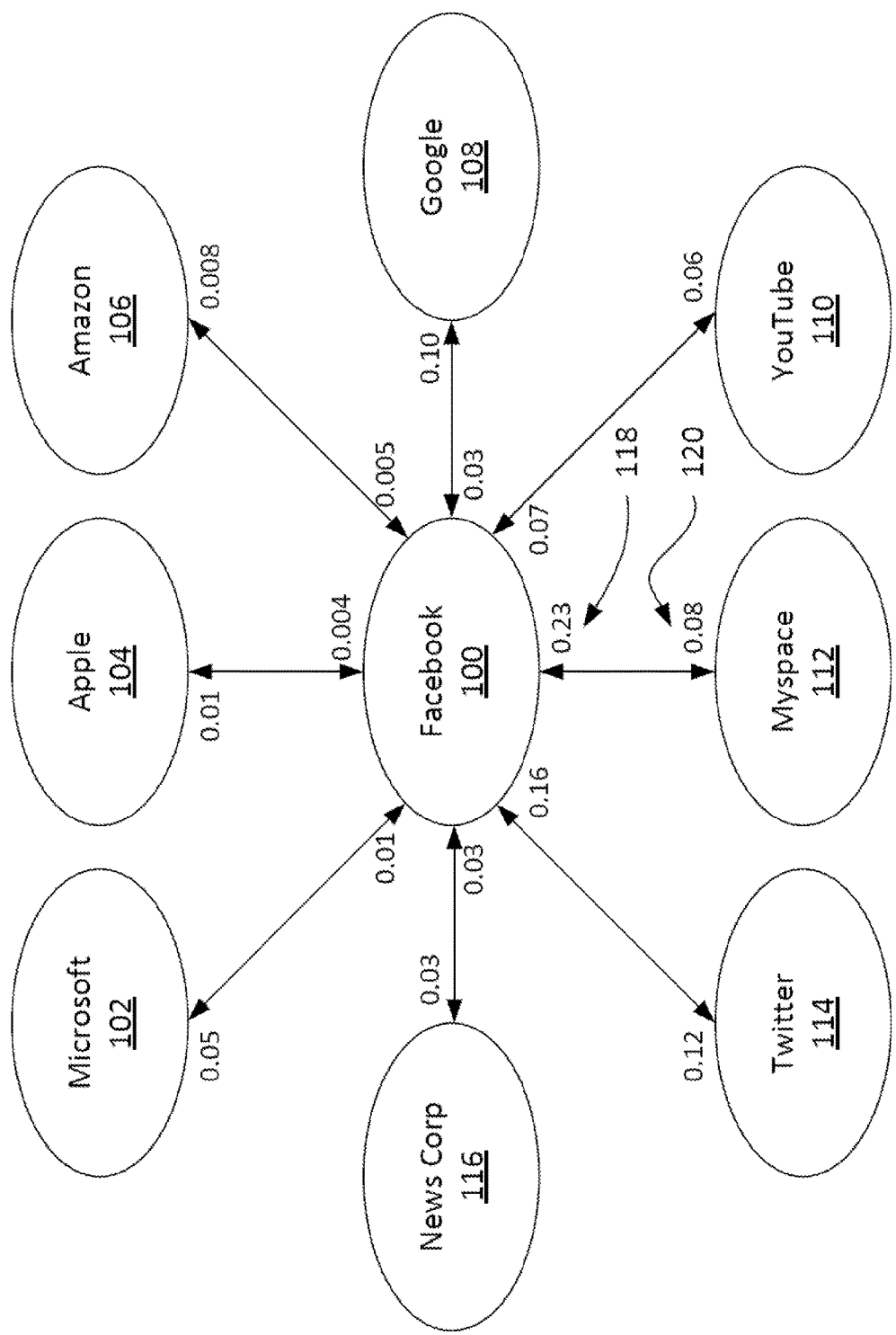
FIG. 4 is a schematic of an exemplary directed graph.
Figure 5:
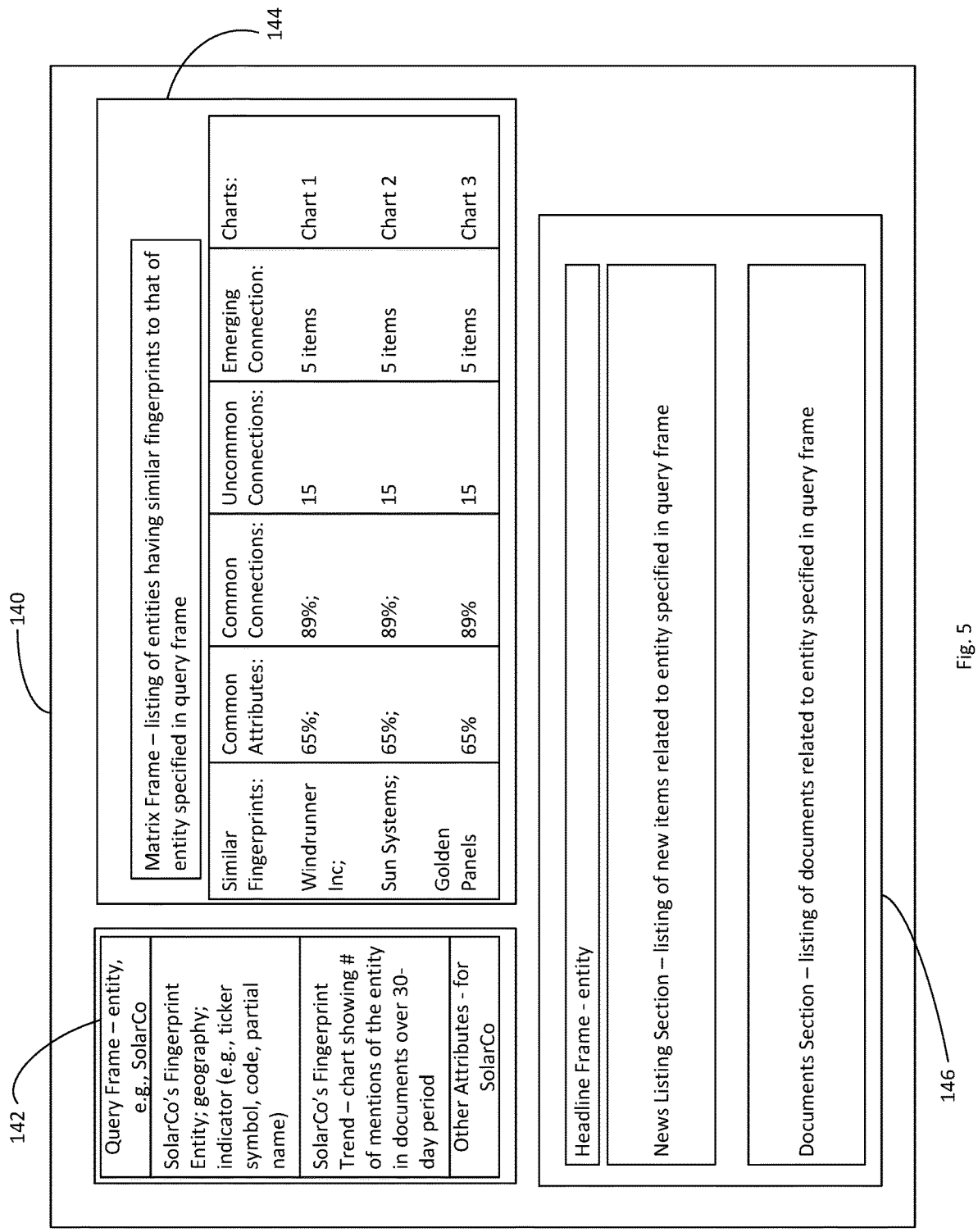
FIG. 5 illustrates an example graphical user interface for displaying an entity fingerprint.

An example of entity relationships between one organization, Facebook 100 and some of its entity neighbors is shown in connection with FIG. 4. The example significance scores illustrated in FIG. 4 indicate that Twitter 114 is more significant to Facebook 100, as indicated by a strength of 0.12, than Microsoft 102, indicated by a strength of 0.05, and both are more significant than Apple 104, indicated by a strength of 0.01. In contrast, Facebook 100 is important to Microsoft 102 but not equally significant, as indicated by strength of 0.01. As perceived by some market professionals, Microsoft 102 is a major shareholder and investor in Facebook 100, but is also involved in a variety of other business areas. The relationship between Facebook 100 and Google 108 exhibits a similar behavior. By contrast, as perceived by many market professionals, Facebook 100 is a major competitor to MySpace's 112 core business, making the most significant connection in FIG. 4 the MySpace-→Facebook edge 118 indicated by a strength of 0.23, whereas MySpace's 112 actions appear less important to Facebook 100, which is clear from the fact that the connection in the opposite direction 120 is not of nearly the strength, namely 0.08.

Referring back to FIG. 1, the association module 30 computes significance scores using a variety of factors that capture different aspects of entity relationships. As noted previously, details of computing significance scores is discussed in U.S. patent application Ser. No. 13/107,665 filed May 13, 2011, entitled 'Association Significance', the contents of which is incorporated herein in its entirety.

In one embodiment, the association module 30 computes significance scores as a weighted average of multiple factors which include interestingness, recent interestingness, validation, common neighbors, industry overlap, geographic overlap, temporal significance, and element of surprise.

In one embodiment, the interestingness factor is computed by considering entities as two variables, populating a contingency-table with entity frequencies from all available documents, and then applying an interestingness measure to the contingency-table.

The recent interestingness factor is computed similar to the interestingness factor, but is computed only using documents that have been created and/or made available over a user-definable time interval. Advantageously, this factor enhances emerging relationships.

The validation factor is computed by assigning a value of one (1) if the relationship between a source and target entities was validated by a human expert (in available structured data). Otherwise, a value of zero (0) is assigned to the validation factor.

The common neighbors factor is computed as a percentage of the degree-1 neighbors of a source entity that also occur in the degree-1 neighborhood of the target entity.

The industry overlap factor is computed as a percentage of the industries in a source entity's neighborhood that also occur in the degree-1 neighborhood of the target entity.

The geography overlap factor is computed as a percentage of the geographies in source entity's neighborhood that also occur in the degree-1 neighborhood of the target entity.

The temporal significance factor is computed by comparing the recent interestingness value with an interestingness value computed from historic (non-recent) documents. The association module 30 assigns a value of one (1) to the factor if the recent interestingness value is greater than a threshold value, and assigns a value of zero (0) to the factor if the recent interestingness value is less than the threshold value. This factor rewards relationships that had gained strength in the recent time period and penalizes relationships that had lost strength.

The element of surprise factor is computed by assigning a value of one (1) if the source entity's neighborhood contains any new industries or geographies in the recent period that did not occur in the historic period, and the target entity shares at least one such industry or geography, otherwise the element of surprise factor is assigned a value of zero (0).

Additional details of computing significance scores utilized by the association module 30 are disclosed in copending U.S. patent application Ser. No. 13/107,665 filed May 13, 2011, entitled 'Association Significance', the content of which is incorporated herein in its entirety.

The comparison module 32 is provided and computes a similarity score between two fingerprints. In one embodiment, the similarity score is computed as a weighted linear combination of the cosine similarity scores of each attribute included in the fingerprints, where weights may be empirically selected by domain experts. This score represents how alike two entities are, rather than simply how connected they are in the graph. This information is of particular utility to investment bankers. A method of comparing entity fingerprints is discussed in connection with FIG. 3.

The non-volatile memory 20 also includes an interface module 34 that provides a graphical user interface for viewing none or more entity fingerprints. Additional details of each of the modules 26, 28, 30, 32 and 34 are discussed in further detail below.

The software modules 26-34 of the present invention may be implemented as a set of services that are accessible using Flash or HTML-based client applications. Requests and responses may be sent using either standard HTTP, XML over HTTP, or be batched using Google's Protocol Buffers. Data partitioning also may be used to allow vertical and horizontal scalability, i.e., the directed graph may be distributed between multiple nodes in a decentralized peer network, each of which owns a subset of documents or entities. Protocol Buffers may also be used for inter-node communication to service user requests in the distributed graph.

As shown in FIG. 1, a network 56 is provided that can include various devices such as routers, server, and switching elements connected in an Intranet, Extranet or Internet configuration. In one embodiment, the network 56 uses wired communications to transfer information between an access device 58, the server device 12, and a data store 40. In another embodiment, the network 56 employs wireless communication protocols to transfer information between the access device 58, the server device 12, and the data store 40. In yet other embodiments, the network 56 employs a combination of wired and wireless technologies to transfer information between the access device 58, the server device 12, and the data store 40.

The access device 58 can include a personal computer, laptop computer, or other type of electronic device, such as a cellular phone or Personal Digital Assistant (PDA), In one embodiment, for example, the access device 58 is coupled to 110 devices (not shown) that include a keyboard in combination with a pointing device such as a mouse for sending web page requests to the server device 12. Preferably, memory of the access device 58 is configured to include a web browser 58A that is used to request and receive information from the server 12. Although only one access device 58 is shown in FIG. 1, the system 10 can support multiple access devices.

The data store 40 is a repository that maintains and stores information utilized by the before-mentioned modules 26-34. In one embodiment, the data store 40 is a relational database. In another embodiment, the data store 40 is a directory server, such as a Lightweight Directory Access Protocol ('LDAP'). In yet another embodiment, the data store 40 is an area of non-volatile memory 20 of the server 12.

In one embodiment, as shown in the FIG. 1 example, the data store 40 includes a set of entity types 42. As used herein, the words 'set' and 'sets' refer to anything from a null set to a multiple element set. Each member of the set of entity types 42 represents a type of tangible or logical entity that is pre-defined in the system. The set of entity types 42 may include, but are not limited to, the following classes of entities: organizations, people, products, industries, geographies, commodities, financial indicators, economic indicators, events, topics, subject codes, unique identifiers, social tags, industry terms, general terms, metadata elements, classification codes, and combinations thereof.

A set of pre-defined entities 44 are also provided that are used to identify similar entities and to determine attributes of entities. Each member of the set of pre-defined entities represents a specific tangible or logical entity and is associated with zero (0), one (1), or many members of the set of entity types 42. In one embodiment, each member of the set of pre-defined entities 44 may be associated with an attribute identifier, an attribute-type identifier, and an attribute value (i.e., a triplet). For example, if one of the pre-defined entities represents a company, such as 'Thomson Reuters', an attribute-type identifier may be 'Corporate headquarters', an attribute identifier may be 'City", and an attribute value may be "New York".

In one embodiment, the data store 40 includes a set of information sources 46. The set of information sources 46 are structured data sources in which each member is associated with one (1) or more attribute identifiers, attribute-type identifiers, attribute values, and information source identifiers (i.e., a quadruple) for each member of the set of pre-defined entities 44.

The data store 40 also includes a set of documents 48. Each of the set of documents 48 is optionally associated with a set of document quadruples comprising an entity identifier (e), an attribute identifier, an attribute-type identifier, and an attribute value. The entity identifier (e) relates to at least one member of the set of pre-defined entities 44. In one embodiment, at least one document of the set of documents is associated with metadata that identifies one or more entities.

A set of weights 50 also is provided in the data store 40 and is used to compute similarities between fingerprint attributes. Each member of the set of weights 50 is associated with a numerical value and one or more information source identifier, attribute-type identifier, and binary variables indicating whether the numerical weight value is obtained from the directed graph and whether the numerical weight value has been validated by a human.

A set of association criteria 52 is provided that comprises contingency tables used by the association module 30 to compute a significance score for an identified relationship between entities. In one embodiment, the contingency tables are associated with a set of interestingness measures that are used by the association module 30 to compute the significance score. In one embodiment, the data store 40 also includes a graph object 54. The graph object 54 is a serialized Java object that has been persisted and represents the directed graph. Information needed to generate the directed graph is stored in one or more data sources stored in the data store 40. Additional details concerning information included in the data store 40 are discussed in greater detail below.

Although the data store 40 shown in FIG. 1 is connected to the network 56, it will be appreciated by one skilled in the art that the data store 40 and/or any of the information shown therein, can be distributed across various servers and be accessible to the server 12 over the network 56, be coupled directly to the server 12, or be configured in an area of non-volatile memory 20 of the server 12.

Further, it should be noted that the system 10 shown in FIG. 1 is only one embodiment of the disclosure. Other system embodiments of the disclosure may include additional structures that are not shown, such as secondary storage and additional computational devices. In addition, various other embodiments of the disclosure include fewer structures than those shown in FIG. 1. For example, in one embodiment, the disclosure is implemented on a single computing device in a non-networked standalone configuration. Data input and requests are communicated to the computing device via an input device, such as a keyboard and/or mouse. Data output, such as the computed significance score, of the system is communicated from the computing device to a display device, such as a computer monitor.

Figure 2:
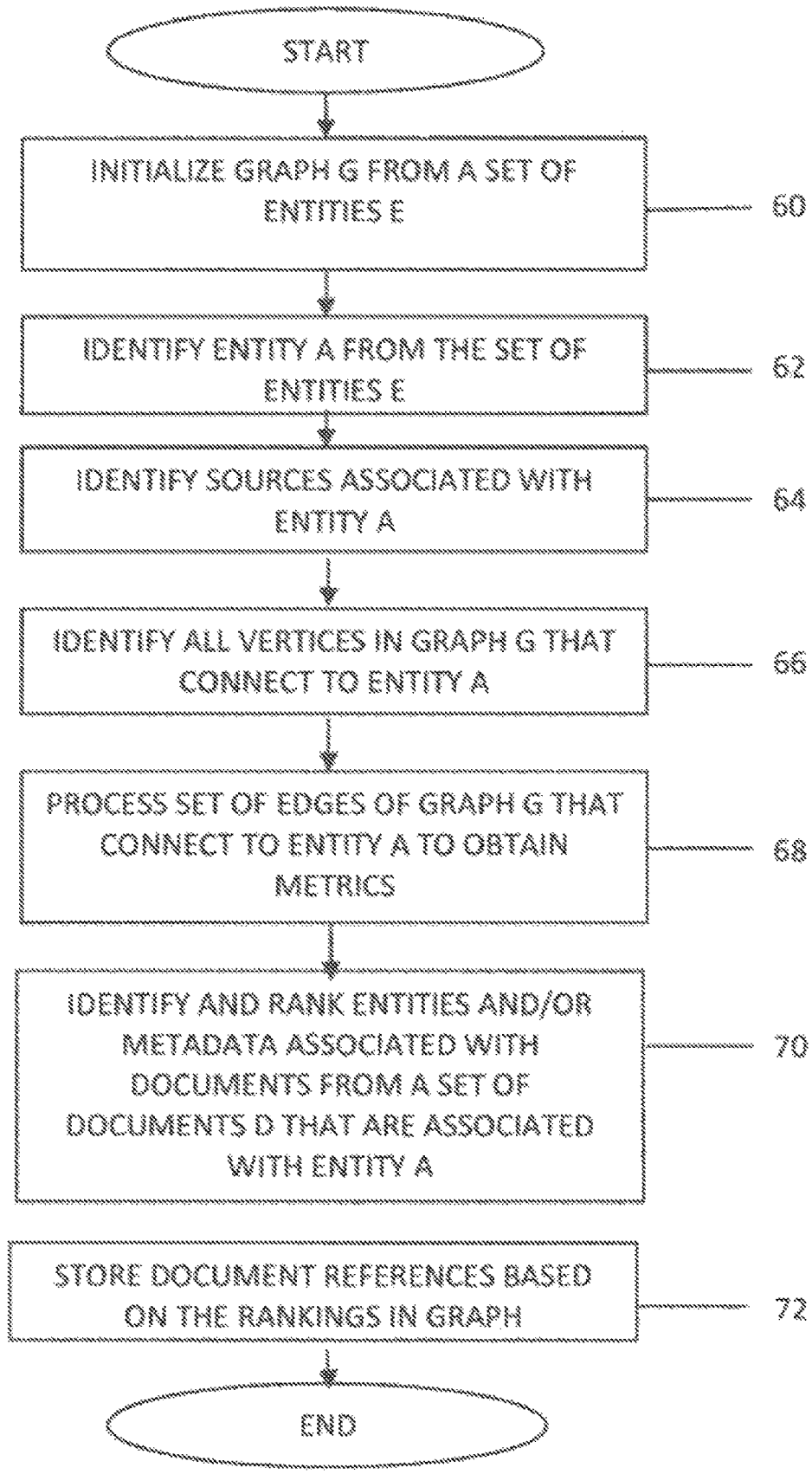
FIG. 2 illustrates an exemplary method for generating an entity fingerprint.

Turning now to FIG. 2, an example method for computing an entity fingerprint for an entity 'A' is disclosed. As shown in the FIG. 2 example, at step 60, in response to receiving a request, the fingerprint extraction module 26 initializes a fingerprint 'F' for the entity 'A'. The fingerprint A comprises a data structure having at least one attribute identifier that identifies an entity characteristic, an attribute-type identifier that identifies a category for the entity characteristic, an attribute value for the attribute identifier, and an attribute weight that identifies a level of significance of the characteristic, hereinafter referred to collectively as a 'quadruple'. Upon initialization, the data structure comprises zero and/or null values.

Next, at step 62, the fingerprint extraction module 26 compares entity A with each member of the set of pre-defined entities 44. Based on the comparison, the fingerprint extraction module 26 adds a quadruple to fingerprint F for each identified member in the set of pre-defined entities 44 by importing values associated with identified entities into the data structure. The fingerprint extraction module 26 then determines the attribute weight of the quadruple from the weights data store 50 using the attribute-type identifier and the information source identifier from the set of information sources 46.

Next, at step 64, the fingerprint extraction module 26 identifies all members of the set of information sources 46 that comprise a quadruple for entity A. In one embodiment, the fingerprint extraction module 26 adds a quadruple to the fingerprint F for each identified member of the set of information sources 46 by importing attribute identifiers, attribute-type identifiers, attribute values, and information source identifiers directly from the set of information sources 46. The fingerprint extraction module 26 then determines the attribute weight from the weight data store 50 using the attribute-type identifier and an information source identifier associated with each identified member of the set of information sources 46.

The fingerprint extraction module 26, at step 66, then identifies all vertices representing entities from the directed graph that connect to entity A. In one embodiment, the fingerprint extraction module 26 adds a quadruple to fingerprint F for each vertex that meets user-defined criteria. For example, the user-defined criteria may be used to identify vertices connected via an edge that have a significance or relevance score attribute that meets a user-defined threshold value. The user-defined criteria may also be used to identify vertices associated with a user-defined attribute-type identifier or attribute identifier, and/or edges that are associated with a user-defined attribute-type identifier or attribute identifier. The fingerprint extraction module 26 then imports values for the fingerprint A from each identified vertex (e.g., attribute identifiers, attribute-type identifiers, and attribute values associated with each vertex) and determines attribute weights from the weights data store 50 using the attribute-type, and binary values indicating that the attribute is derived from the directed graph and not the set of information sources 46.

Next, at step 68, the fingerprint extraction module 26 processes a set of edges that directly connect to entity A to obtain attribute metrics of connected entities. In one embodiment, for each connected vertex, the fingerprint extraction module 26 adds a quadruple to fingerprint F using a calculated attribute identifier and value that is based on an identified attribute-type. The fingerprint extraction module 26 then determines an attribute weight for the calculated attribute from the weights data store 50 using the attribute-type, and binary values indicating that the attribute is derived from the directed graph and not the set of information sources 46. The fingerprint extraction module 26 imports the calculated attribute identifier, attribute-type, attribute value, and attribute weight into the fingerprint F data structure.

The fingerprint extraction module 26, at step 70, then identifies and ranks entities and/or metadata associated with documents from the set of documents 48 where the entity A is noted. As described previously, at least one document of the set of documents 48 may include metadata tags and/or entity information that identifies one or more entities. In one embodiment, for all entities except entity A identified in a document, the fingerprint extraction module 26 counts the number of documents that exclude entity A and adds a quadruple to fingerprint F for each document, selecting entities that meet a user-defined criteria, such as a threshold value indicative of a minimum number of documents that contain the selected entities. The fingerprint extraction module 26 imports values for the fingerprint data structure from identified documents based on the ranking of metadata tags and/or entity information, and at step 72, stores references to the identified documents in the directed graph (e.g., vertices and edges of the directed graph) based on the ranking.

Figure 3:
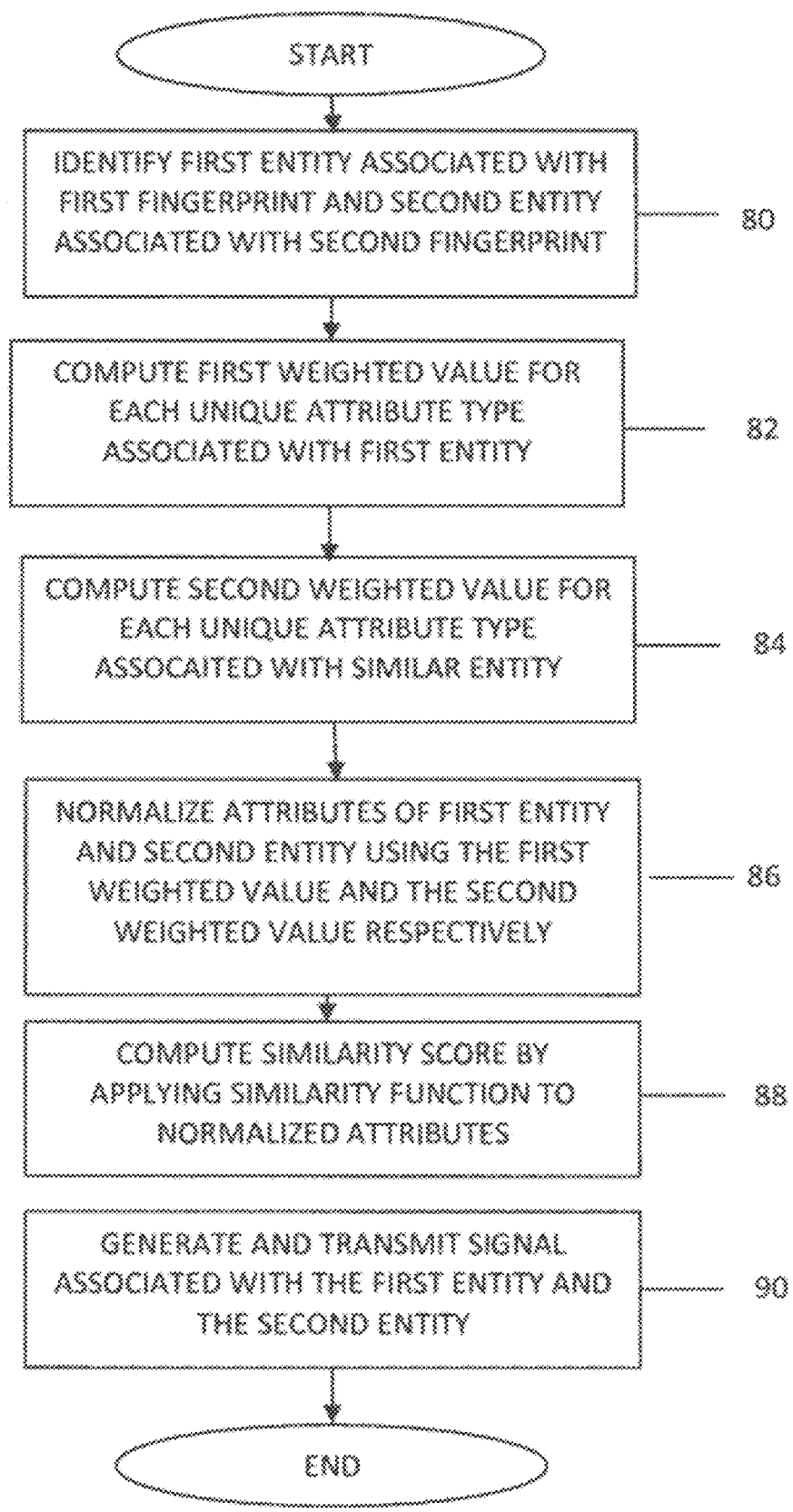
FIG. 3 illustrates an exemplary method for comparing entity fingerprints.

Turning now to FIG. 3, an exemplary method of comparing entity fingerprints executed by the comparison module 32 is disclosed. First, at step 80, the comparison module 32 identifies a first entity associated with a first fingerprint and a second entity associated with a second fingerprint. In one embodiment, the first entity and the second entity are initially identified by a user and received via a graphical user interface provided by the interface module 34 using unique identifiers associated with each entity.

Next, at step 82, the comparison module 32 computes a first weighted value for each unique attribute-type associated with the first entity. In one embodiment, the comparison module 32 applies an aggregation function, such as an average function, a minimum function, or maximum function, to attribute weights of attribute identifiers that are associated with the first entity. Next, at step 84, the comparison module 32 computes a second weighted value for each unique attribute-type associated with the second entity. Similar to computing the first weighted value, the comparison module 32 applies an aggregation function to attribute weights of attribute identifiers associated with the second entity.

Next, at step 86, the comparison module 32 normalizes attribute values of the first entity using the computed first weighted value of the first entity, and normalizes attribute values of the second entity using the computed second weighted value of the second entity. Each of these computed weighted values are equally distributed across each respective entity's attribute values. For example, assuming a computed weighted value of twenty (20) for an attribute-type TY and a number of attribute identifiers for the attribute-type TY of ten (10), the comparison module 32 assigns an attribute weight of two (2) (i.e., aggregated weight (20)/number of attributes (10)) to each attribute corresponding to the attribute-type TY.

Next, at step 88, the comparison module 32 computes a similarity score for the first and second entity fingerprints by applying similarity functions to corresponding normalized attributes of each fingerprint and aggregates the results. Example similarity functions that may be applied to corresponding normalized attributes include, but are not limited to, cosine similarity, Euclidean distance, Manhattan distance, and the like.

Lastly, at step 90, the comparison module 32 generates a signal associated with the first entity and the second entity and transmits the signal in response to a request.

Turning now to FIGS. 5-10 and referring collectively thereto, an example graphical user interface ('GUI') 140 provided by the interface module 34 is shown. As shown in the FIG. 5 example, in one embodiment, the GUI 140 includes a query frame 142 for specifying an entity, a matrix frame 144 for listing similar entity fingerprints to the entity specified in the query frame 142, and a headline frame 146 for listing any news items and/or documents that may relate to the entity specified in the query frame 142.

Figure 6:
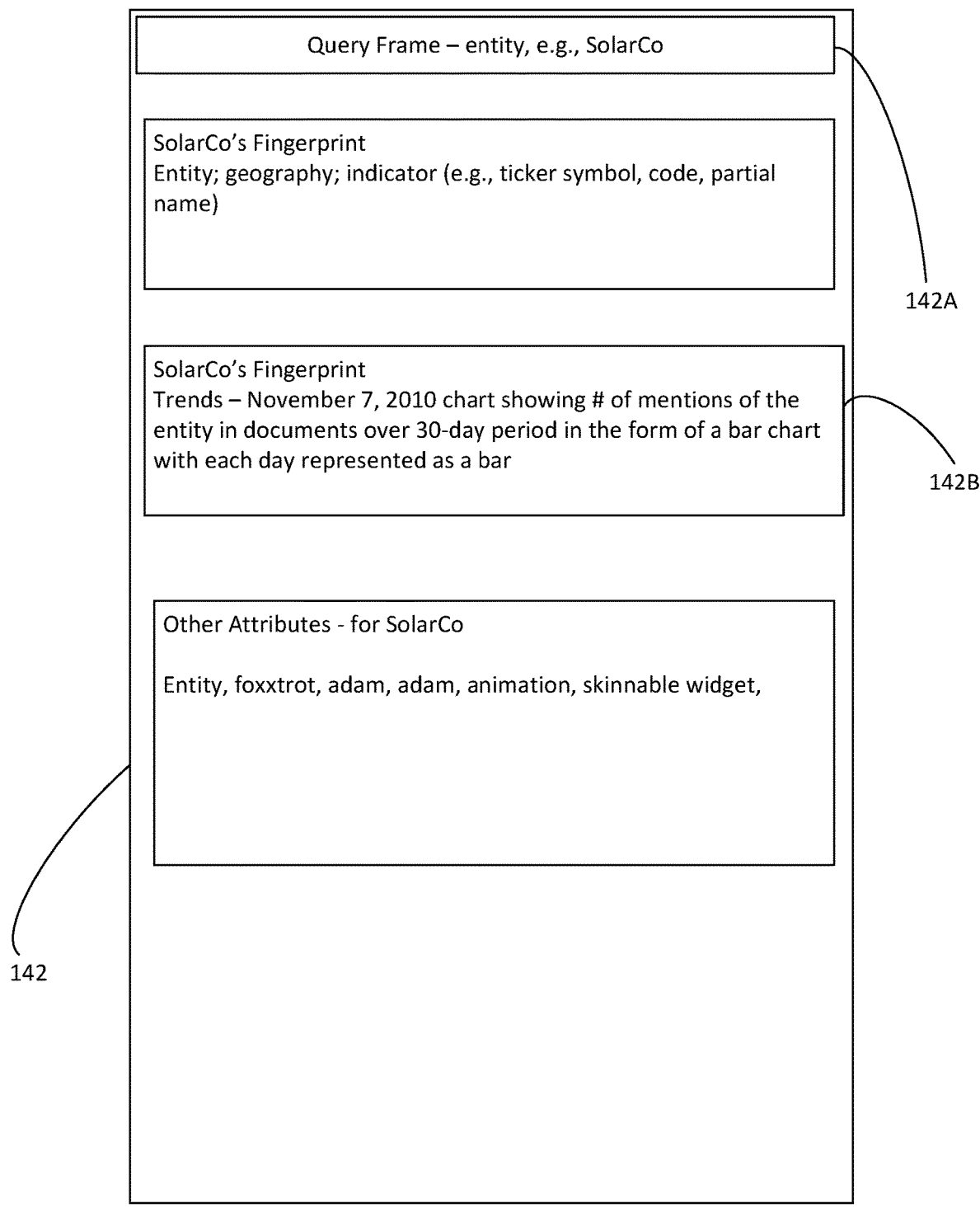
FIG. 6 illustrates an example query frame of the graphical user interface shown in FIG. 5.

Referring to FIG. 6, further details of the query frame 142 are disclosed. As shown in the FIG. 6 example, an input text field 142A is provided that allows a user to specify a unique entity identifier. The unique entity identifier may be, but is not limited to, a ticker symbol, entity code, entity name, or partial entity name. The unique entity identifier is associated with entities modeled in the system. In one embodiment, the input text field 142A is auto suggest enabled for entities of type 'Company'. Upon selecting a magnifying glass or pressing an enter key, the unique entity identifier is received by the fingerprint extraction module 26. The fingerprint extraction module 26 then formulates a query for the entity and returns the entity fingerprint and similar fingerprints for display in the query frame 142, the matrix frame 144, the headline frame 146. As described previously, in one embodiment, an entity fingerprint is a predefined set of characteristics/entities that reflect important aspects of the entity. For example, in the case of an entity of type 'Company', sector membership, related commodities and geographic information may be associated with the entity fingerprint.

In one embodiment, for example, a user is allowed to temporarily remove characteristics/attributes of a fingerprint associated with an entity. Such an action operates as a filter to remove the same criteria from search results displayed in the matrix frame 144 and the headline frame 146. For example if the user removes the entity 'Germany' from an entity fingerprint, any entity displayed in the matrix result frame 144 with the property Germany in its fingerprint is removed.

As shown in the FIG. 6 example, the query frame 142 is configured to include a trend line 142B for the selected query entity (i.e., the entity represented by the entity identifier in the input text field 142A). In one embodiment, the trend line 142B is displayed as a chart with a thirty (30) day history. Each day is represented as a bar and represents a number of documents mentioning the query entity.

Turning now to FIG. 7, the matrix frame 144 displays entities that have been determined by the fingerprint extraction module 26 to have the most shared entities/attributes with the query entity. In one embodiment, the similar entities are ranked by the fingerprint extraction module 26 and then displayed in a list with the most similar entity to the query entity being displayed at the top of the list. In one embodiment, the list is provided with a scroll capability to display multiple similar entities. In another embodiment, each similar entity may be dragged and dropped to the input field 142A of the query frame 142. This operates to replace the original query entity with the dragged entity and update all frames 142, 144, 146 accordingly.

As shown in the FIG. 7 example, each identified similar entity 152, 154, 156 is displayed with its entity name, percentage of attributes in common with the query entity 158, percentage of shared connections with the query entity from the directed graph 160, a number of top connections not shared with the query entity 162, and whether there are any emerging or trending connections for the similar entity 164. In one embodiment, a selectable trend line 166 associated with each similar entity illustrates the number of documents noting the similar entity, per day, for a preset time interval (e.g., the last thirty (30) days).

Figure 9:
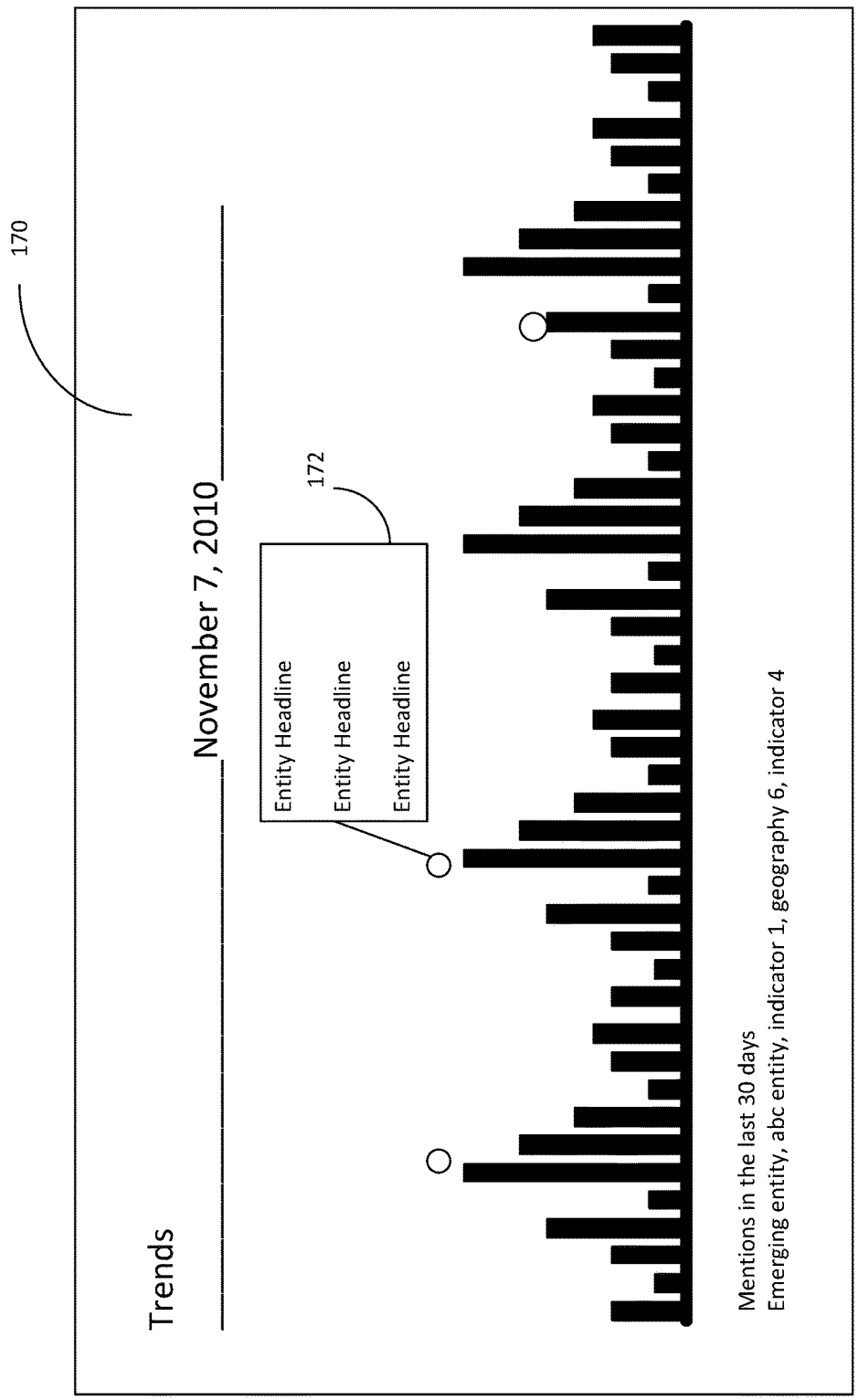
FIG. 9 illustrates a news overlay of the graphical user interface shown in FIG. 5.

Referring now to FIG. 9, upon selection of a trend line 166 from the matrix result frame 144, a large overlay 170 of the trend line 166 is displayed. The overlay allows a user to drill down to specific news events for the entity. As shown in the FIG. 9 example, upon moving a pointing device, such as a mouse, over any bar of the overlay 170 results in a call out 172 being displayed that includes individual headlines relating to the similar entity.

FIG. 8 illustrates the matrix frame 144 having a horizontal grid line 180. As shown in the FIG. 8 example, in one embodiment, a user is able expand the horizontal grid line 180 in the matrix frame 144 by clicking on an arrow 180A next to a value. As shown in the FIG. 8 example, this operates to push displayed results below the grid line 180 resulting in more detailed information on reasons entities have been found similar to each other being presented to the user.

Turning now to FIG. 10, in one embodiment, the headline frame 146 displays a selectable list 146A of the most important headlines/documents for the query entity, as well as all the similar entities displayed in the matrix frame 144, over a predefined time interval. In one embodiment, the selectable list 146A is sorted by time, with the most recent headline/document displayed at the top of the list. Upon moving a pointing device, such as a mouse, over a headline/document, a popup dialog box is displayed listing the headline, a date, and one or more entities the headline/document references.

Figure 11:
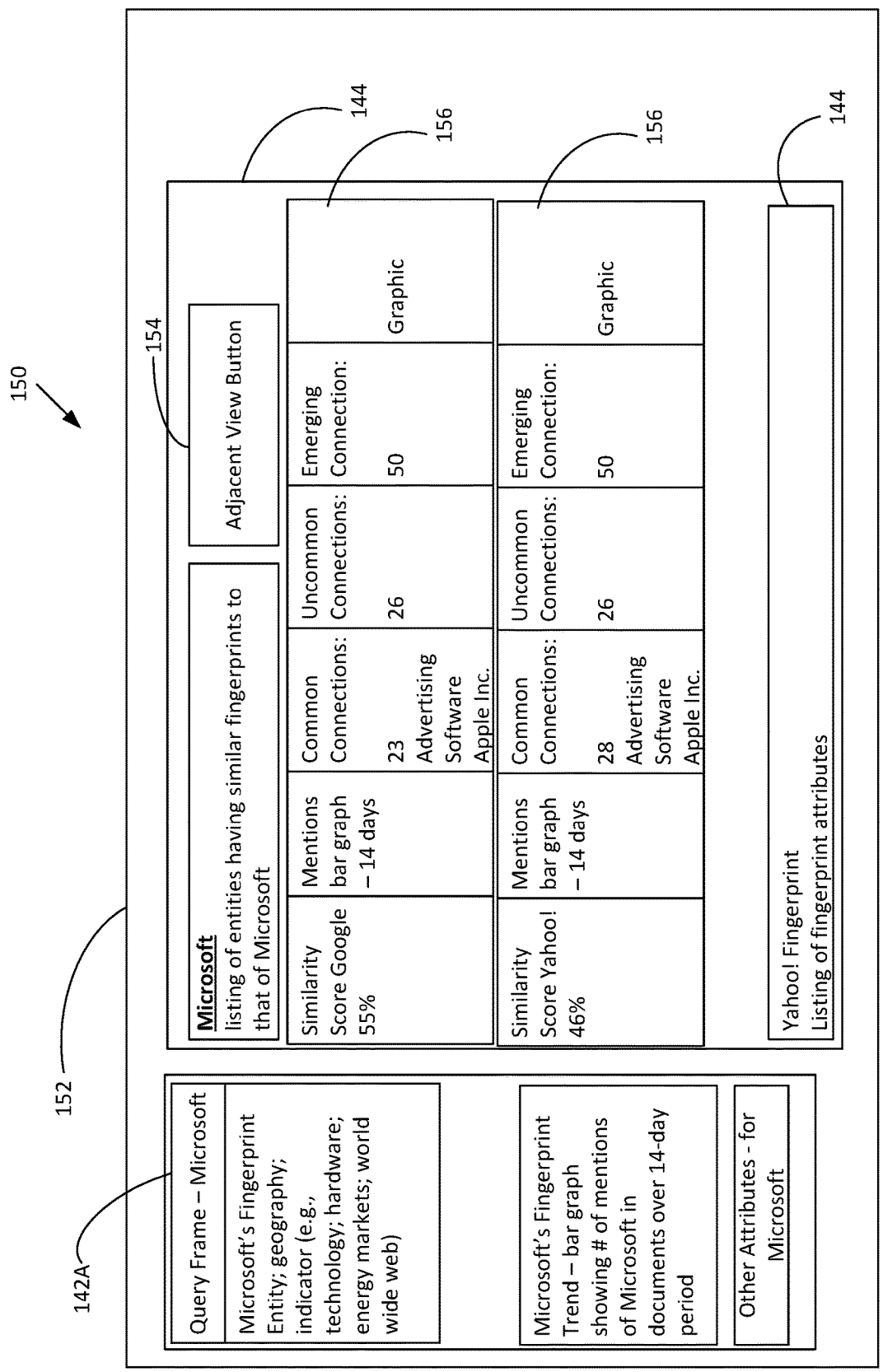
FIG. 11 illustrates an example entity fingerprint display.

Referring now to FIG. 11, an entity fingerprint display 150 is shown having a plurality of adjacent navigation options for accessing an adjacent view of entities. The adjacent view allows a user to view common and uncommon entities and concepts shared between two entities. As shown in the FIG. 11 example, in one embodiment, the adjacent view may be accessed via a push button 154 included in a top navigation menu 152 of the fingerprint display 150 and also via a navigation item 156 associated with each result item of the matrix frame 144.

Figure 12:
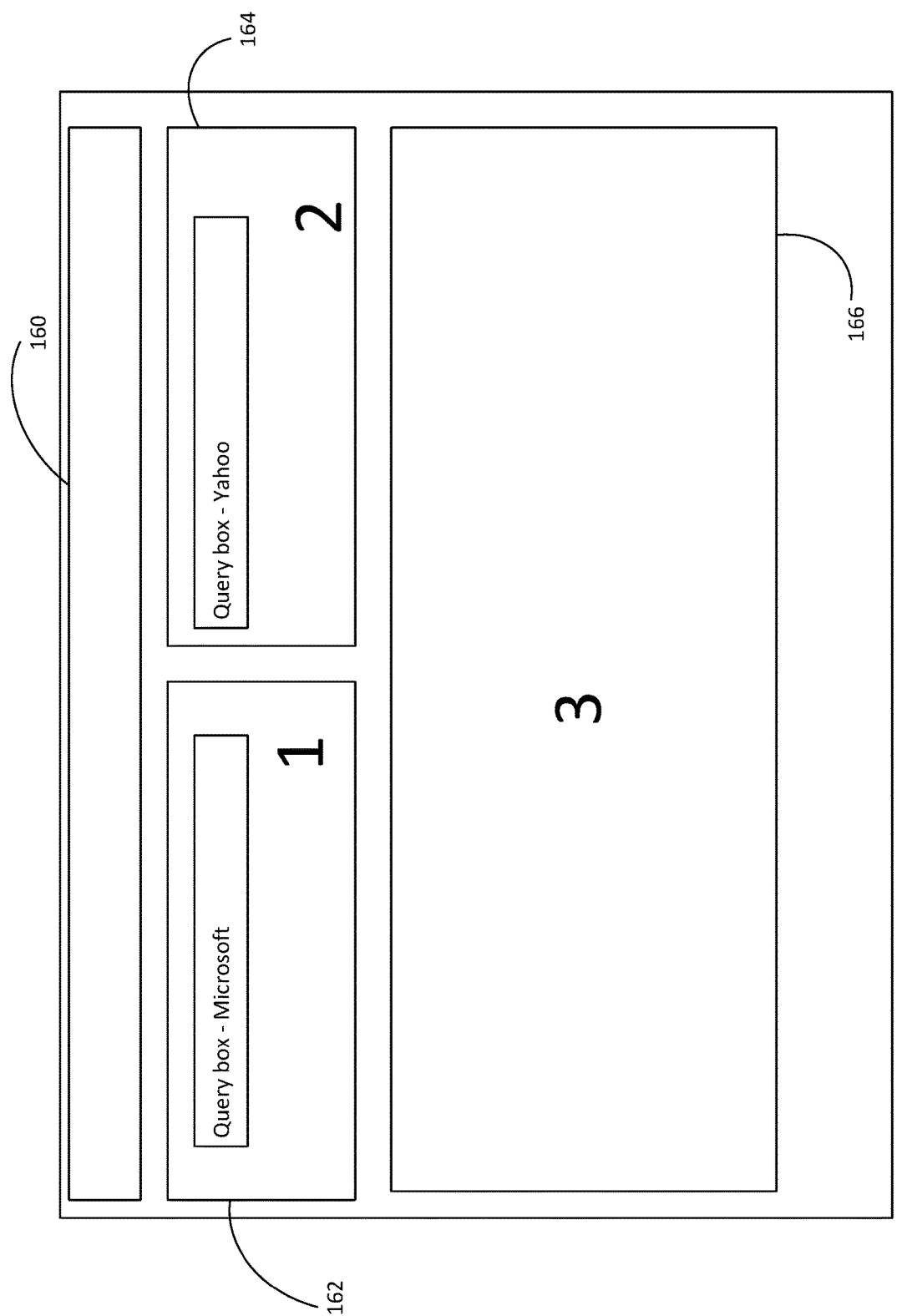
FIG. 12 illustrates a schematic side-by-side display.

FIG. 12 is a schematic of a side-by-side display 160. Referring now to both FIGS. 11 and 12, if the side-by-side display 160 is launched using the push button 154 of the top navigation menu 152, any query entity currently displayed in the input text field 142A of the fingerprint display 150 is passed to the side-by-side display 160. As shown in the FIG. 12 schematic, in one embodiment, the passed query entity is displayed on the left side (area 1) 162 of the side-by-side display 160. If the user has selected one of the result lines of the fingerprint display 150 in the matrix frame 144 (e.g., the entity 'Yahoo' in FIG. 11), the selected entity identifier is sent to the side-by-side display 160 and displayed on the right side (area 2) 164 of the side-by-side display. If the user has not selected any of the items in the matrix frame 144, the right side (area 2) 164 of the side-by-side display 160 remains unpopulated.

If the side-by-side display 160 is launched using a result line item of the matrix frame 144, the query entity displayed in the input text field 142A of the fingerprint display 150 is passed to the side-by-side display 160 and displayed on the left side (area 1) 162 of the side-by-side display 160. The selected result line item is passed to the side-by-side display and displayed on the right side (area 2) 164.

Result area 166 is used to display connection strengths between entities and is discussed in further detail below.

Figure 13:
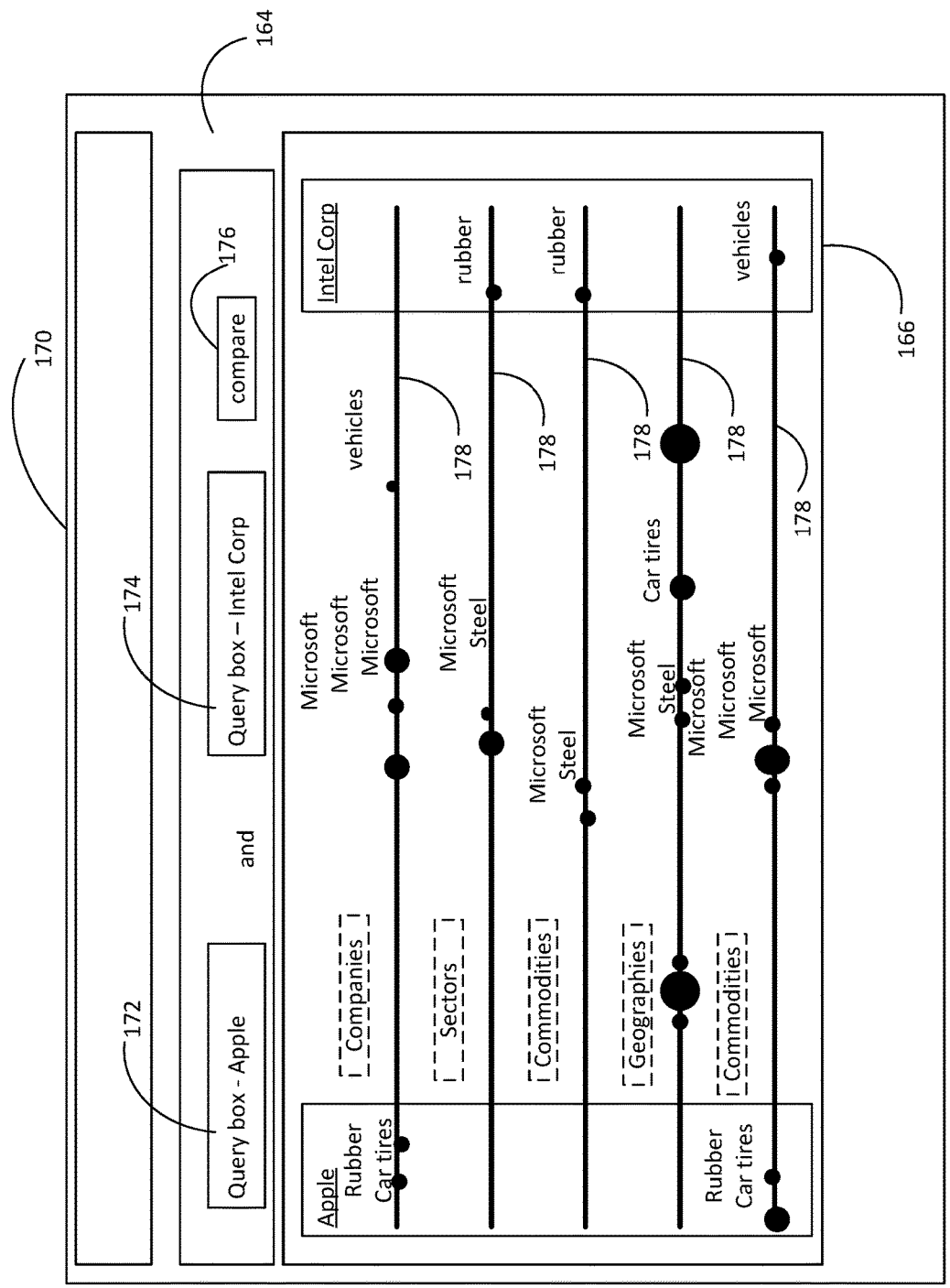
FIG. 13 illustrates an example side-by-side display.

Turning now to FIG. 13, an example side-by-side display 170 showing a first entity identifier 172 ('Apple Inc.') and a second entity identifier 174 ('Intel Corp.') is shown. Upon user selection of a compare button 176, the comparison module 32 Runs a query of the two entities, hereinafter referred to as the 'query entities', and populates the result area 166 with a visual depiction of entity connection strengths between the query entities.

For example, in one embodiment, the result area 166 comprises a number of horizontal lines 178. Each horizontal line 178 represents an entity type, such as but not limited to TRCS sectors, companies, places, commodities, geographies, people, corporate events, and economic indicators, and is populated by the comparison module 32 with a number of entities of the same entity type. In one embodiment, each entity displayed on a horizontal line is represented using a visual indicator, such as a ball.

As shown in the FIG. 13 example, in one embodiment, the query entities operate as 'magnets.' Specifically, if one of the visual indicators representing an entity is primarily related to one of the query entities, the visual indicator is displayed closer to that query entity's side of the result area 166. Entities with the same or similar strength of connections to both entities are displayed toward the middle zone of the result area 166.

The size of the visual indicator may be determined based on the relative importance of the entity to the query entities combined. For example, in one embodiment, referring to the FIG. 13 example, a larger ball depicted in the result area 166 indicates that the entity depicted by the larger ball is of greater importance to the query entities than a ball shown of a smaller dimension.

As shown in the FIG. 13 example, in one embodiment, the visual identifiers are associated with labels that are automatically displayed. In another embodiment, upon user selection of a visual identifier, a label associated with the selected visual identifier is displayed to the user. Further, visual identifiers may be color coded providing different visual aspects of entities being displayed.

Figure 14:
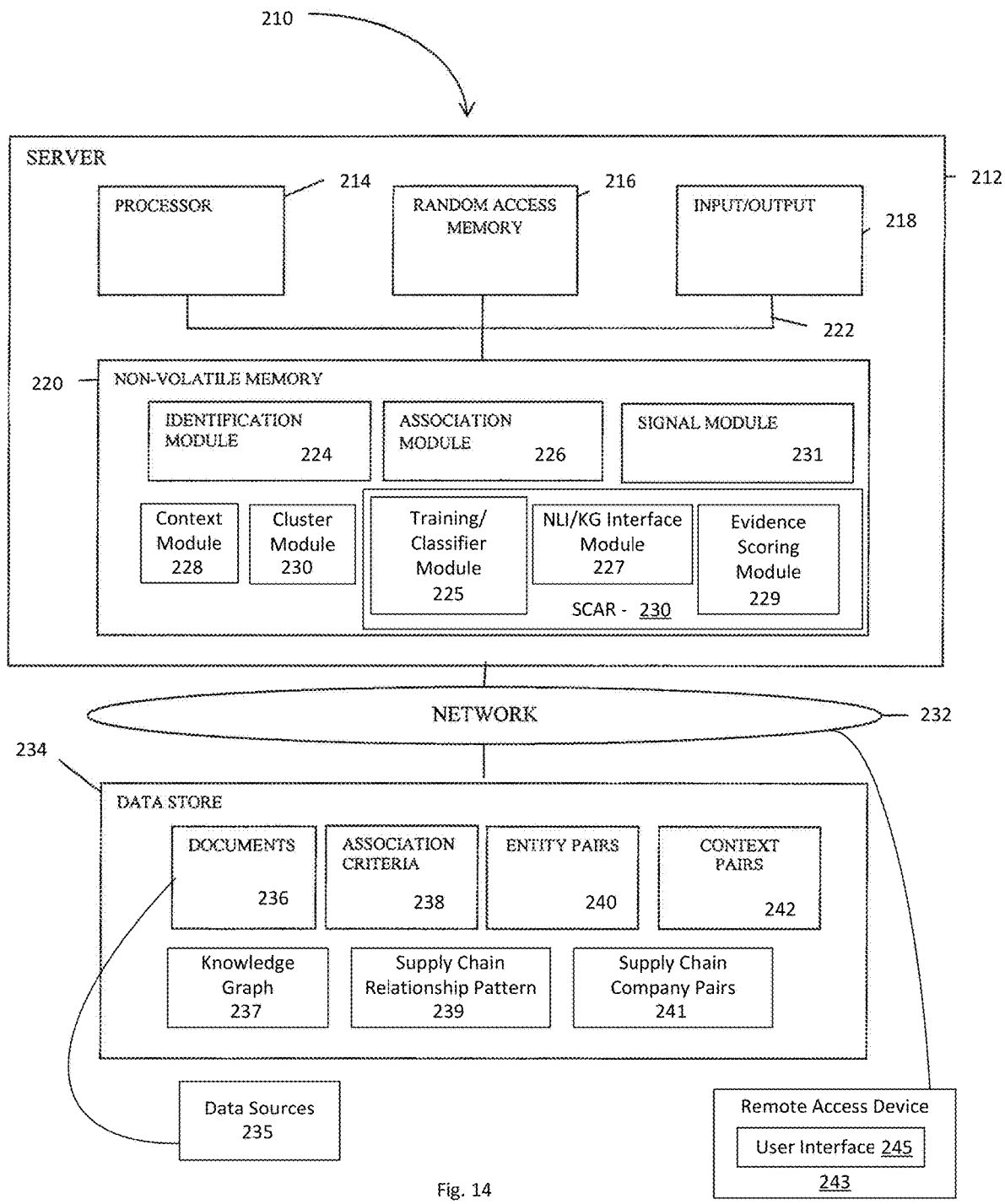
FIG. 14 is a schematic of an exemplary computer-based system for computing connection significance between entities.

Turning now to FIG. 14, an example of a suitable computing system 210 within which embodiments of the present invention may be implemented is disclosed. The computing system 210 is only one example and is not intended to suggest any limitation as to the scope of use or functionality of the invention. Neither should the computing system 210 be interpreted as having any dependency or requirement relating to any one or combination of illustrated components.

For example, the present invention is operational with numerous other general purpose or special purpose computing consumer electronics, network PCs, minicomputers, mainframe computers, laptop computers, as well as distributed computing environments that include any of the above systems or devices, and the like.

The invention may be described in the general context of computer-executable instructions, such as program modules, being executed by a computer. Generally, program modules include routines, programs, objects, components, data structures, loop code segments and constructs, etc. that perform particular tasks or implement particular abstract data types. The invention can be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

In one embodiment, with reference to FIG. 14, the system 210 includes a server device 212 configured to include a processor 214, such as a central processing unit ('CPU'), random access memory ('RAM') 216, one or more input-output devices 218, such as a display device (not shown) and keyboard (not shown), and non-volatile memory 220, all of which are interconnected via a common bus 222 and controlled by the processor 214.

As shown in the FIG. 14 example, in one embodiment, the non-volatile memory 220 is configured to include an identification module 224 for identifying entities from one or more sources. The entities identified may include, but are not limited to, organizations, people, products, industries, geographies, commodities, financial indicators, economic indicators, events, topic codes, subject codes, unique identifiers, social tags, industry terms, general terms, metadata elements, and classification codes. An association module 226 is also provided for computing a significance score for an association between entities, the significance score being an indication of the level of significance a second entity to a first entity.

In one embodiment, a context module 228 is provided for determining a context (e.g., a circumstance, background) in which an identified entity is typically referenced in or referred to, a cluster module 230 for clustering (e.g., categorizing) identified entities, and a signal module 231 for generating and transmitting a signal associated with the computed significance score. Additional details of these modules 224, 226, 228, 230 and 232 are discussed in connection with FIGS. 15, 16 and 17.

Figure 20:
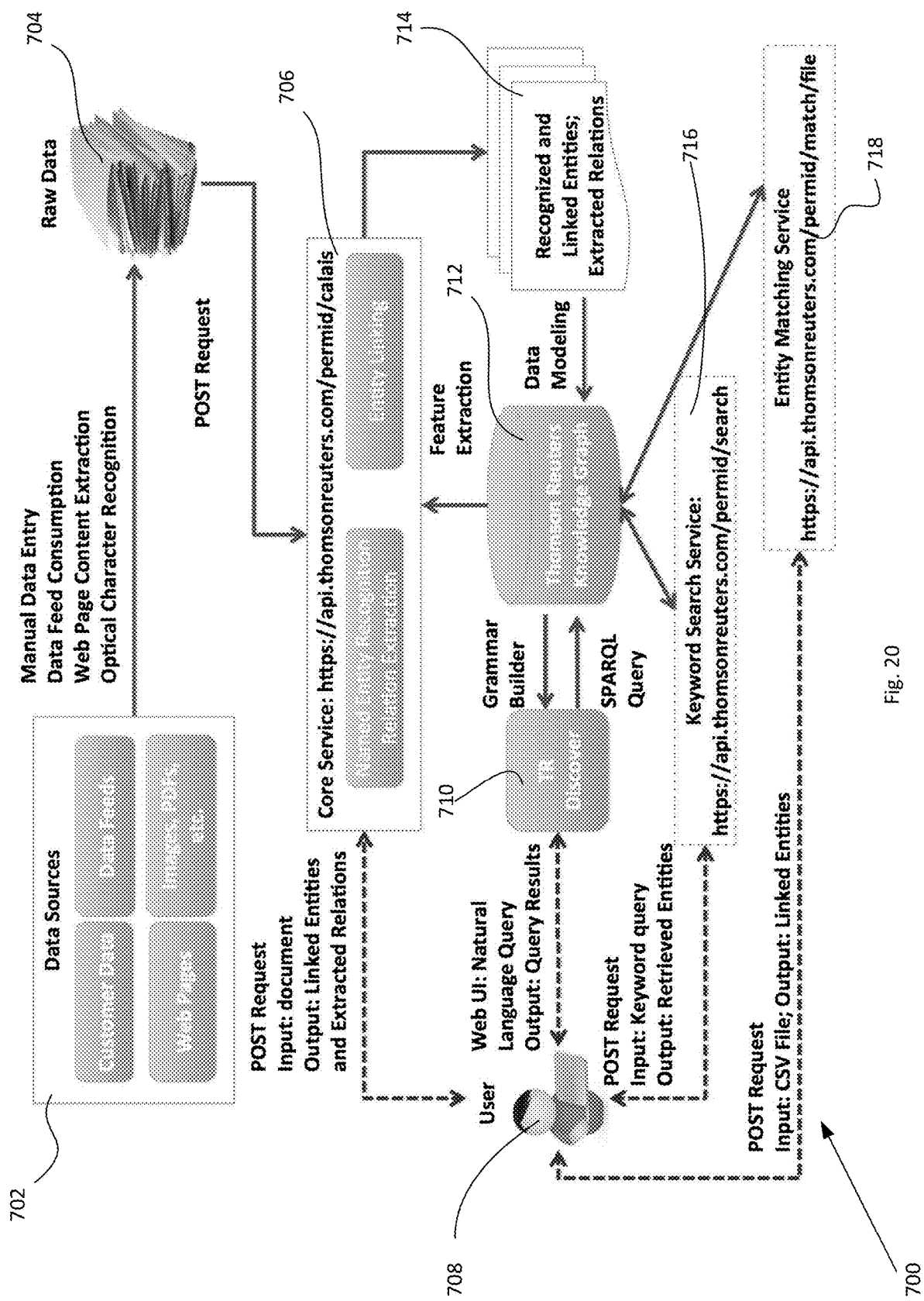

In a further embodiment, Server 212 may include in non-volatile memory 220 a Supply Chain Analytics & Risk "SCAR" (aka "Value Chains") engine 223, as discussed in detail hereinbelow, in connection with determining supply chain relationships among companies and providing other enriching data for use by users. SCAR 223 includes, in this example, a training/classifier module 225, Natural Language Interface/Knowledge Graph Interface Module 227 and Evidence Scoring Module 229 for generating and updating Knowledge Graphs associated with companies. The training/classifier module 225 may be a machine-learning classifier configured to predict the probability of possible customer/supplier relationships between an identified company-pair. The classifier may use set(s) of patterns as filters and extract feature sets at a sentence-level, e.g., context-based features such as token-level n-grams and patterns. Other features based on transformations and normalizations and/or information from existing Knowledge Graph data may be applied at the sentence-level. Evidence Scoring Module 229 may be used to score the detected and identified supply-chain relationship candidate sentence/company pair and may include an aggregator, discussed in detail below, to arrive at an aggregate evidence score. The SCAR 225 may then update the Knowledge Graph(s) associated with one or both of the companies of the subject company-pair. In one exemplary manner of operation, the SCAR 223 may be accessed by one or more remote access device 243. A user interface 245 operated by a user at access device 243 may be used for querying or otherwise interrogating the Knowledge Graph via Natural Language Interface/Knowledge Graph Interface Module 227 for responsive information, e.g., use of SPARQL query techniques. Responsive data outputs may be generated at the Server 212 and returned to the remote access device 243 and presented and displayed to the associated user. FIG. 20 illustrates several exemplary input/output scenarios.

As shown in FIG. 14, in one embodiment, a network 232 is provided that can include various devices such as routers, server, and switching elements connected in an Intranet, Extranet or Internet configuration. In one embodiment, the network 232 uses wired communications to transfer information between an access device (not shown), the server device 212, and a data store 234. In another embodiment, the network 232 employs wireless communication protocols to transfer information between the access device, the server device 212, and the data store 234. In yet other embodiments, the network 232 employs a combination of wired and wireless technologies to transfer information between the access device, the server device 212, and the data store 234.

The data store 234 is a repository that maintains and stores information utilized by the before-mentioned modules 224, 226, 228, 230 and 231. In one embodiment, the data store 234 is a relational database. In another embodiment, the data store 234 is a directory server, such as a Lightweight Directory Access Protocol ('LDAP'). In yet another embodiment, the data store 234 is an area of non-volatile memory 220 of the server 212.

In one embodiment, as shown in the FIG. 14 example, in one embodiment, the data store 234 includes a set of documents 236 that are used to identify one or more entities. As used herein, the words 'set' and 'sets' refer to anything from a null set to a multiple element set. The set of documents 236 may include, but are not limited to, one or more papers, memos, treatises, news stories, articles, catalogs, organizational and legal documents, research, historical documents, policies and procedures, business documents, and combinations thereof. In another embodiment, the data store 234 includes a structured data store, such as a relational or hierarchical database, that is used to identify one or more entities. In yet another embodiment, sets of documents and structured data stores are used to identify one or more entities.

A set of association criteria 238 is provided that comprises contingency tables used by the association module 226 to compute a significance score for an identified relationship between entities. In one embodiment, the contingency tables are associated with a set of interestingness measures that are used by the association module 226 to compute the significance score. An example of interestingness measures, along with each respective formulation, is shown in connection with FIG. 17.

The data store 234 also includes a set of entity pairs 240. Each pair included in the set of entity pairs 240 represents a known relationship existing between at least two identified entities. In one embodiment, the relationship is identified by an expert upon reviewing one of the set of documents 236. In another embodiment, the relationship is identified from the one or more set of documents 236 using a computer algorithm included in the context module 228. For example, upon reviewing a news story, an expert and/or the context module 228 may identify the presence of two entities occurring in the same news story, As shown in FIG. 14, in one embodiment, a set of context pairs 242 are also provided. Each of the set of context pairs 242 represents a context that exists between at least two entities. For example, whenever a particular topic or item is discussed in a news story, the two entities also are mentioned in the same news story. Similar to the set of entity pairs 240 discussed previously, the set of context pairs may also be identified by an expert, or a computer algorithm included in the context module 228. Additional details concerning information included in the data store 234 are discussed in greater detail below.

In the further embodiment of Server 212 having SCAR 223, data store 234 also includes Knowledge Graph store 237, Supply Chain Relationship Pattern store 239 and Supply Chain Company Pair store 241. Documents store 236 receives document data from a variety of sources and types of sources including unstructured data that may be enhanced and enriched by SCAR 223. For example, data sources 235 may include documents from one or more of Customer data, Data feeds, web pages, images, PDF files, etc., and may involve optical character recognitions, data feed consumption, web page extraction, and even manual data entry or curation. SCAR 223 may then pre-process the raw data from data sources including, e.g., application of OneCalais or other Named Entity Recognition (NER), Relation Extraction (ER), or Entity Linking (EL), processes. These processes are described in detail below.

Although the data store 234 shown in FIG. 14 is connected to the network 232, it will be appreciated by one skilled in the art that the data store 234 and/or any of the information shown therein, can be distributed across various servers and be accessible to the server 212 over the network 232, be coupled directly to the server 212, or be configured in an area of non-volatile memory 220 of the server 212.

Further, it should be noted that the system 210 shown in FIG. 14 is only one embodiment of the disclosure. Other system embodiments of the disclosure may include additional structures that are not shown, such as secondary storage and additional computational devices. In addition, various other embodiments of the disclosure include fewer structures than those shown in FIG. 14. For example, in one embodiment, the disclosure is implemented on a single computing device in a non-networked standalone configuration. Data input and requests are communicated to the computing device via an input device, such as a keyboard and/or mouse. Data output, such as the computed significance score, of the system is communicated from the computing device to a display device, such as a computer monitor.

Figure 15:
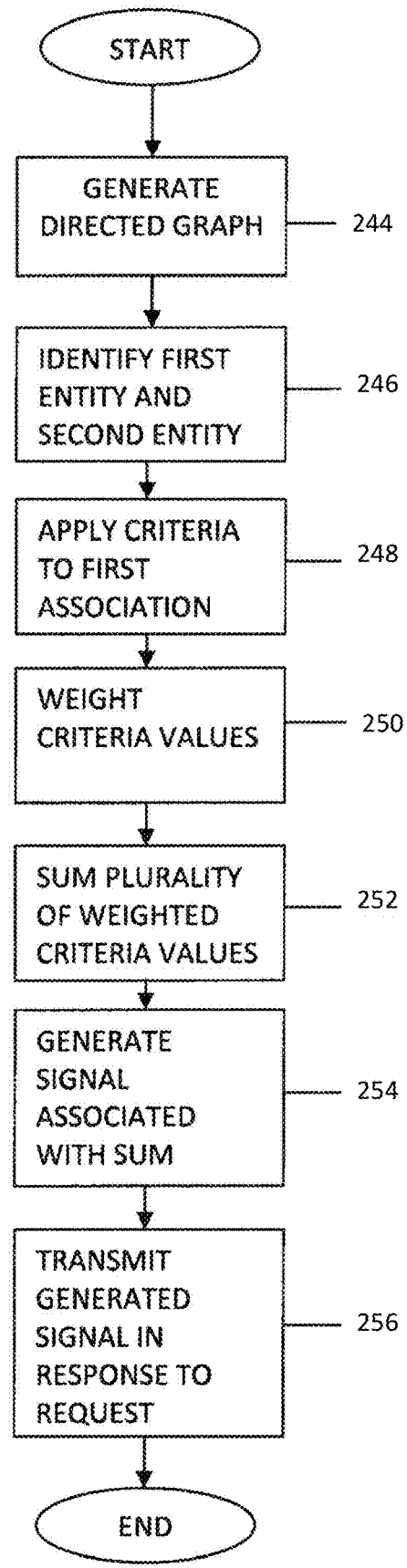
FIG. 15 illustrates an exemplary method for determining connection significance between entities according to one embodiment of the invention.

Turning now to FIG. 15, an example method for determining connection significance between entities is disclosed. As shown in the FIG. 15 example, at step 244, the identification module 224 first generates a directed graph to represent entities identified in each of the set of documents 236. In one embodiment, the identification module 224 determines a frequency and co-occurrence of each entity in each of the set of documents 236, and then generates a contingency table to record and determine associations. The set of documents may be structured documents, including but not limited to eXtensible Markup Language (XML) files, as well as unstructured documents including, but not limited to articles and news stories. As described previously, the present invention is not limited to only using a set of documents to identify entities. For example, the present invention may use structured data stores including, but not limited to, relational and hierarchical databases, either alone or in combination with the set of documents to identify entities.

Further, it will be appreciated that the present invention is not limited to a directed graph implementation, and that other computer-implemented data structures capable of modeling entity relationships may be used with the present invention, such as a mixed graph and multi graph.

Figure 16:
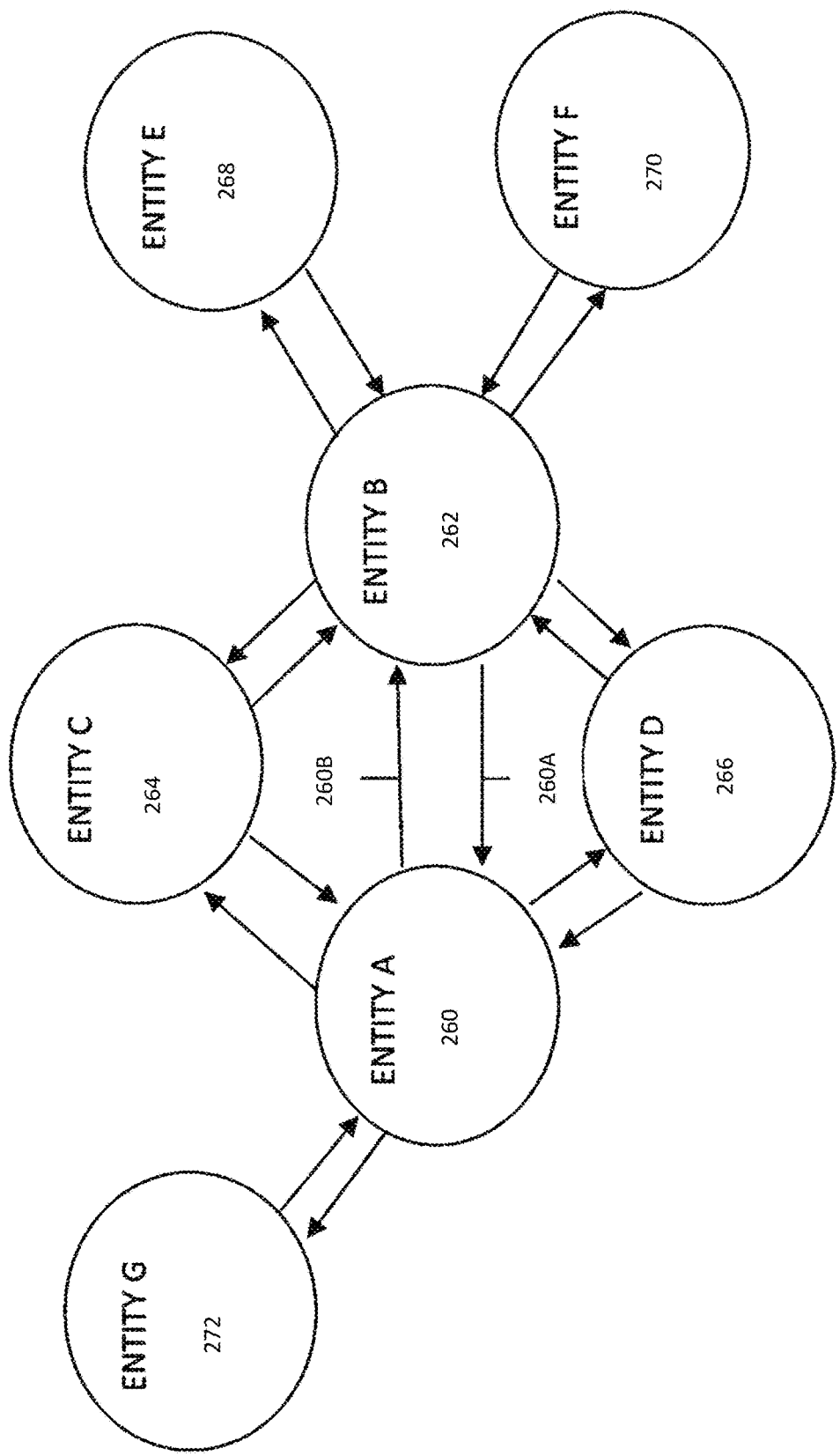
FIG. 16 is a schematic of an exemplary directed graph.

A schematic of an exemplary directed graph generated by the identification module 224 is shown in connection with FIG. 16. Each node 260, 262, 264, 266, 268, 270 and 272 of the graph represents an entity identified from one or more of the set of documents, and vertices (e.g., edges) of each node represent an association (e.g., relationship) between entities. For example, as shown in the FIG. 16 example, Entity A 260 has a first association 260A with Entity B 262 indicating a level of significance of Entity B 262 to Entity A 260, and a second association 260B with Entity B 262 indicating a level of significance of Entity A 260 to Entity B 262.

Referring back to FIG. 15, at step 246, the identification module 224 next identifies a first entity and at least one second entity from the directed graph. In one embodiment, the first entity is included in a user request and the second entity is determined by the identification module 224 using a depth-first search of the generated graph. In another embodiment, the identification module 224 uses the depth-first search on each node (e.g., first entity) of the graph to determine at least one other node (e.g., second entity).

Next, at step 248, once the first entity and second entity are identified, the association module 226 applies a plurality of association criteria 238 to one of the associations between the first entity and the second entity. The plurality of association criteria 238 include, but are not limited to, the following set of criteria: interestingness, recent interestingness, validation, shared neighbor, temporal significance, context consistency, recent activity, current clusters, and surprise element. Once the association criteria are applied, the association module 228 assigns criteria values to each of the association criteria.

For example, in one embodiment, the association module 226 may apply the interestingness criteria to the first association. Interestingness criteria are known to one skilled in the art and as a general concept, may emphasize conciseness, coverage, reliability, peculiarity, diversity, novelty, surprisingness, utility, and actionability of patterns (e.g., relationships) detected among entities in data sets. In one embodiment, the interestingness criteria is applied by the association module 226 to all associations identified from the set of documents 236 and may include, but is not limited to, one of the following interestingness measures: correlation coefficient, Goodman-Kruskal's lambda ($\lambda$), Odds ratio ($\alpha$), Yule's Q, Yule's Y, Kappa ($\kappa$), Mutual Information (M), J-Measure (J), Gini-index (G), Support (s), Confidence (c), Laplace (L), Conviction (V), Interest (I), cosine (IS), Piatetsky-shaporo's (PS), Certainty factor (F), Added Value (AV), Collective Strength (S), Jaccard Index, and Klosgen (K). Once the interestingness criteria is applied to the first association, the association module 226 assigns a value to the interestingness criteria based on the interestingness measure.

A list of example interestingness measures with accompanied formulas used by the association module 226 is shown is shown in connection with FIG. 17. As shown in the FIG. 17 example, one of the interestingness measures includes a correlation coefficient (1-coefficient) that measures the degree of linear interdependency between a pair of entities, represented by A and B in FIG. 17, respectively. The correlation coefficient is defined by the covariance between two entities divided by their standard deviations. The correlation coefficient equals zero (0) when entity A and entity B are independent and may range from minus one (−1) to positive one (+1).

In one embodiment, the association module 226 applies the recent interestingness criteria to the first association. The recent interestingness criteria may be applied by the association module 226 to associations identified from a portion of the set of documents 236 and/or a portion of a structured data store. The portion may be associated with a configurable pre-determined time interval. For example, the association module 226 may apply the recent interestingness criteria to only associations between entities determined from documents not older than six (6) months ago. Similar to the before-mentioned interestingness criteria, the recent interestingness criteria may include, but is not limited to, one of the following interestingness measures: correlation coefficient, Goodman-Kruskal's lambda ($\lambda$), Odds ratio (a), Yule's Q, Yule's Y, Kappa ($\kappa$), Mutual Information (M), J-Measure (J), Gini-index (G), Support (s), Confidence (c), Laplace (L), Conviction (V), Interest (I), cosine (IS), Piatetsky-shaporo's (PS), Certainty factor (F), Added Value (AV), Collective Strength (S), Jaccard Index, and Klosgen (K). Once the recent interestingness criteria is applied to the first association, the association module 226 assigns a value to the recent interestingness criteria based on the interestingness measure.

The association module 226 may apply the validation criteria to the first association. In one embodiment, the association module 226 determines whether the first entity and the second entity co-exist as an entity pair in the set of entity pairs 240. As described previously, each of the entity pairs defined in the set of entity pairs 240 may be previously identified as having a relationship with one another. Based on the determination, the association module 226 assigns a value to the validation criteria indicating whether or not the first entity and the second entity exist as pair entities in the set of entity pairs 240.

The association module 226 may apply the shared neighbor criteria to the first association. In one embodiment, the association module 226 determines a subset of entities having edges extending a pre-determined distance from the first entity and the second entity. The subset of entities represents an intersection of nodes neighboring the first and second entity. The association module 226 then computes an association value based at least in part on a number of entities included in the subset of entities, and assigns a value to the shared neighbor criteria based on the computed association value.

For example, referring to FIG. 16 and assuming a pre-determined distance (e.g., a hop) of one (I) between entities in the graph, the shared entities (e.g., neighboring entities) between Entity A 260 and Entity B 262 are Entity C 264 and Entity D, resulting in a computed association value of two (2) which is assigned to the shared neighbor criteria. As shown in the FIG. 16 example, Entity E 268 and Entity F 270 are more than the pre-determined distance from Entity A 260, and Entity G 272 is more than the predetermined distance from Entity B 262.

Referring back to FIG. 15, at step 248, the association module 226 may apply the temporal significance criteria to the first association. In one embodiment, the association module 226 applies interestingness criteria to the first association as determined by a first portion of the set of documents and/or a first portion of a structured data store. The first portion is associated with a first time interval. The association module 226 then applies interestingness criteria to the first association as determined by a second portion of the set of documents and/or a second portion of the structured data store. The second portion associated with a second time interval different from the first time interval. The interestingness criteria may include, but is not limited to, one of the following interestingness measures: correlation coefficient, Goodman-Kruskal's lambda (i), Odds ratio (a), Yule's Q, Yule's Y, Kappa (K), Mutual Information (M), i-Measure (J), Gini-index (G), Support (s), Confidence (c), Laplace (L), Conviction (V), Interest (I), cosine (IS), Piatetsky-shaporo's (PS), Certainty factor (F), Added Value (AV), Collective Strength (S), Jaccard index, and Klosgen (K).

Once the temporal significance criteria is applied, the association module 226 determines a difference value between a first interestingness measure associated with the first time interval and a second interestingness measure associated with the second time interval. The association module 226 then assigns a value to the temporal significance criteria based on the determined difference value.

The association module 226 may apply the context consistency criteria to the first association. In one embodiment, the association module 226 determines a frequency of the first entity and the second entity occurring in a context of each document of the set of documents 236. The context may include, but is not limited to, organizations, people, products, industries, geographies, commodities, financial indicators, economic indicators, events, topics, subject codes, unique identifiers, social tags, industry terms, general terms, metadata elements, classification codes, and combinations thereof. The association module 226 then assigns a value to the context consistency criteria based on the determined frequency.

The association module 226 also may apply the recent activity criteria to the first association. For example, in one embodiment, the association module 226 computes an average of occurrences of the first entity and the second entity occurring in one of the set of documents 236 and/or the structured data store. The association module 226 then compares the computed average of occurrences to an overall occurrence average associated with other entities in a same geography or business. One the comparison is completed, the association module 226 assigns a value to the recent activity criteria based on the comparison. In various embodiments, the computed average of occurrences and/or the overall occurrence average are seasonally adjusted.

The association module 226 may also apply the current clusters criteria to the first association. In one embodiment, identified entities are clustered together using the clustering module 230. The clustering module 230 may implement any clustering algorithm known in the art. Once entities are clustered, the association module 226 determines a number of clusters that include the first entity and the second entity. The association module 226 then compares the determined number of clusters to an average number of clusters that include entity pairs from the set of context pairs 242 and which do not include the first entity and the second entity as one of the entity pairs. In one embodiment, the defined context is an industry or geography that is applicable to both the first entity and the second entity. The association module 226 then assigns a value to the current cluster criteria based on the comparison.

The association module 226 may also apply the surprise element criteria to the first association. In one embodiment, the association module 226 compares a context in which the first entity and the second entity occur in a prior time interval associated with a portion of the set of documents and/or a portion of the structured data store, to a context in which the first entity and the second entity occur in a subsequent time interval associated with a different portion of the set of documents and/or the structured data store. The association module 226 then assigns a value to the surprise element criteria based on the comparison.

Referring to FIG. 15, once the plurality of criteria are applied to the first association, at step 250, the association module 226 weights each of the plurality of criteria values assigned to the first association. In one embodiment, the association module 226 multiplies a user-configurable value associated with each of the plurality of criteria with each of the plurality of criteria values, and then sums the plurality of multiplied criteria values to compute a significance score. As discussed previously, the significance score indicates a level of significance of the second entity to the first entity. In another embodiment, the association module 226 multiplies a pre-defined system value associated with each of the plurality of criteria, and then sums the plurality of multiplied criteria values to compute the significance score.

Once the significance score is computed, at step 254, the signal module 232 generates a signal including the computed significance score. Lastly, at step 256, the signal module 232 transmits the generated signal. In one embodiment, the signal module 232 transmits the generated signal in response to a received request.

Figure 18:
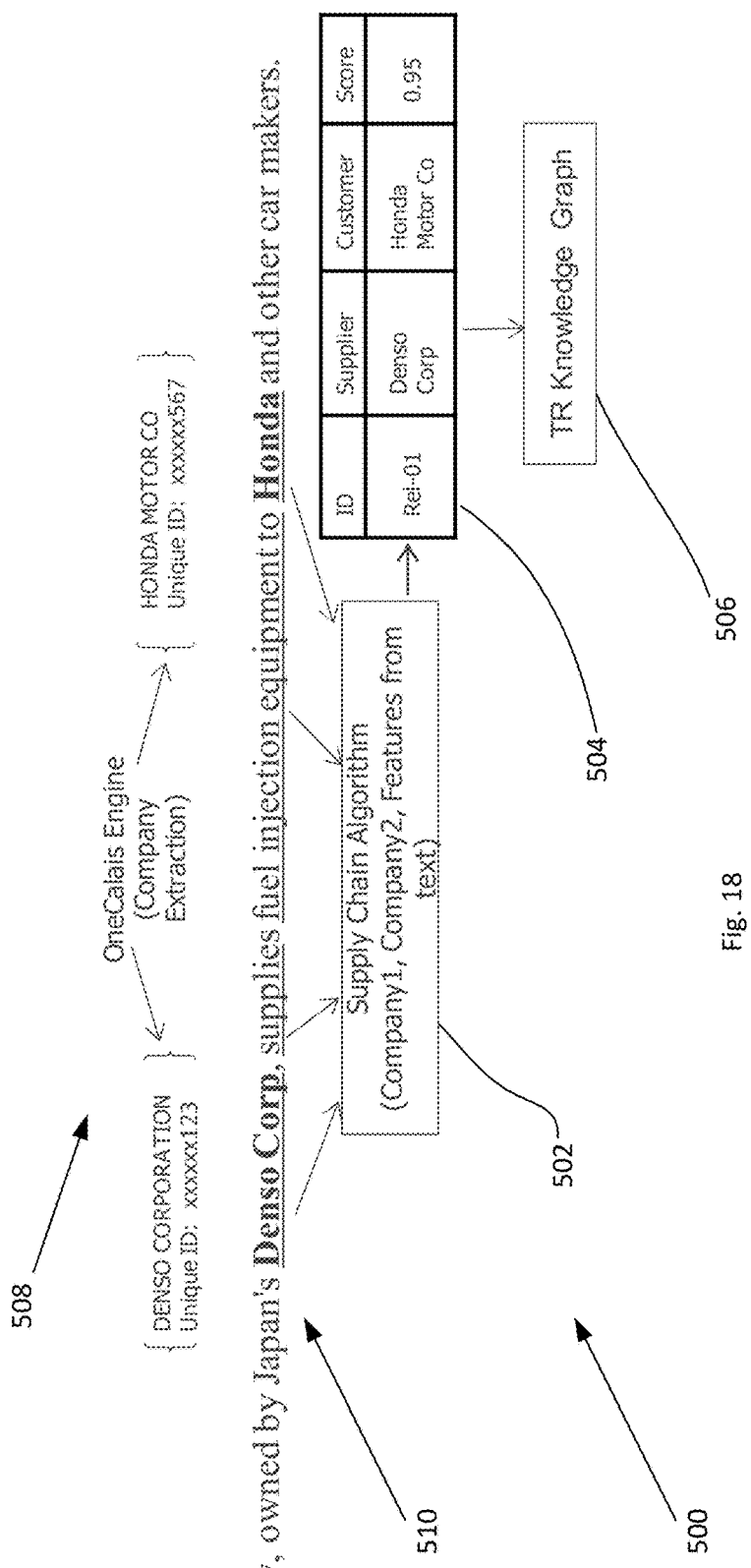
FIG. 18 is an exemplary process flow according to the present invention.

A further invention aspect provides a SCAR comprising at the core an automated (machine learning based) relation extraction system that automatically identifies pairs of companies that are related in a supplier-customer relationship and also identifies the supplier and the customer in the pair. The system then feeds this information to the Thomson Reuters knowledge graph. Currently, the system extracts these pairs from two sources of text data, namely:
1) News
2) SEC Filings FIG. 18 illustrates an exemplary process flow 500 of the present invention characterized by 1) value/supply chains: supplier-customer relationship 502; 2) machine learning-based system 504; 3) classification 506—identify a pair of companies or sets of companies in a sentence and identify direction, e.g., A supplying B or B supplying A. More specifically, the process may include as Step 1: 1) Named Entity Recognition, e.g., applying TR OneCalais Engine 508 to extract company names—Denso Corp and Honda 510, 2) break textual information from a document or source into discrete sentences, 3) mark only those sentences that have at least two companies; 4) anaphora resolution like 'we', 'the company', etc. For example, Apple announced its 3rd quarter results yesterday—excluded; Toyota Corp is an important Client of GoodYear Inc—included.

The SCAR process may further include as Step 2—Patterns identification (High recall low precision), which may include: 1) use patterns to extract sentences that are potentials for identifying value chains; 2) 'supply', 'has sold', 'customers(\s+)include', 'client', 'provided', etc.; 3) removes lot of noise; and 4) retain only those sentences that have two companies and at least one pattern matched. Examples of treatment of three identified sentences: 1) Prior to Apple, he served as Vice President, Client Experience at Yahoo—included; 2) Toyota Corp is an important Client of GoodYear Inc—included; 3) Microsoft share in the smartphone market is significantly less than Google—excluded.

The SCAR process may further include as Step 3—Run a Classifier to identify value chains and may include: 1) train a classifier that classifies each sentence; 2) prefer higher precision over recall; and 3) classifier: Logistic Regression. Examples of this operation follow: 1) Prior to Apple, he served as Vice President, Client Experience at Yahoo: 0.005; and 2) Toyota Corp is an important Client of GoodYear Inc: 0.981. The machine learning (ML)-based classifier may involve use of positive and negative labeled documents for training purposes. Training may involve nearest neighbor type analysis based on computed similarity of terms or words determined as features to determine positiveness or negativeness. Inclusion or exclusion may be based on threshold values. A training set of documents and/or feature sets may be used as a basis for filtering or identifying supply-chain candidate documents and/or sentences. Training may result in models or patterns to apply to an existing or supplemented set(s) of documents.

The SCAR process may further include as Step 4—Aggregate all evidences on a Company Pair. Examples of evidences are: 1) Toyota Corp is an important Client of GoodYear Inc: 0.981; 2) GoodYear sold 50 M cargo to Toyota in 2015: 0.902; and 3) Toyota mentioned that it agreed to buy tyres from GoodYear Inc: 0.947. The aggregate of the evidence is represented as: GoodYear (Supplier)—Toyota (Customer)→0.99 (aggregated score).

As used herein Evidence at the Sentence Level refers to the quality of the classification model that classifies a pair of companies at a sentence level. At a Company Pair Level, for each company pair, all the sentences/evidences above a threshold are chosen and a model calculates an aggregated score for the pair.

Given a text, the system performs Named Entity Recognition on it using Thomson Reuters OneCalais to identify and extract all company mentions. It then identifies and/or breaks the text to sentences. For each sentence that contains a pair of companies, a "company-pair," (also called evidence text), the system at its core uses a machine learning classifier that predicts the probability of a possible relationship for the given pair of companies in the context of this sentence. The system then aggregates all the evidences for each pair of relationship and creates a final probability score of a relationship between the two companies, which in turn is fed to Thomson Reuters knowledge graph to be used for various applications. The system is able to build a graph of all companies with their customers and suppliers extracted from these text data sources.

Figure 19:
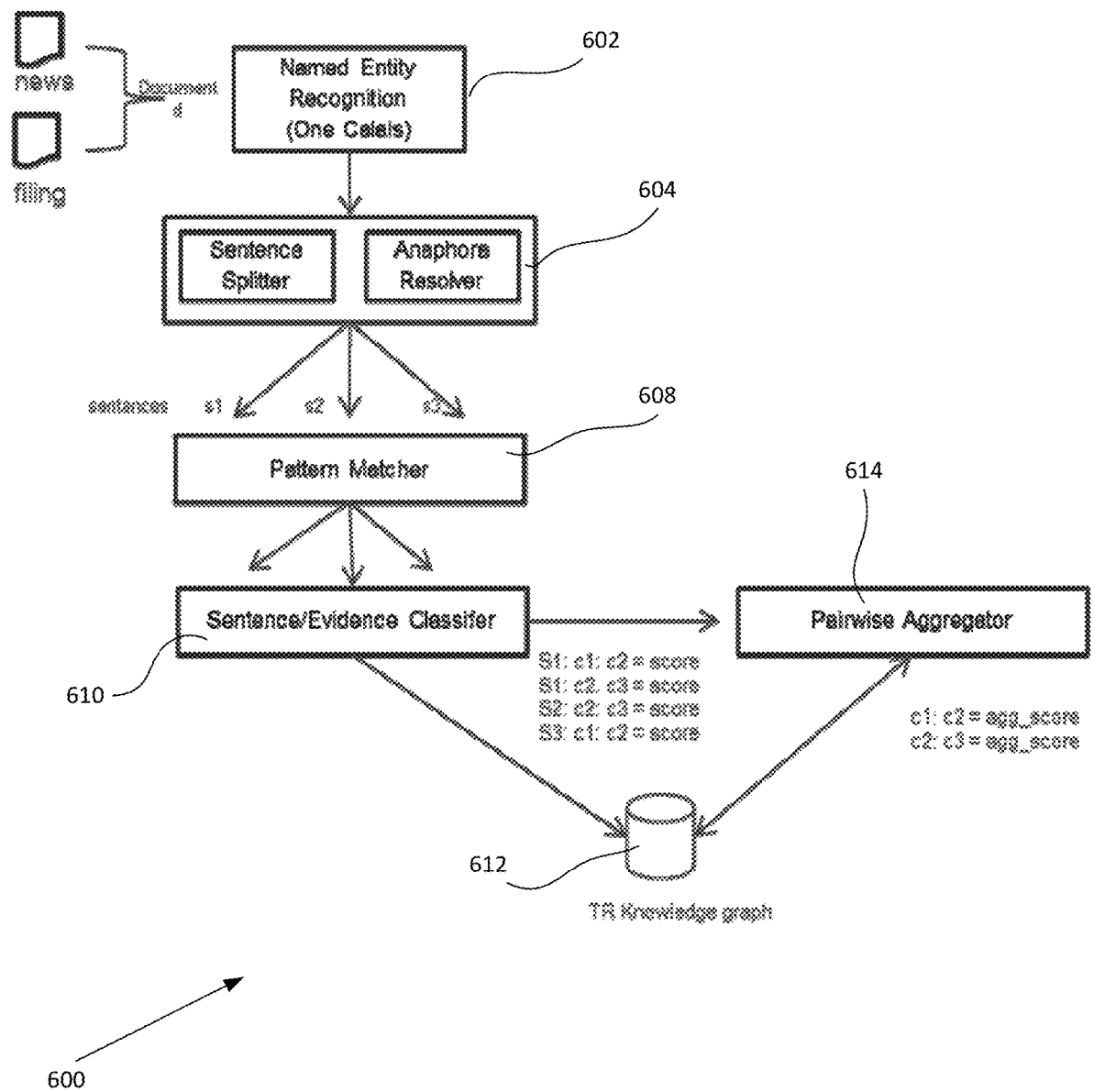
FIG. 19 is a is a schematic diagram representing in more detail an exemplary architecture according to the present invention FIG. 20 provides an overall architecture of an exemplary embodiment of the SCAR system according to the present invention.

FIG. 19 is a schematic diagram representing in more detail an exemplary architecture 600 for use in implementing the invention.

Named Entity Recognition/Extraction (Companies)—The first step by named entity recognition 602 of the system is to identify/extract companies appearing in the text. This requires running Entity extraction to tag all the companies mentioned in the source text (news or filings document). The system, in this exemplary embodiment, uses Thomson Reuters (TR) OneCalais to tag all the companies mentioned. At the end of this step, all the companies are identified and, in this example, also resolved to a TR PermId (in this context, a unique company identifier). Using the PermId, we can later use additional metadata about the company, from TR's organization authority and knowledge bases (e.g. industry, public/private).

Anaphora Resolution for Companies—The sentence splitter and anaphora resolver 604 is the next component in the process and system. In many sentences in the source text a supplier customer relationship information can exist without the text containing the name of the company but an anaphora like 'We', 'The Company', 'Our', and so on. For e.g. in the following snippets: "In May 2012, we entered into an agreement with Company-A to supply leather products;" and "John D, The Chairman of Company-A said that, 'Our deal to supply leather products to Company-B boosted our growth\'." The system identifies such cases ('we') and performs an additional layer of company extraction to mark these kinds of anaphoras and resolve them to a company. Anaphoras contribute to a huge number of instances of evidence sentences having supplier-customer relationships. Anaphoras are included only if they can be bound to a company, e.g., in cases of filing documents, such unmapped anaphoric instances are resolved to the 'Filing Company'.

Positive and Negative Patterns List Creation and Matching—At this stage by pattern matcher 608, the source document text is broken down into a set of sentences and the system now processes each sentence to identify relations. As a part of the first step at this stage, any sentence that has only one company marked (resolved anaphora included), gets filtered out and is not processed. For example: Company-A announced its 3rd quarter results yesterday—Excluded (less than two companies in sentence); Company-A is an important Client of Company-B—Included (at least two companies in sentence).

To reduce the noise that is being tagged by the classifier, we generated a list of 'interesting' patterns (using manual and semi-automatic methods) that have some potential for identifying supplier-customer relations. For example patterns like "sold", "supplied", "customers included", "client", "implemented", "use", etc. were created that helps filter out vast number of noisy sentences but at the same time Includes any sentence that have the potential to be interesting and thus creating an high recall-low precision bucket of sentences. The basic idea is to only include sentences that have: a) At least two company ies mentioned in the sentence, and b) Some pattern or text that can be of interest. If there is no such pattern of text, then these sentences are noisy and can be filtered out, for example: prior to Company-A, he served as Manager, Client Experience at Company-B—Included (pattern—"client"); Company-A is an important Client of Company-B—Included (pattern—"client"); and Company-A share in the electronic market is significantly less than Company-B—Excluded (no pattern).

The patterns may be created by analyzing examples of supplier-customer pairs, and analyzing all sentences that contained known related company pairs. These patterns may be generated and extended to suit many different industries. For example, automobile industry relied heavily on the pattern "supply" while technology sector uses different patterns like "used", "implemented" to suggest relations. Accordingly, there may be industry-specific patterns used in calculating evidence scores for company pairs known to be involved in a certain industry. A set of negative patterns was also curated, whose presence filtered out the sentences. Some such patterns included "stock purchase agreement", "acquired", "merged", etc. The presence of these patterns generally led to sentences that did not have supplier-customer relations.

Sentence Pre-Processing—Each sentence is pre-processed and transformed at the sentence splitter 604 and at sentence/evidence classifier 610. As a part of pre-processing, the system also checks for multiple companies in a given sentence acting like a list of companies and creates instances with each pair. As a part of pre-processing, the companies in a list are purged and masked to one. More transformations are also applied on the sentence like shortening a sentence, which removes un-necessary parts of a sentence while keeping the parts with the most information.

Sentence/Evidence Level Classifier—Also at sentence/evidence classifier 610, given a sentence (that contains at least two companies and a potential pattern), a machine learning classifier is trained which classifies whether the two companies in that sentence context have a supplier-customer relation (including identifying which company is supplying and which company is customer). For example: "Company-A is an important Client of Company-B."—A supplies B; "Company-A was supplied 50 barrels of oil by Company-B."—B supplies A; "Company-A supplied to Company-B stock options worth $10 M."—neither.

Model: The classifier used was a Logistic Regression classifier. A model is trained per source. So, news documents are run by the news model classifier and filing documents are classified by a filings model classifier. This is because the structure and type of sentences vary a lot from source to source. The sentences in news documents are simpler and have a different vocabulary as compared to SEC filings documents, which can have much longer complex sentences and a different use of vocabulary.

Features:

Features include context-based positional words, specific pattern-based features, sentence level features including the presence of indicator terms, the original extraction patterns that led to the inclusion of the sentence, distance between the two companies in the sentence, presence of other companies in the sentence and so on. Broadly each feature could be divided into a) Direction based feature b) Non-Direction based featured.

Direction Based Features—In order to classify a sentence and also identify the direction, each sentence is duplicated and one is marked as AtoB and the other is marked as B2A. The features extracted for that sentence are then marked with the respective AtoB or BtoA directions. The model is now able to learn a set of disjoint features for "A supplies B" and "B supplies A" cases. For example if fi is a positional word feature occurring say 1 word before company-B in the sentence, then there would be two features fiAtoB or fiBtoA. Let us take example of a sentence: "Company-A was supplied 50 barrels of oil by Company-B." For this example, we have a feature which is the word "by" appearing one word before Company-B, and let us represent it as fby_B−1. With this approach of feature engineering the fby_B−1 will have a bigger influence on B supplies A sentences and will not be available for A supplies B sentences.

Non-Direction Based Features: Some such features include token length feature, distance between the two companies feature, and so on. These features contribute more towards whether there is a relation between the two companies or not.

Word Based Features: The feature set include unigrams, bigrams and trigrams before and after Company-A tokens in the sentence, before and after Company-B token in the sentence and words around the pattern that was matched in the sentence. All these feature are direction based features.

Sentence Based Features: These feature includes features to check if either of the company is in a list of companies, if there are any company to the left or right of the company, if any of the company is an anaphora resolved company, and so on. These are also direction based features.

Pattern Indication Features: These feature check for specific patterns in the sentence based on the position of the company tokens in the sentence. For example the presence of a pattern "provided to Company-B" and then followed by a list of blacklisted words like "letter", "stock", etc. indicate a negative feature for the sentence.

Results: Both the filing and news model have shown a precision of around 56% and a recall of around 45% at the sentence level on the validation test data.

Company Pair Level Aggregation—The system at pairwise aggregator 614 stores the sentence/evidence level classification result to a knowledge graph 612 where all the evidences/sentences for each pair are aggregated to get an aggregated score for a given pair. The following examples: "Company-A is an important Client of Company-B.": 0.981 (classifier score); "Company-A sold 50 M cargo to Company-B in 2015.": 0.902; "Company-B mentioned that it agreed to buy tyres from Company-A": 0.947; yield an aggregated score for the company pair A-B as follows: Company-A (as supplier)—Company-B (as customer) of 0.99 (aggregated score).

The aggregator is a function of the individual evidence scores given by the classifier. This estimation is based on the evidence collected from the entire corpus, taking into account the source (news/filings) and confidence score of each detection as well as other signals, which either increase or decrease the probability of the relation.

Results: At the aggregation level, the exemplary system performs with a precision of above 70% for both filings and news documents.

In one manner of implementation the present invention provides a SCAR and involves building and querying an Enterprise Knowledge Graph.

With available data concerning a variety of subjects 1) presenting an unprecedented amount that continues to grow at increasing rates, 2) coming from diverse sources, and 3) covering a variety of domains in heterogeneous formats, information providers are faced with the critical challenge to process, retrieve and present such broad array of information to their users to satisfy complex information needs. The present invention may be implemented, in one exemplary manner, in connection with a family of services for building and querying an enterprise knowledge graph. For example, first data is acquired from various sources via different approaches. Furthermore, useful information is mined from the data by adopting a variety of techniques, including Named Entity Recognition (NER) and Relation Extraction (RE); such mined information is further integrated with existing structured data (e.g., via Entity Linking (EL) techniques) to obtain relatively comprehensive descriptions of the entities. Modeling the data as a Resource Description Framework (RDF) graph model enables easy data management and embedding of rich semantics in collected and pre-processed data.

In one exemplary, but not limiting, implementation, the supply-chain relationship processes herein described may be used in a system to facilitate the querying of mined and integrated data, i.e., the knowledge graph. For example, a natural language interface (e.g., Thomson Reuters Discover interface or other suitable search engine-based interface) allows users to ask questions of a knowledge graph in the user's own words. Such natural language questions are translated into executable queries for answer retrieval. To validate performance, the involved services were evaluated, i.e., named entity recognition, relation extraction, entity linking and natural language interface, on real-world datasets.

Knowledge workers, such as scientists, lawyers, traders or accountants, deal with a greater than ever (and growing) amount of data with an increasing level of variety. Many solutions of the past have been document-centric, or focused at the document level, and this has resulted in often less than effective presentation of results for users. Users information needs are often focused on entities and their relations, rather than on documents. To satisfy these needs, information providers must pull information from wherever it happens to be stored and bring it together in a summary result. As a concrete example, suppose a user is interested in companies with the highest operating profit in 2015 currently involved in Intellectual Property (IP) lawsuits. To answer this query, one needs to extract company entities from free text documents, such as financial reports and court documents, and then integrate the information extracted from different documents about the same company together.

Three key challenges for providing information to knowledge workers so that they can receive the answers they need are: 1) How to process and mine useful information from large amount of unstructured and structured data; 2) How to integrate such mined information for the same entity across disconnected data sources and store them in a manner for easy and efficient access; 3) How to quickly find the entities that satisfy the information needs of today's knowledge workers.

A knowledge graph as used herein refers to a general concept of representing entities and their relationships and there have been various efforts underway to create knowledge graphs that connect entities with each other. For instance, the Google Knowledge Graph consists of around 570 million entities as of 2014. Here, for the purpose of describing how to implement the inventive concepts, and not by limitation, we describe in connection with Thomson Reuters' approach to addressing the three challenges introduced above. Within Thomson Reuters, data may be produced manually, e.g., by journalists, financial analysts and attorneys, or automatically, e.g., from financial markets and cell phones. Furthermore, the data we have covers a variety of domains, such as media, geography, finance, legal, academia and entertainment. In terms of the format, data may be structured (e.g., database records) or unstructured (e.g., news articles, court dockets and financial reports).

Given this large amount of data available, from diverse sources and about various domains, one key challenge is how to structure this data in order to best support users' information needs. First, we ingest and consume the data in a scalable manner. This data ingestion process is preferably robust enough to be capable of processing all types of data (e.g., relation databases, tabular files, free text documents and PDF files) that may be acquired from various data sources. Although much data may be in structured formats (e.g., database records and statements represented using Resource Description Framework1 (RDF)), significant amounts of desirable data is unstructured free text.

Unstructured data may include patent filings, financial reports, academic publications, etc. To best satisfy users' information needs, structure may be added to free text documents. Additionally, rather than having data in separate "silos", data may be integrated to facilitate downstream applications, such as search and data analytics.

Data modeling and storage is another important part of an improved knowledge graph pipeline, with a data modeling mechanism flexible enough to allow scalable data storage, easy data update and schema flexibility. The Entity-Relationship (ER) modeling approach, for example, is a mature technique; however, we find that it is difficult to rapidly accommodate new facts in this model. Inverted indices allow efficient retrieval of the data; however, one key drawback is it only supports keyword queries that may not be sufficient to satisfy complex information needs. RDF is a flexible model for representing data in the format of tuples with three elements and no fixed schema requirement. An RDF model also allows for a more expressive semantics of the modeled data that can be used for knowledge inference.

In one exemplary implementation of the ingested, transformed, integrated and stored data, a system delivers efficiently retrieval of answers to users in an intuitive manner. Currently, the mainstream approaches to searching for information are keyword queries and specialized query languages (e.g., SQL and SPARQL (https://www.w3.org/TR.sparql11-overview/)). The former are not able to represent the exact query intent of the user, in particular for questions involving relations or other restrictions such as temporal constraints (e.g., IBM lawsuits since 2014); while the latter require users to become experts in specialized, complicated, and hard-to-write query languages. Thus, both mainstream techniques create severe barriers between data and users, and do not serve well the goal of helping users to effectively find the information they are seeking in today's hypercompetitive, complex, and Big Data world.

The SCAR of the present invention represents improvements achieved in building and querying an enterprise knowledge graph, including the following major contributions. We first present our data acquisition process from various sources. The acquired data is stored in a raw data store, which may include relational databases, Comma Separated Value (CSV) files, and so on. We apply our Named Entity Recognition (NER), relation extraction and entity linking techniques to mine valuable information from the acquired data. Such mined and integrated data then constitute our knowledge graph. Further, and in one manner of operation, a natural language interface (e.g., TR Discover) is also used that enables users to intuitively search for information from the knowledge graph using their own words. We evaluate our NER, relation extraction and entity linking techniques on a real-world news corpus and validate the effectiveness and improved performance in our techniques. We also evaluate TR Discover on a graph of 2.2 billion triples by using 10K randomly generated questions of different levels of complexity.

As presented and described below, first presented is an overview of the SCAR service framework. Next, presented is data acquisition, transformation and interlinking (i.e., NER-named entity recognition, RE-relation extraction and EL-entity linking) processes. Next is described an exemplary manner of modeling and storing of processed data. Further, and in one manner of operation, an exemplary natural language interface for querying the KG-knowledge graph. Next is described an evaluation of the components of the system and related work.

FIG. 20 demonstrates the overall architecture of an exemplary embodiment of the SCAR system 700. In this diagram, the solid lines represent our batch data processing, whose result will be used to update our knowledge graph; the dotted lines represent the interactions between users and various services. For services that are publicly available, a published user guide and code examples in different programming languages is available (e.g., https://permid.org/).

First of all, during our data acquisition and ingestion processes described in detail below, we consume data from various sources 702, including live data feeds, web pages and other non-textual data (e.g., PDF files). For example, for PDF files, we apply commercial Optical Character Recognition (OCR) software to obtain the text from them. We also analyze web pages and extract their textual information.

Next, given a document in the raw data 704, a single POST request is issued to our core service for entity recognition and relation extraction. Furthermore, our service performs disambiguation within the recognized entities at the named entity recognition, extraction and entity linking module or core service 706. For example, if two recognized entities "Tim Cook" and "Timothy Cook" have been determined by our system to both refer to the CEO of Apple Inc., they will be grouped together as one recognized entity in the output 714. Finally, our system will try to link each of the recognized entities to our existing knowledge graph 712. If a mapping between a recognized entity and one in the knowledge graph 712 is found, in the output 714 of the core service 706, the recognized entity will be assigned the existing entity ID in our knowledge graph 712.

The entity linking service can also be called separately. It takes a CSV file as input where each line is a single entity that will be linked to our knowledge graph 712. In the exemplary deployment, each CSV file can contain up to 5,000 entities.

While performing the above-discussed services, with our RDF model, we store our knowledge graph 712, i.e., the recognized entities and their relations, in an inverted index for efficient retrieval with keyword queries (i.e., the Keyword Search Service 716 in FIG. 7) and also in a triple store in order to support complex query needs.

Finally, to support the natural language interface 710, e.g., TR Discover, internal processes retrieve entities and relations from the knowledge graph 712 and build the necessary resources for the relevant sub-modules such as the entity matching service 718 (e.g., a lexicon for question understanding). Users can then enter and submit a natural language query through a Web-based interface.

Data Acquisition, Transformation and Interlinking—The following describes one exemplary manner of implementing the SCAR system. SCAR accesses a plurality of data sources and obtains/collects electronic data representing documents including textual content as source data, this is referred to as the acquisition and curation process. Such collected and curated data is then used to build the knowledge graph. Data Source and Acquisition—In this exemplary implementation, the data used covers a variety of industries, including Financial & Risk (F&R), Tax & Accounting, Legal, and News. Each of these four major data categories can be further divided into various sub-categories. For instance, our F&R data ranges from Company Fundamentals to Deals and Mergers & Acquisitions. Professional customers rely on rich datasets to find trusted and reliable answers upon which to make decisions and advisements. Below, Table 1 provides a high-level summary of the exemplary data space.

TABLE 1

An Overview of Thomson Reuters Data Space

| Industry | Description |
| --- | --- |
| Financial & Risk (F&R) | F&R data primarily consists of structured data such as intra and end-of-day time series, Credit Ratings, Fundamentals, alongside less structured sources, e.g., Broker Research and News. |
| Tax & Accounting | Here, the two biggest datasets are highly structured tax returns and tax regulations. |
| Legal | Our legal content has a US bias and is mostly unstructured or semi-structured. It ranges from regulations to dockets, verdicts to case decisions from Supreme Court, alongside numerous analytical works. |
| Reuters News | Reuters delivers more than 2 million news articles and 0.5 million pictures every year. The news articles are unstructured but augmented with certain types of metadata. |

To acquire the necessary data in the above-mentioned domains, we adopted a mixture of different approaches, including manual data entry, web scraping, feed consumption, bulk upload and OCR. The acquired data is further curated at different levels according to the product requirements and the desired quality level. Data curation may be done manually or automatically. Although our acquired data contains a certain amount of structured data (e.g., database records, RDF triples, CSV files, etc.), the majority of our data is unstructured (e.g., Reuters news articles). Such unstructured data contains rich information that could be used to supplement existing structured data. Because our data comes from diverse sources and covers various domains, including Finance, Legal, Intellectual Property, Tax & Accounting, etc., it is very likely that the same entity (e.g., organization, location, judge, attorney and law firm) could occur in multiple sources with complementary information. For example, "Company A" may exist in our legal data and is related to all its legal cases; while at the same time, this company may also appear in our financial data with all its Merger & Acquisition activities. Being able to interlink the different occurrences of the same entity across a variety of data sources is key to providing users a comprehensive view of entities of interest. An additional operational goal is to update and maintain the graph to keep up with the fast changing nature of source content.

To mine information from unstructured data and to interlink entities across diverse data sources, we have devoted a significant amount of effort to developing tools and capabilities for automatic information extraction and data interlinking. For structured data, we link each entity in the data to the relevant nodes in our graph and update the information of the nodes being linked to. For unstructured data, we first perform information extraction to extract the entities and their relationships with other entities; such extracted structured data is then integrated into our knowledge graph.

Named Entity Recognition—Given a free text document, we first perform named entity recognition (NER) on the document to extract various types of entities, including companies, people, locations, events, etc. We accomplish this NER process by adopting a set of in-house natural language processing techniques that include both rule-based and machine learning algorithms. The rule-based solution uses well-crafted patterns and lexicons to identify both familiar and unfamiliar entity names.

Our machine learning-based NER consists of two parts, both of which are based on binary classification and evolved from the Closed Set Extraction (CSE) system. CSE originally solved a simpler version of the NER problem: extracting only known entities, without discovering unfamiliar ones. This simplification allows it to take a different algorithmic approach, instead of looking at the sequence of words. First, it searches the text for known entity aliases, which become entity candidates. Then it uses a binary classification task to decide whether each candidate actually refers to an entity or not, based on its context and on the candidate alias. The second component tries to look for unfamiliar entity names, by creating candidates from patterns, instead from lexicons.

Both components use logistic regression for the classification problem, using LIBLINEAR implementation (a known library for large linear classification). We employ commonly adopted features for our machine learning-based NER algorithm: e.g., parts of speech, surrounding words, various lexicons and gazetteers (company names, people names, geographies & locations, company suffixes, etc.). We also designed special features to deal with specific sources of interest; such special features are aimed at detecting source specific patterns.

Relationship Extraction—The core of this approach is a machine learning classifier that predicts the probability of a possible relationship for a given pair of identified entities, e.g., known or recognized companies (which may be tagged in the NER process), in a given sentence. This classifier uses a set of patterns to exclude noisy sentences, and then extracts a set of features from each sentence. We employ context-based features, such as token-level n-grams and patterns. Other features are based on various transformations and normalizations that are applied to each sentence (such as replacing identified entities by their type, omitting irrelevant sentence parts, etc.). In addition, the classifier also relies on information available from our existing knowledge graph. For instance, when trying to identify the relationship between two identified companies, the industry information (i.e., healthcare, finance, automobile, etc.) of each company is retrieved from the knowledge graph and used as a feature. We also use past data to automatically detect labeling errors in our training set, which improves our classifier over time.

The algorithm is precision-oriented to avoid introducing too many false positives into the knowledge graph. In one manner of operation, relation extraction is only applied to the recognized entity pairs in each document, i.e., we do not try to relate two entities from two different free text documents. The relation extraction process runs as a daily routine on live document feeds. For each pair of entities, the SCAR system may extract multiple relationships; only those relationships with a confidence score above a pre-defined threshold are then added to the knowledge graph. Named entity recognition and relation extraction APIs, also known as Intelligent Tagging, are publicly available (http://www.opencalais.com/opencalais-api/).

Entity Linking—While the capability to mine information from unstructured data is important, an equally important function of the SCAR system is to be able to integrate such mined information with existing structured data to provide users with comprehensive information about the entities. The SCAR system may employ several tools to link entities to nodes in the knowledge graph. One approach is based on matching the attribute values of the nodes in the graph and that of a new entity. These tools adopt a generic but customizable algorithm that is adjustable for different specific use cases. In general, given an entity, we first adopt a blocking technique to find candidate nodes that the given entity could possibly be linked to. Blocking can be treated as a filtering process and is used to identify nodes that are promising candidates for linking in a lightweight manner. The actual and expensive entity matching algorithms are then only applied between the given entity and the resulting candidate nodes.

Next, the SCAR system computes a similarity score between each of the candidate nodes and the given entity using an Support Vector Machine (SVM) classifier that is trained using a surrogate learning technique. Surrogate learning allows the automatic generation of training data from the datasets being matched. In surrogate learning, we find a feature that is class-conditionally independent of the other features and whose high values correlate with true positives and low values correlate with true negatives. Then, this surrogate feature is used to automatically label training examples to avoid manually labeling a large number of training data.

An example of a surrogate feature is the use of the reciprocal of the block size: 1/block_size. In this case, for a block containing just one candidate that is most likely a match (true positive), the value for this surrogate feature will be 1.0; while for a big block containing a matching entity and many non-matching entities (true negatives), the value of the surrogate feature will be small. Therefore, on average, a high value of this surrogate feature (close to 1.0) will correlate to true positives and a low value (<<1.0) will correlate to true negatives.

The features needed for the SVM model are extracted from all pairs of comparable attributes between the given entity and a candidate node. For example, the attributes "first name" and "given name" are comparable. Based upon such calculated similarity scores, the given entity is linked to the candidate node that it has the highest similarity score with, this may be conditioned on if their similarity score is also above a pre-defined threshold. The blocking phase is tuned towards high recall, i.e., we want to make sure that the blocking step will be able to cover the node in the graph that a given entity should be linked to, if such a node exists. Then, the actual entity linking step ensures that we only generate a link when there is sufficient evidence to achieve an acceptable level of precision, i.e., the similarity between the given entity and a candidate node is above a threshold. The entity linking module or component may vary in the way it implements each of the two steps. For example, it may be configured to use different attributes and their combinations for blocking; it also provides different similarity algorithms that can be used to compute feature values. Exemplary entity linking APIs are publicly available (e.g., permid.org/match).

Figure 21:
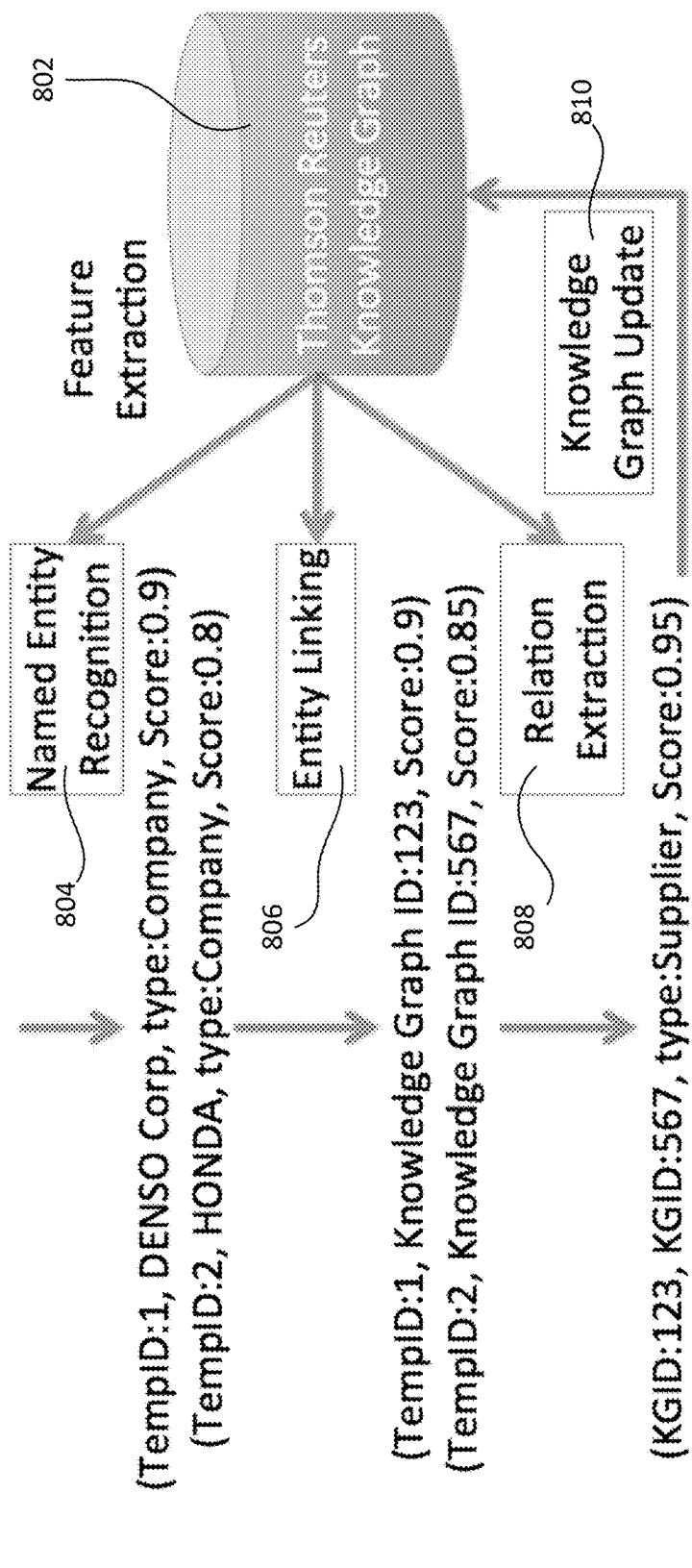
FIG. 21 is a flow diagram demonstrating an example of NER, entity linking, and relation extraction processes according to the present invention.

FIG. 21 is a flow diagram 800 demonstrating an example of NER 804, entity linking 806, and relation extraction 808 processes. First, with the NER 804 technique identifies two companies, "Denso Corp" and "Honda"; each of identified company is assigned a temporary identifier ID. Next in entity linking 806, both recognized companies are linked to nodes in the knowledge graph and each is associated with the corresponding Knowledge Graph ID (KGID). Furthermore, a relationship, in this case the relationship "supplier", (i.e., "Denso Corp" and "Honda" have a supply chain relationship between them) is extracted at relation extraction 808. At knowledge graph update 810, the newly extracted relationship is added to the knowledge graph 802, since the score of this relationship (0.95) is above the pre-defined threshold.

Data Modeling and Physical Storage—There are a variety of mechanisms for representing the data, including the Entity-Relation (ER) model (i.e., for relational databases), plain text files (e.g., in tabular formats, such as CSV), or inverted indices (to facilitate efficient retrieval by using keyword queries), etc. Plain text files may be easiest to store the data. However, placing data into files would not allow the users to conveniently obtain the information they are looking for from a massive number of files. Although relational database is a mature technique and users can retrieve information by using expressive SQL queries, a schema (i.e., the ER model) has to be defined ahead-of-time in order to represent, store and query the data. This modeling process can be relatively complicated and time-consuming, particularly for companies that have diverse types of datasets from various data sources. Also, as new data comes in, it may be necessary to keep revising the model and even remodeling the data, which could be expensive in terms of both time and human effort. Data can also be used to build inverted indices for efficient retrieval. However, the biggest drawback of inverted indices is that users can only search for information with simple keyword queries; while in real-world scenarios, many user search needs would be better captured by adopting more expressive query languages.

Modeling Data as RDF—One emerging data representation technique is the Resource Description Framework (RDF). RDF is a graph based data model for describing entities and their relationships on the Web. Although RDF is commonly described as a directed and labeled graph, many researchers prefer to think of it as a set of triples, each consisting of a subject, predicate and object in the form of <subject, predicate, object>.

Triples are stored in a triple store and queried with the SPARQL query language. Compared to inverted indices and plain text files, triple stores and the SPARQL query language enable users to search for information with expressive queries in order to satisfy complex user needs. Although a model is required for representing data in triples (similar to relational databases), RDF enables the expression of rich semantics and supports knowledge inference.

Another big advantage of adopting an RDF model is that it enables easier data deletion and update. Traditional data storage systems are "schema on write", i.e., the structure of the data (the data model) is decided at design time and any data that does not fit this structure is lost when ingesting the data. In contrast, "schema on read" systems attempt to capture everything and then apply computation horsepower to enforce a schema when the data is retrieved. An example would be the Elastic/Logstash/Kibana stack (www.elastic.co/products) that does not enforce any schema when indexing the data but then tries to interpret one from the built indices. The tradeoff is future-proofing and nimbleness at the expense of (rapidly diminishing) computing and storage. RDF sits at a unique intersection of the two types of systems. First of all, it is "schema on write" in the sense that there is a valid format for data to be expressed as triples. On the other hand, the boundless nature of triples means that statements can be easily added/deleted/updated by the system and such operations are hidden to users. Therefore, adopting an RDF model for data representation fits our needs well.

Figure 22:
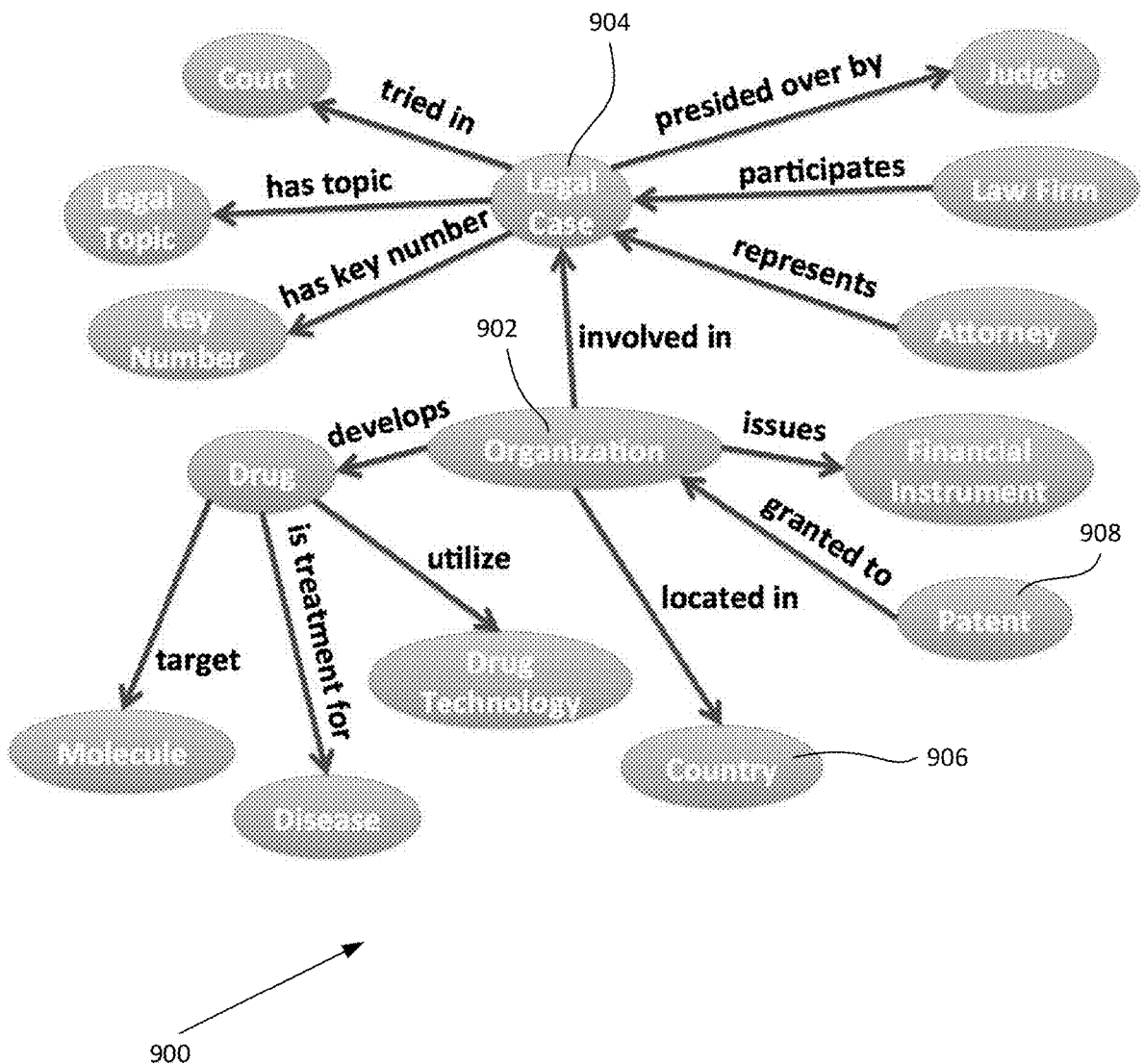
FIG. 22 is an exemplary ontology snippet of an exemplary Knowledge Graph in connection with an operation of the present invention.

FIG. 22 represents an exemplary ontology snippet of an exemplary Knowledge Graph 900 in connection with an operation of the present invention. While building the knowledge graph 900, we have designed an RDF model for our data. Our model contains classes (e.g., organizations and people) and predicates (the relationships between classes, e.g., "works for" and "is a board member of"). For brevity, we only show a snippet of our entire model in FIG. 9. Here, the major classes include Organization 902, Legal Case 904, Patent 908 and Country 906. Various relationships also exist between these classes: "involved in" connects a legal case and an organization, "presided over by" exists between a judge and a legal case, patents can be "granted to" organizations, an organization can "develop" a drug which "is treatment for" one or more diseases. This model is exemplary and may accommodate new domains or add other domains over time.

Data Storage—In this exemplary implementation, we store the triples in two ways. We index the triples on their subject, predicate and object respectively with the Elastic search engine. We also build a full-text search index on objects that are literal values, where such literal values are tokenized and treated as terms in the index. This enables fast retrieval of the data with simple keyword queries. Additionally, we store all the triples in a triple store in order to support search with complex SPARQL queries. The exemplary TR knowledge graph manages about five billion triples; however, this only represents a small percentage of related data and the number of triples is expected to grow rapidly over time.

In addition to the three basic elements in a triple (i.e., subject, predicate and object), a fourth element can also be added, turning a triple to a quad (www.w3.org/TR/n-quads/). This fourth element is generally used to provide provenance information of the triple, such as its source and trustworthiness. Such provenance information can be used to evaluate the quality of a triple. For example, if a triple comes from a reputable source, then it may generally have a higher quality level. In our current system, we use the fourth element to track the source and usage information of the triples. The following examples show the usage of this fourth element: <Microsoft, has_address, Address1, Wikipedia>, indicating that this triple comes from Wikipedia; and <Jim Hendler, works_for, RPI, 2007 to present>, showing the time period that Jim Hendler works for RPI.

Querying the Knowledge Graph with Natural Language—Above we have presented a Big Data framework and infrastructure for building an enterprise knowledge graph. However, given the built graph, one important question is how to enable end users to retrieve the data from this graph in an intuitive and convenient manner. Technical professionals, such as database experts and data scientists, may simply employ SPARQL queries to access this information. But non-technical information professionals, such as journalists, financial analysts and patent lawyers, who can-not be expected to learn such specialized query languages, still need a fast and effective means for accessing the data that is relevant to the task at hand.

Keyword-based queries have been frequently adopted to allow non-technical users to access large-scale RDF data, and can be applied in a uniform fashion to information sources that may have wildly divergent logical and physical structure. But they do not always allow precise specification of the user's intent, so the returned result sets may be unmanageably large and of limited relevance. However, it would be difficult for non-technical users to learn specialized query languages (e.g., SPARQL) and to keep up with the pace of the development of new query languages.

To enable non-technical users to intuitively find the exact information they are seeking, TR Discover, a natural language interface, bridges the gap between keyword-based search and structured query. In the TR Discover natural language interface, the user creates natural language questions, which are mapped into a logic-based intermediate language. A grammar defines the options available to the user and implements the mapping from English into logic. An auto-suggest mechanism guides the user towards questions that are both logically well-formed and likely to elicit useful answers from a knowledge base. A second translation step then maps from the logic-based representation into a standard query language (e.g., SPARQL), allowing the translated query to rely on robust existing technology. Since all professionals can use natural language, we retain the accessibility advantages of keyword search, and since the mapping from the logical formalism to the query language is information-preserving, we retain the precision of query-based information access. The detailed use of TR Discover follows.

Question Understanding—We use a Feature-based Context-Free Grammar (FCFG) for parsing natural language questions. Our FCFG consists of phrase structure rules (i.e., grammar rules) on non-terminal nodes and lexical entries (i.e., lexicon) for leaf nodes. The large majority of the phrase structure rules are domain independent allowing the grammar to be portable to new domains. The following shows a few examples of our grammar rules: G1-G3. Specifically, Rule G3 indicates that a verb phrase (VP) contains a verb (V), noun (N), and a noun phrase (NP).

G1: NP→N
G2: NP→NP VP
G3: VP→V NP

Furthermore, as for the lexicon, each entry in the FCFG lexicon contains a variety of domain-specific features that are used to constrain the number of parses computed by the parser preferably to a single, unambiguous parse. L1-L3 are examples of lexical entries.

L1: N[TYPE=drug, NUM=pl, SEM=<$\lambda$x.drug(x)>]→ 'drugs'

L2: V[TYPE=[drug,org,dev], SEM=<$\lambda$X x.X ($\lambda$y.dev_org_drug(y,x))>, TNS=past, NUM=?n]→'developed by'

L3: V[TYPE=[org,country,hq], NUM=?n]→'headquartered in'

Here, L1 is the lexical entry for the word, drugs, indicating that it is of TYPE drug, is plural ("NUM=pl"), and has the semantic representation $\lambda$x.drug(x). Verbs (V) have an additional feature tense (TNS), as shown in L2. The TYPE of verbs specify both the potential subject-TYPE and object-TYPE. With such type constraints, we can then license the question drugs developed by Merck while rejecting nonsensical questions like drugs headquartered in the U.S. on the basis of the mismatch in semantic type. A general form for specifying the subject and object types for verbs is as following: TYPE=[subject constraint, object constraint, predicate_name].

Disambiguation relies on the unification of features on non-terminal syntactic nodes. We mark prepositional phrases (PPs) with features that determine their attachment preference. For example, we specify that the prepositional phrase for pain must attach to an NP rather than a VP; thus, in the question Which companies develop drugs for pain?, "for pain" cannot attach to "develop" but must attach to "drugs". Additional features constrain the TYPE of the nominal head of the PP and the semantic relationship that the PP must have with the phrase to which it attaches. This approach filters out many of the syntactically possible but undesirable PP-attachments in long queries with multiple modifiers, such as companies headquartered in Germany developing drugs for pain or cancer. When a natural language question has multiple parses, we always choose the first parse. Future work may include developing ranking mechanisms in order to rank the parses of a question.

The outcome of our question understanding process is a logical representation of the given natural language question. Such logical representation is then further translated into an executable query (SPARQL) for retrieving the query results. Adopting such intermediate logical representation enables us to have the flexibility to further translate the logical representation into different types of executable queries in order to support different types of data stores (e.g., relational database, triple store, inverted index, etc.).

Enabling Question Completion with Auto-Suggest—Traditional question answering systems often require users to enter a complete question. However, it may be difficult for novice users to do so, e.g., due to the lack of familiarity and an incomplete understanding of the underlying data. One feature of the exemplary natural language interface TR Discover is that it provides suggestions in order to help users to complete their questions. The intuition here is that the auto-suggest module guides users in exploring the underlying data and completing a question that can be potentially answered with the data. Unlike Google's query auto-completion that is based on query logs, the present auto-suggestions are computed based upon the relationships and entities in the built knowledge graph and by utilizing the linguistic constraints encoded in the grammar feature.

The present auto-suggest module is based on the idea of left-corner parsing. Given a query segment-qs (e.g., drugs, developed by, etc.), we find all grammar rules whose left corner-fe on the right side matches the left side of the lexical entry of qs. We then find all leaf nodes in the grammar that can be reached by using the adjacent element of fe. For all reachable leaf nodes (i.e., lexical entries in our grammar), if a lexical entry also satisfies all the linguistic constraints, we then treat it as a valid suggestion.

The following describes two exemplary ways of using the auto-suggest facility. On one hand, users may be interested in broad, exploratory questions; however, due to lack of familiarity with the data, guidance from our auto-suggest module will be needed to help this user build a valid question in order to explore the underlying data. In this situation, users can work in steps: they could type in an initial question segment and wait for the system to provide suggestions. Then, users can select one of the suggestions to move forward. By repeating this process, users can build well-formed natural language questions (i.e., questions that are likely to be understood by our system) in a series of small steps guided by our auto-suggest.

Figure 23:
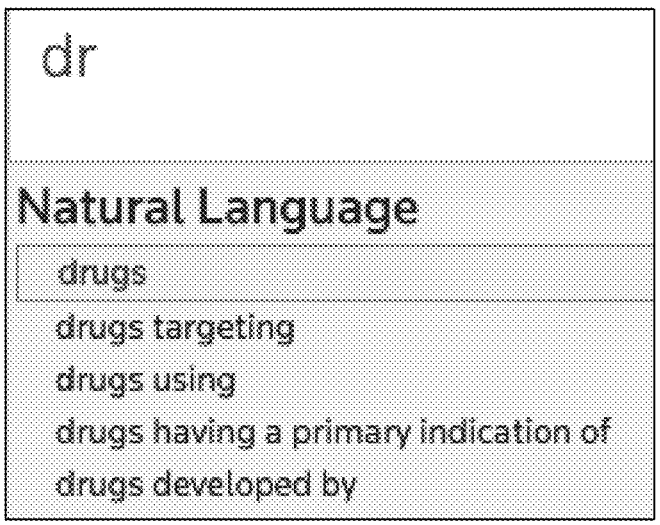
FIGS. 23($a$)-23($c$) provide graphical user interface elements illustrating a question building process according to the present invention.
Figure 23:
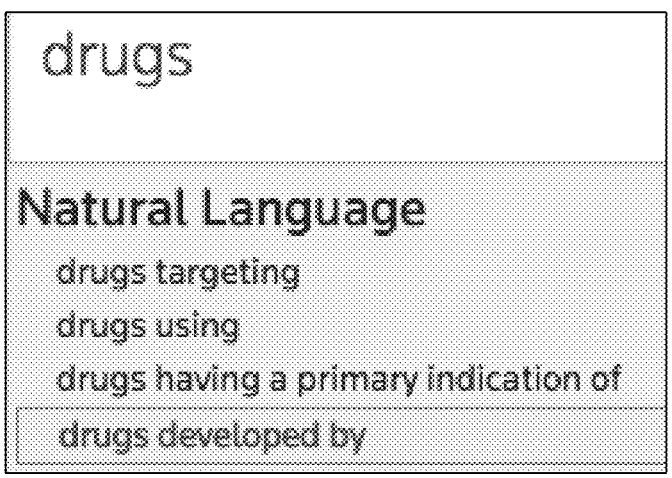
Figure 23:
Figure 23D:
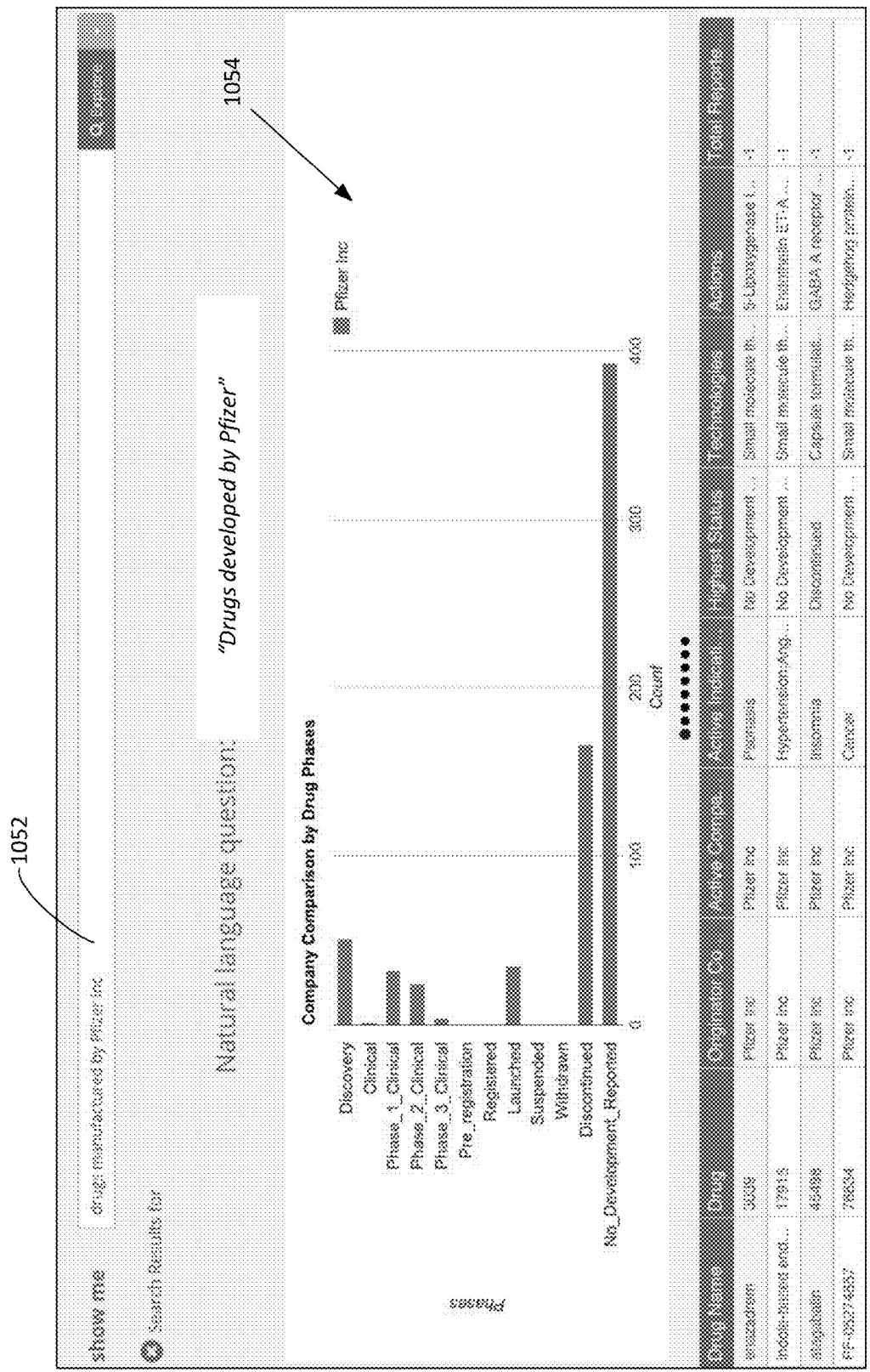

FIGS. 23(a)-23(c) demonstrate this question building process. Assuming that User A starts by typing in "dr" as shown in FIG. 23(a), drugs will then appear as one or several possible completions. User A can either continue typing drugs or select it from the drop-down list. Upon selection, suggested continuations to the current question segment, such as "using" and "developed by," are then provided to User A as shown in FIG. 23(b). Suppose our user is interested in exploring drug manufacturers and thus selects "developed by." In this case, both the generic type, companies, along with specific company instances like "Pfizer Inc" and "Merck & Co Inc" are offered as suggestions as shown in FIG. 23(c). User A can then select "Pfizer Inc" to build the valid question, "drugs developed by Pfizer Inc" 1052 thereby retrieving answers 1054 from our knowledge graph as shown in the user interface 1050 of FIG. 23(d).

Alternatively, users can type in a longer string, without pausing, and our system will chunk the question and try to provide suggestions for users to further complete their question. For instance, given the following partial question cases filed by Microsoft tried in . . . , our system first tokenizes this question; then starting from the first token, it finds the shortest phrase (a series of continuous tokens) that matches a suggestion and treats this phrase as a question segment. In this example, cases (i.e., legal cases) will be the first segment. As the question generation proceeds, our system finds suggestions based on the discovered question segments, and produces the following sequence of segments: cases, filed by, Microsoft, and tried in. At the end, the system knows that the phrase segment or text string "tried in" is likely to be followed by a phrase describing a jurisdiction, and is able to offer corresponding suggestions to the user. In general, an experienced user might simply type in cases filed by Microsoft tried in; while first-time users who are less familiar with the data can begin with the stepwise approach, progressing to a more fluent user experience as they gain a deeper understanding of the underlying data.

We rank the suggestions based upon statistics extracted from our knowledge graph. Each node in our knowledge graph corresponds to a lexical entry (i.e., a potential suggestion) in our grammar (i.e., FCFG), including entities (e.g., specific drugs, drug targets, diseases, companies, and patents), predicates (e.g., developed by and filed by), and generic types (e.g., Drug, Company, Technology, etc.). Using our knowledge graph, the ranking score of a suggestion is defined as the number of relationships it is involved in. For example, if a company filed 10 patents and is also involved in 20 lawsuits, then its ranking score will be 30. Although this ranking is computed only based upon the data, alternative approaches may be implemented or the system's behavior may be tuned to a particular individual user, e.g., by mining query logs for similar queries previously made by that user.

Figure 24:
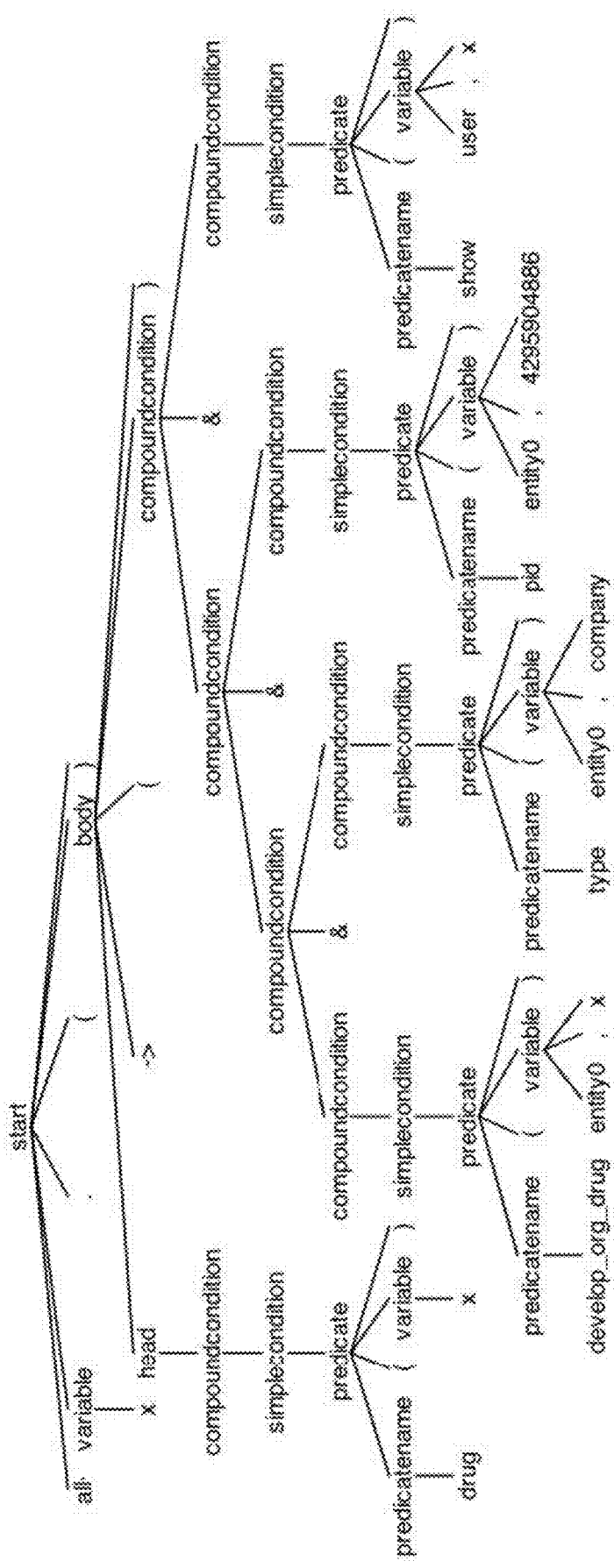
FIG. 24 is a Parse Tree for the First Order Logic (FOL) of the question "Drugs developed by Merck" according to the present invention.

Question Translation and Execution—FIG. 24 depicts a Parse Tree 1100 for the First Order Logic (FOL) of the Question "Drugs developed by Merck." In contrast to other natural language interfaces, our question understanding module first maps a natural language question to its logical representation; and, in this exemplary embodiment, we adopt First Order Logic (FOL). The FOL representation of a natural language question is further translated to an executable query. This intermediate logical representation provides us the flexibility to develop different query translators for various types of data stores.

There are two steps in translating an FOL representation to an executable query. In the first step, we parse the FOL representation into a parse tree by using an FOL parser. This FOL parser is implemented with ANTLR (a known parser development tool). The FOL parser takes a grammar and an FOL representation as input, and generates a parse tree for the FOL representation. FIG. 24 shows the parse tree of the FOL for the question "Drugs developed by Merck". We then perform an in-order traversal (with ANTLR's APIs) of the FOL parse tree and translate it to an executable query. While traversing the tree, we put all the atomic query constraints (e.g., "type(entity0, company)", indicating that "entity0" represents a company entity, and "pid(entity0, 4295904886)", showing the internal ID of the entity represented by "entity0") and the logical connectors (i.e., "and" and "or") into a stack. When we finish traversing the entire tree, we pop the conditions out of the stack to build the correct query constraints; predicates (e.g., "develop_org_drug" and "pid") in the FOL are also mapped to their corresponding predicates in our RDF model to formulate the final SPARQL query. We run the translated SPARQL queries against an instance of the free version of GraphDB, a state-of-the-art triple store for storing triple data and for executing SPARQL queries.

As a concrete example, the following summarizes the translation from a natural language question to a SPARQL query via a FOL representation:
Natural Language Question:
Drugs developed by Merck
FOL: all x.(drug(x)→(develop_org_drug(entity0,x) & type(entity0,Company) & pid(entity0,4295904886)))
SPARQL Query:
PREFIX rdf: <http://www.w3.org/1999/02/22-rdf-syntax-ns#> PREFIX example: http://www.example.com#
select ?x
where {
?x rdf: type example:Drug.
example:4295904886 example:develops ?x.
}

Evaluation of Data Transformation and Interlinking—Here, we evaluate named entity recognition, relation extraction, and entity linking services, i.e., Intelligent Tagging.

Dataset. Named entity recognition is evaluated separately for Company, Person, City and Country; entity linking is evaluated on Company and Person entities. Table 2 shows the statistics of our evaluation datasets for NER and entity linking. All documents were randomly sampled from a large news corpus. For NER, each selected document was annotated by manually. It should be noted that these entity mention counts are at the document level, and not the instance level. For example, if a company appeared in three different documents and five times in each, we count it as three company mentions (instance level count would have been 15, unique companies count would have been one). For entity linking, the randomly selected entities are manually resolved to entities in our knowledge graph.

TABLE 2

Statistics of NER and Entity Linking Evaluation Datasets

| Task | Entity Type | |Document| | |Mention| |
|---|---|---|---|
| Entity Recognition | Company | 1,496 | 4,450 |
| | Person | 600 | 787 |
| | City | 100 | 101 |
| | Country | 2,000 | 1,835 |
| Entity Linking | Company | 1,000 | 673 |
| | Person | 100 | 156 |

We also evaluate our machine learning-based relation extraction algorithm. We present the results on two different types of relations: "Supply Chain" and "Merger & Acquisition". To evaluate the supply chain relation, we first identified 20,000 possible supply chain relationships (from 19,334 documents). We then sent these 20,000 possible relations to Amazon Mechanical Turk (www.mturk.com) for manual annotation. Each task was sent to two different workers; in case of disagreement between the first two workers, a possible relation is then sent to a third worker in order to get a majority decision. The agreement rate between workers was 84%. Through this crowdsourcing process, we obtained 7,602 "supply-chain" relations as reported by the workers. We then checked the quality of a random sample of these relations and found the reported relations of high quality, so we used all the 7,602 relations as ground truth for our evaluation.

To evaluate the Merger & Acquisition (M&A) relation, we first identified 2,590 possible M&A relations (from 2,500 documents). These possible relations were then manually tagged and annotated. The quality of the tagged set was further assessed by another worker by examining randomly sampled annotations, and was found to be 92% accurate. The overall annotation process resulted in 603 true Merger & Acquisition relations, which were used as ground-truth for our evaluation.

TABLE 3

Named Entity Recognition, Relation Extraction and Entity Linking Results

| Task | Entity/Relation Type | Precision | Recall | F1 |
|---|---|---|---|---|
| Entity Recognition | Company | 0.94 | 0.75 | 0.83 |
| | Person | 0.91 | 0.87 | 0.89 |
| | City | 0.93 | 0.80 | 0.86 |
| | Country | 0.95 | 0.89 | 0.92 |
| Relation Extraction | Supply Chain | 0.76 | 0.46 | 0.57 |
| | Merger & Acquisition | 0.71 | 0.51 | 0.59 |
| Entity Linking | Company | 0.92 | 0.89 | 0.90 |
| | Person | 0.92 | 0.73 | 0.81 |

Metrics—We use the standard evaluation metrics: Precision, Recall and F1-score, as defined in Equation 1:

$$P = \frac{|\text{correctly detected entities}|}{|\text{totally detected entities}|} \quad \text{(Eq. 1)}$$

$$R = \frac{|\text{correctly detected entities}|}{|\text{groundtruth entities}|},$$

$$F1\text{-score} = 2 * \frac{P * R}{P + R}$$

The three metrics for relation extraction and entity linking are defined in a similar manner by replacing "entities" with "relations" or "entity pairs" in the above three equations.

Figure 29:
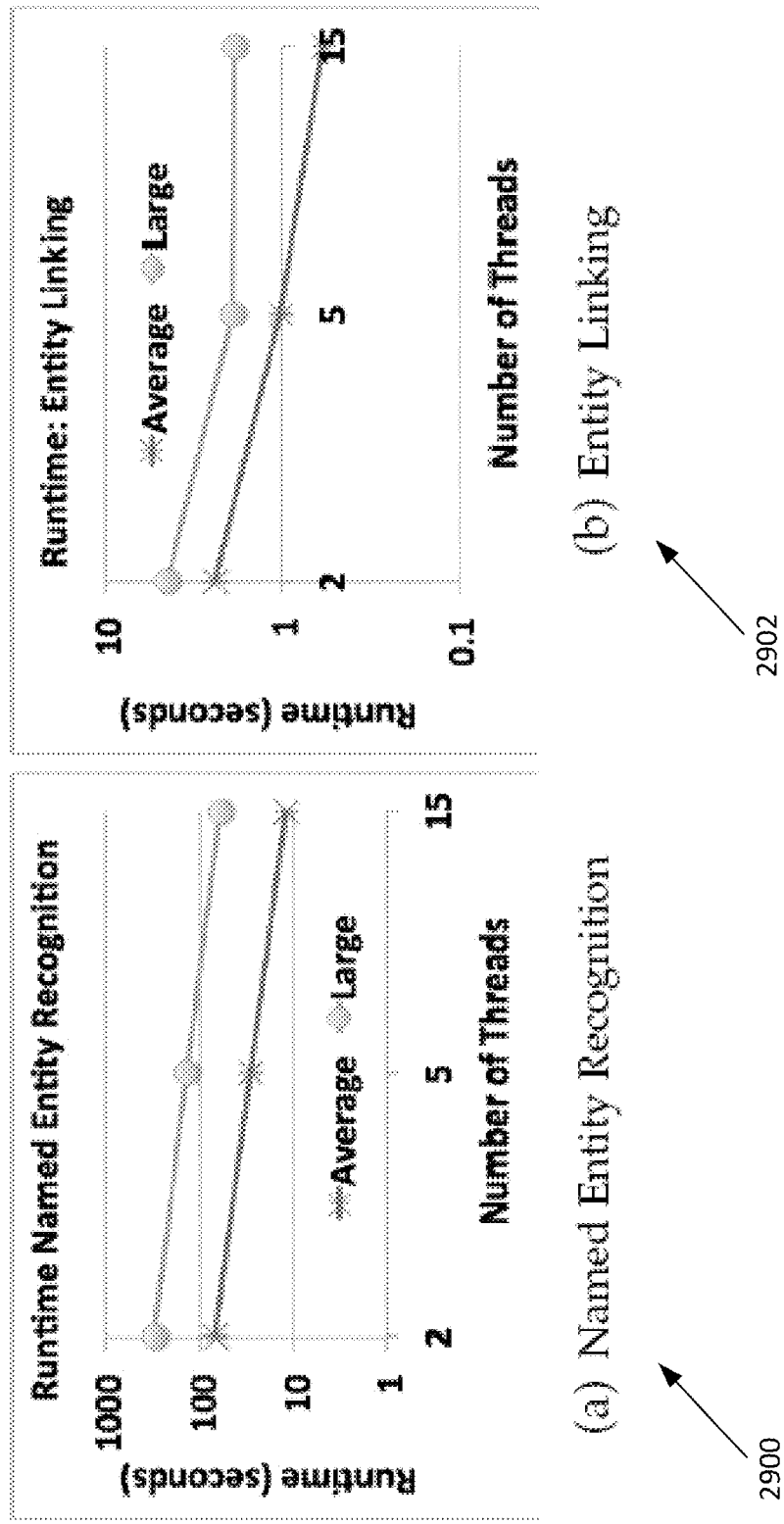
FIG. 29 provides two graphs illustrating the runtime of named entity recognition and entity linking processes according to the present invention.

Results—Table 3 and FIG. 29 demonstrate the results of our NER component on four different types of entities, the results of our relation extraction algorithm on two different relations, and our entity linking results on two different types of entities. In addition, we report the runtime of our NER shown in graph 2900 and entity linking components shown in graph 2902 on two types of documents: Average and Large. "Average" refers to a set of 5,000 documents whose size is smaller than 15 KB with an average size of 2.99 KB. "Large" refers to a collection of 1,500 documents whose size is bigger than 15 KB but smaller than 500 KB (the maximum document size in our data) with an average size of 63.64 KB.

Evaluation of Natural Language Querying

Dataset—We evaluate the runtime of the different components of the natural language interface, TR Discover, on a subset of our knowledge graph. Our evaluation dataset contains about 329 million entities and 2.2 billion triples. This dataset primarily covers the following domains: Intellectual Property, Life Science, Finance and Legal. The major entity types include Drug, Company, Technology, Patent, Country, Legal Case, Attorney, Law Firm, Judge, etc. Various types of relationships exist between the entities, including Develop (Company develops Drug), Headquartered in (Company headquartered in Country), Involved In (Company involved in Legal Case), Presiding Over (Legal Case presided over by Judge), etc.

Infrastructure. We used two machines for evaluating performance: Server-GraphDB: We host a free version of GraphDB, a triple store, on an Oracle Linux machine with two 2.8 GHz CPUs (40 cores) and 256 GB of RAM; and Server-TRDiscover: We perform question understanding, auto-suggest, and FOL translation on a RedHat machine with a 16-core 2.90 GHz CPU and 264 GB of RAM. We use a dedicated server for hosting the GraphDB store, so that the execution of the SPARQL queries is not interfered by other processes. A natural language question is first sent from an ordinary laptop to Server-TRDiscover for parsing and translation. If both processes finish successfully, the translated SPARQL query is then sent to Server-GraphDB for execution. The results are then sent back to the laptop.

Random Question Generation—To evaluate the runtime of TR Discover, we randomly generated 10,000 natural language questions using our auto-suggest component. We give the auto-suggest module a starting point, e.g., drugs or cases, and then perform a depth-first search to uncover all possible questions. At each depth, for each question segment, we select b most highly ranked suggestions. Choosing the most highly ranked suggestions helps increase the chance of generating questions that will result in non-empty result sets to better measure the execution time of SPARQL queries. We then continue this search process with each of the b suggestions. By setting different depth limits, we generate questions with different levels of complexity (i.e., different number of verbs). Using this process, we generated 2,000 natural language questions for each number of verbs from 1 to 5, thus 10,000 questions in total.

Among these 10,000 questions, we present the evaluation results on the valid questions. A question is considered valid if it successfully parses and its corresponding SPARQL query returns a non-empty result set. Our parser relies on a grammar (i.e., a set of rules) for question understanding; as the number of rules increases, it is possible that the parser may not be able to apply the right set of rules to understand a question, especially a complex one (e.g., with five verbs). Also, as we increase the number of verbs in a question (i.e., adding more query constraints in the final SPARQL query), it is more likely for a query to return an empty result set. In both cases, the runtime is faster than when successfully finishing the entire process with a non-empty result set. Thus, we only report the results on valid questions.

Runtime Results—

Figure 27:
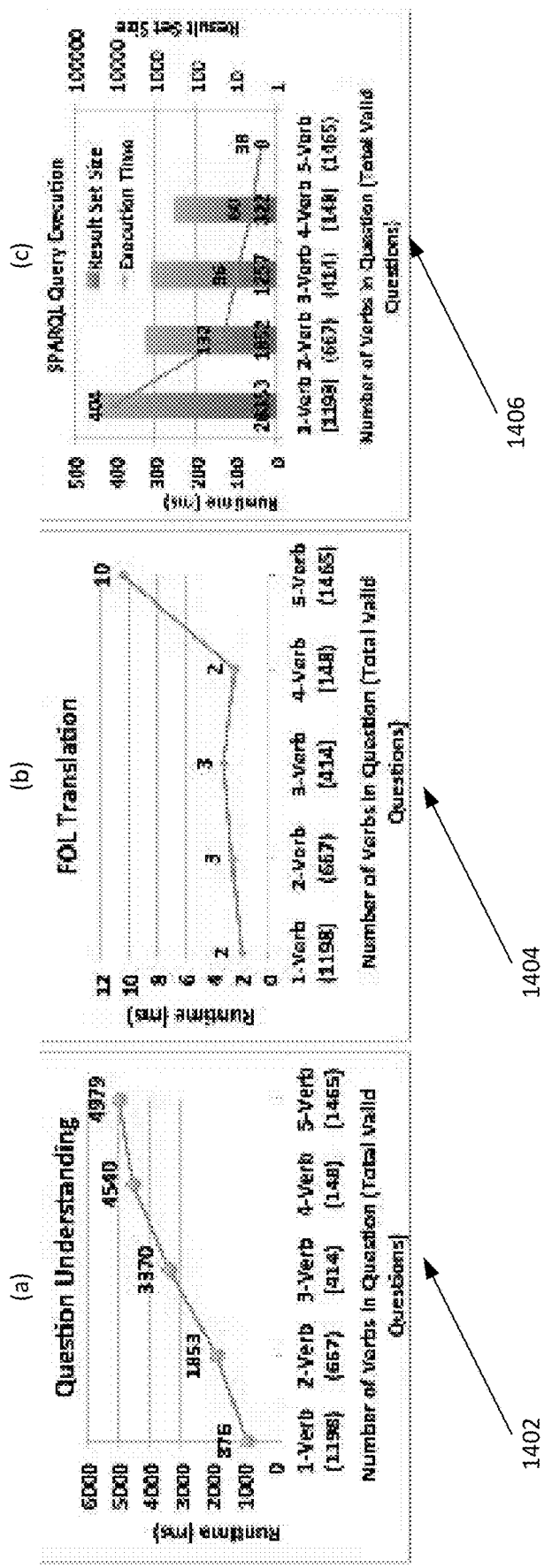
FIG. 27 provides three graphs (a), (b), and (c) that show the runtime of natural language parsing according to the present invention.

FIG. 27 includes three graphs (a) 1402, (b) 1404, and (c) 1406 that show the runtime of natural language parsing, FOL translation and SPARQL execution respectively. According to FIG. 27 graph (a) 1402, unless a question becomes truly complicated (with 4 or 5 verbs), the parsing time is generally around or below three seconds. One example question with 5 verbs could be Patents granted to companies headquartered in Australia developing drugs targeting Lectin mannose binding protein modulator using Absorption enhancer transdermal. We believe that questions with more than five verbs are rare, thus we did not evaluate questions beyond this level of complexity. In our current implementation, we adopt NLTK (http://www.nltk.org/) for question parsing; however, we supply NLTK with our own FCFG grammar and lexicon.

From FIG. 27 graph (b) 1404, we can see that only a few milliseconds are needed for translating the FOL of a natural language question to a SPARQL query. In general, the translator only needs to traverse the FOL parse tree (FIG. 24) and appropriately combines the different query constraints.

Finally, we demonstrate the execution time and the result set size of the translated SPARQL queries in FIG. 27 graph (c) 1406. For questions of all complexity levels, the average execution time is below 500 milliseconds, showing the potential of applying a triple store to real-world scenarios with a similar size of data. As we increase the number of verbs in a question, the runtime actually goes down, since GraphDB is able to utilize the relevant indices on the triples to quickly find potential matches. In addition, all of our 5-verb testing questions generate an empty result set, thus here a question is valid as long as it successfully parses.

Time Complexity Analysis—For our Natural Language Processing (NLP) modules, the complexity of entity extraction is $O(n+k*\log k)$, where n is the length of the input document and k is the number of entity candidates in it (k<<n with some edge cases with a large number of candidates). The worst-case complexity of our relation extraction component is $O(n+l2)$, where n is the length of the input document, and l is the number of extracted entities, as we consider all pairs of entities in the candidate sentences. The complexity of linking a single entity is $O(b*r2)$, where b is the block_size (i.e., the number of linking candidates) and r is the number of attributes for a given entity.

For natural language interface, the time complexity of parsing a natural language question to its First Order Logic representation (FOL) is $O(n3)$, where n is the number of words in a question. We then parse the FOL to an FOL parse tree with time complexity $O(n4)$. Next, the FOL parse tree is translated to a SPARQL query with in-order traversal with $O(n)$ complexity. Finally, the SPARQL query is executed against the triple store. The complexity here is largely dependent on the nature of the query itself (e.g., the number of joins) and the implementation of the SPARQL query engine.

Never-Ending Language Learning (NELL) and Open Information Extraction (OpenIE) are two efforts in extracting knowledge facts from a broad range of domains for building knowledge graphs. In the Semantic Web community, DBpedia and Wikidata are two of the notable efforts in this area. The latest version of DBpedia has 4.58 million entities, including 1.5 million persons, 735 K places and 241 K organizations, among others. Wikidata covers a broad range of domains and currently has more than 17 million "data items" that include specific entities and concepts. Various efforts have also been devoted to creating knowledge graphs in multiple languages.

Named Entity Recognition—Early attempts for entity recognition relied on linguistic rules and grammar-based techniques. Recent research focuses on the use of statistical models. A common approach is to use Sequence Labeling techniques, such as hidden Markov Models, conditional random fields and maximum entropy. These methods rely on language specific features, which aim to capture linguistic subtleties and to incorporate external knowledge bases. With the advancement of deep learning techniques, there have been several successful attempts to design neural network architectures to solve the NER problem without the need to design and implement specific features. These approaches are suitable for use in the SCAR system.

Relation Extraction—Similar to NER, this problem was initially approached with rule-based methods. Later attempts include the combination of statistical machine learning and various NLP techniques for relation extraction, such as syntactic parsing, and chunking. Recently, several neural network-based algorithms have been proposed for relation extraction. In addition, research has shown that the joint modeling of entity recognition and relation extraction can achieve better results that the traditional pipeline approach.

Entity Linking—Linking extracted entities to a reference set of named entities is another important task to building a knowledge graph. The foundation of statistical entity linking lies in the work of the U.S. Census Bureau on record linkage. These techniques were generalized for performing entity linking tasks in various domains. In recent years, special attention was given to linking entities to Wikipedia by employing word disambiguation techniques and relying on Wikipedia's specific attributes. Such approaches are then generalized for linking entities to other knowledge bases as well.

Natural Language Interface (NLI)—Keyword search has been frequently adopted for retrieving information from knowledge bases. Although researchers have investigated how to best interpret the semantics of keyword queries, oftentimes, users may still have to figure out the most effective queries themselves to retrieve relevant information. In contrast, TR Discover accepts natural language questions, enabling users to express their search requests in a more intuitive fashion. By understanding and translating a natural language question to a structured query, our system then retrieves the exact answer to the question.

NLIs have been applied to various domains. Much of the prior work parses a natural language question with various NLP techniques, utilizes the identified entities, concepts and relationships to build a SPARQL or a SQL query, and retrieves answers from the corresponding data stores, e.g., a triple store, or a relational database. In addition to adopting fully automatic question understanding, CrowdQ also utilizes crowd sourcing techniques for understanding natural language questions. Instead of only using structured data, HAWK utilizes both structured and unstructured data for question answering.

Compared to the state-of-the-art, we maintain flexibility by first parsing a question into First Order Logic, which is further translated into SPARQL. Using FOL allows us to be agnostic to which query language will be used later. We do not incorporate any query language statements directly into the grammar, keeping our grammar leaner and more flexible for adapting to other query languages. Another distinct feature of our system is that it helps users to build a complete question by providing suggestions according to a partial question and a grammar. Although ORAKEL also maps a natural language question to a logical representation, no auto-suggest is provided to the users.

Knowledge Graph in Practice—The Google Knowledge Graph has about 570 million entities as of 2014 and has been adopted to power Google's online search. Yahoo and Bing (http://blogs.bing.com/search/2013/03/21/understand-your-world-with-bing/) are also building their own knowledge graphs to facilitate search. Facebook's Open Graph Protocol (http://ogp.me/) allows users to embed rich metadata into webpages, which essentially turns the entire web into a big graph of objects rather than documents. In terms of data, the New York Times has published data in RDF format (data.nytimes.com) (5,000 people, 1,500 organizations and 2,000 locations). The British Broadcasting Corporation has also published in RDF, covering a much more diverse collection of entities (www.bbc.co.uk/things/), e.g., persons, places, events, etc. Thomson Reuters now also provides free access to part of its knowledge graph (permid.org) (3.5 million companies, 1.2 million equity quotes and others). A knowledge graph may comprise the information shown in Table 4, below.

TABLE 4

Thomson Reuters Knowledge Graph Feed Content

| Content Set | Content | Example Fields | Example Relationships |
|---|---|---|---|
| Knowledge Graph - Core Entities | | | |
| Organizations Thomson Reuters Organization Authority is central to the connection of tradable instruments, business transactions, news and events. Entity data is gathered from more than use numeral 1,000 primary sources, including Exchange, Registrar, Regulator, Annual Report and Prospectus. | Includes 4.6M organizations, current and historical, that Thomson Reuters has identified as involved in the capital markets, including deeper content around, for example, public and bond issuers, M&A participants and investors, including fund managers and private equity. Over 1.2 million hierarchy relationships. | Over 100 fields are available, including: Names Local Language & Official Names. Former Names & Alias Address & Contact Headquarters Address, Registered Address, Website, Phone Identifiers PermID, LEI, CIK, Registration Number, Tax Identifier | Hierarchy Immediate & Ultimate Affiliates, Successor Country Domicile, Incorporation, Jurisdiction Regulators Registration Authority Tax Authority Primary Regulator |
| Instruments & Quotes Comprehensive equity data covers all exchanges and allows customers to connect | Includes all current and historical Equity Instruments and Quotes, 240K equity instruments and 1.17 million | Instrument PermID, Instrument Name, Asset Class, Active/Inactive Status | Issuers Instrument to Issuer Quote to Instrument Metadata |

TABLE 4-continued

Thomson Reuters Knowledge Graph Feed Content

| Content Set | Content | Example Fields | Example Relationships |
|---|---|---|---|
| company data to security masters. With instruments and quotes, customers can identify which tradable securities are impacted by any company-level information. | equity quotes across 160 exchanges. | Quote PermID, RIC, Ticker, MIC, Exchange, Currency & Currency Unit | Currency, Asset Class, Share Class, Exchange |
| Officers & Directors Thomson Reuters Officers and Directors is one of the most comprehensive databases of public company executives and directors in the world. | Over 2 million officer and director positions, including historical positions from 1998. Every person is uniquely identified independently from his or her position. Coverage includes all Public and Private Equity backed companies. | Available fields include: Personal Details Name, Age, Biography, Education Work History Corporate Affiliations, As-reported and Standardized Titles, Committees Served | Role Officer, Director Personal Committee, Education, Qualification |
| Metadata Thomson Reuters provides a comprehensive set of metadata that describe the financial markets including the content, taxonomies and relationships available from Thomson Reuters publish. We make available all the metadata needed to understand the content within the Knowledge Graph, plus additional metadata that indicates what other content is available from Thomson Reuters. | Over 5 million metadata entities, including major classification systems and detailed data item coverage for every Thomson Reuters published content set. Includes ISO and other industry standards where applicable. | Available metadata includes: Classification Systems Industry Classifications - TRBC, NAICS Asset Classes: Equity, Commodities, Fixed Income, FX News Topics Core Metadata Geographies, Countries, Cities Commodities, Currencies, Languages Holidays, Units, Time Zones Data Set Specific Metadata Relationships, Definitions, Data Elements | Geographies Administrative Units, Subdivision Industry Business Sector, Industry Currencies Currency CurrencyUnit Taxonomies Asset Class Hierarchy |
| Value Chain Relationships ||||
| Supply Chain Thomson Reuters growing collection of publicly disclosed supplier and customer relationships. Provides evidence text (aka snippets) that went into determining the relationship. | 190,000 relationships for 28,000 companies extracted from 11 million publicly available sources dating back to 2011. Coverage for 5,000 public companies. | Agreements Organizations, Confidence Score Source Information Text, Date, Source Type | Supply Chain Supplier Customer |
| Comparable Companies Find competitors, peers and related companies to identify comprehensive and often non-obvious targets. | Comparable Companies is a list of 2 million relationships for 200,000 companies generated using a proprietary algorithm that analyzes co-occurrence and frequency of appearances within news, together with industry and geography information. | Organizations Relative Similarity Score | Comparable Company |
| Joint Ventures & Strategic Alliances Thomson Reuters Joint Ventures & Strategic Alliances includes agreements that result in the formation of new entities (JVs) and business partnerships (alliances). | Dating back to 1985, Thomson Reuters JVs & Alliances covers over 60,000 Joint Ventures and 80,000 Strategic Alliances. | Up to 100 fields are available, including: Deal Information Dates, Investment, Size, Duration Agreement Type Technology, Marketing, Product, Cross-Border Alliance | Joint Venture Strategic Alliance Resulting Company |
| Industry Classification Thomson Reuters Business Classification (TRBC) is a comprehensive, detailed and up-to-date market-oriented sector and industry classification. | Over 727,000 companies in 130 countries with five levels of industry classification. History is available back to 1999. | In addition to the industry assignment, the dates of prior assignments and prior classification schemes are available. | Economic Sector Business Sector Industry Group Industry Activity |

Towards Generic Data Transformation and Integration—
State-of-the-art NER and relation extraction techniques have been mainly focused on common entity types, such as locations, people and organizations; however, our data covers a much more diverse set of types of entities, including drugs, medical devices, regulations, legal topics, etc., thus requiring a more generic capability. Being able to integrate such mined information from unstructured data with existing structured data and to ultimately generate insights for users based upon such integrated data is a key advantage.

Although these techniques are used to build and query the graph in the first place, these services can also benefit from information in the knowledge graph. First of all, our knowledge graph is used to create gazetteers and entity fingerprints, which help to improve the performance of our NER engine. For example, company information, such as industry, geographical location and products, from the knowledge graph is used to create a company fingerprint. For entity linking, when a new entity is recognized from a free text document, the information from the knowledge graph is used to identify candidate nodes that this new entity might be linked to. Finally, our natural language interface relies on a grammar for question parsing, which is built based upon information from the knowledge graph, such as the entity types (e.g., company and person) and their relationships (e.g., "works_for").

Data Modeling—Providers, such as Thomson Reuters, are concerned with a wide range of content covering diverse domains, e.g., that range from finance to intellectual property & science and to legal and tax. It would be difficult and time-consuming task for engineers to precisely model such a complex space of domains and convert the ingested and integrated data into RDF triples. Rather than have engineers understand and perform modeling, we collaborate closely with editorial colleagues to model the data, apply the model to new contents, and embed the semantics into our data alongside its generation.

Distributed and Efficient RDF Data Processing—The relative scarcity of distributed tools for storing and querying RDF triples is another challenge. This reflects the inherent complexities of dealing with graph-based data at scale. Storing all triples in a single node would allow efficient graph operations while this approach may not scale well when we have an extremely large number of triples. Although existing approaches for distributed RDF data processing and querying often require a large and expensive infrastructure, one solution is to use a highly scalable data warehouse (e.g., Apache Cassandra (http://cassandra.apache.org/) and Elasticsearch) for storing the RDF triples; in the meanwhile, slices of this graph can then be retrieved from the entire graph, put in specialized stores, and optimized to meet particular user needs.

Converging Triples from Multiple Sources—Another challenge is the lack of inherent capability within RDF for update and delete operations, particularly when multiple sources converge predicates under a single subject. In this scenario, one cannot simply delete all predicates and apply the new ones: triples from another source will be lost. While a simplistic solution might be to delete by predicate, this approach does not account for the same predicate coming from multiple sources. For example, if two sources state a "director-of" predicate for a given subject, an update from one source cannot delete the triple from the other source. One solution is to use quads with the fourth element as a named graph allowing us to track the source of the triple and act upon subsets of the predicates under a subject.

Natural Language Interface—The first challenge is the tension between the desire to keep the grammar lean and the need for broad coverage. Our current grammar is highly lexicalized, i.e., all entities (lawyers, drugs, persons, etc.) are maintained as entries to the grammar. As the size of grammar expands, the complexity of troubleshooting issues that arise increases as well. For example, a grammar with 1.2 million entries takes about 12 minutes to load on our server, meaning that troubleshooting even minor issues on the full grammar can take several hours. As a solution, we are currently exploring options to delexicalize portions of the grammar, namely collapsing entities of the same type, thus dramatically reducing the size of the grammar.

The second issue is increasing the coverage of the grammar without the benefit of in-domain query logs both in terms of paraphrases (synonymous words and phrases that map back to the same entity type and semantics) and syntactic coverage for various constructions that can be used to pose the same question. Crowdsourced question paraphrases may be used to expand the coverage of both the lexical and syntactic variants. For example, although we cover questions like which companies are developing cancer drugs, users also supplied paraphrases like which companies are working on cancer medications thus allowing us to add entries such as working on as a synonym for develop and medication as a synonym for drug.

Figure 25:
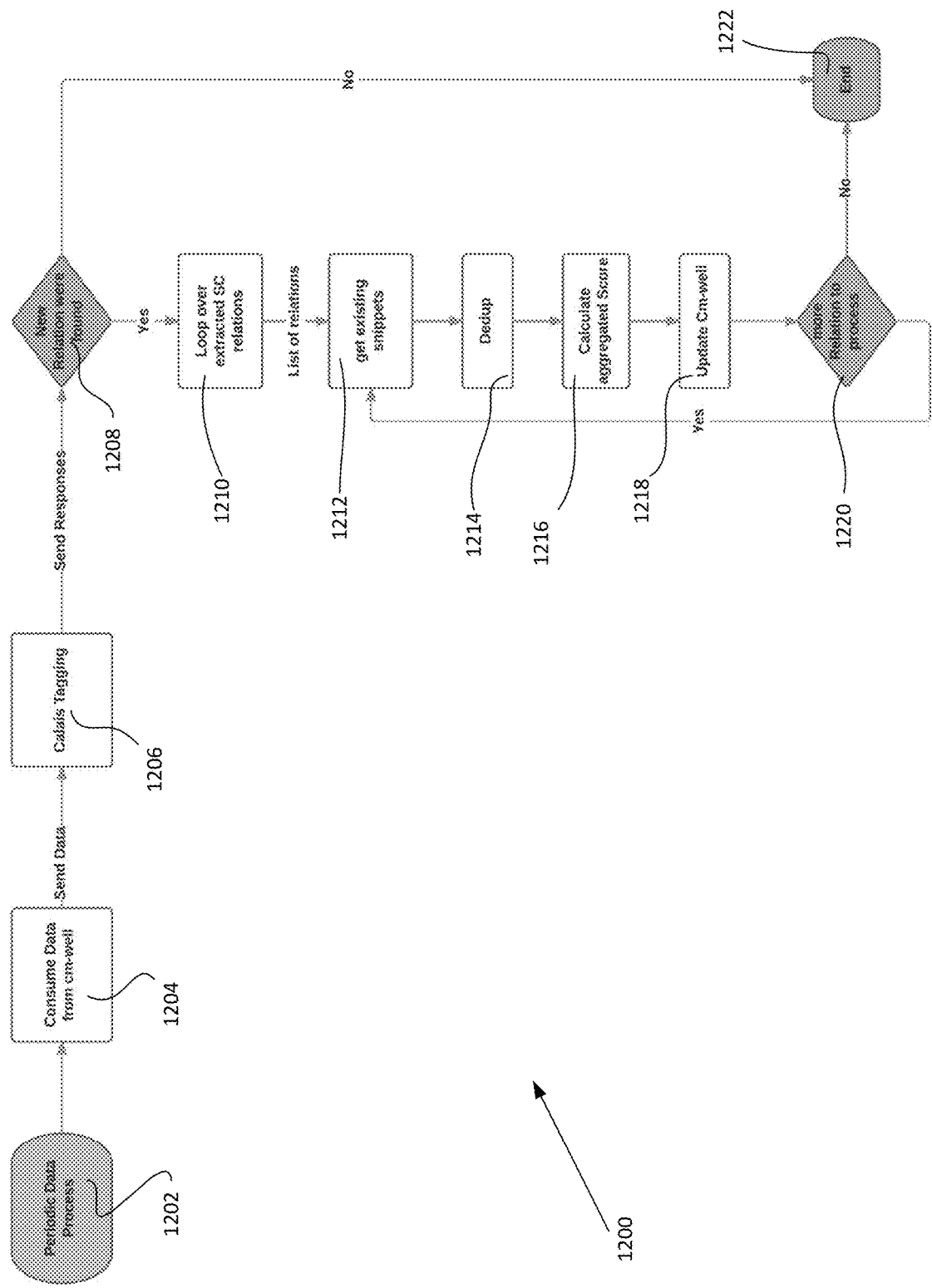
FIG. 25 is a flowchart illustrating a supply chain communication process according to the present invention.

FIG. 25 is a flowchart illustrating a supply chain process 1200 for use in obtaining, preprocessing and aggregating evidences of supply chain relationships as discussed in detail above. The process 1200 may be used for extracting and updating existing supply chain relationships and incorporating the new data with existing Knowledge Graphs, e.g., both a supplier Knowledge Graph related to a supplier-Company A and a customer Knowledge Graph related to a customer-Company B. The periodic data process 1202 starts and first consumes/acquires data from the cm-well at step 1204. This may represent generally the initial process of creating a text corpus ab initio or in updating and maintaining an existing corpus associated with a Knowledge Graph delivery service or platform. This data from 1204 is sent out and in step 1206 the data is pre-processed, e.g., named entity recognition by OneCalais tagging. The OneCalais tagging 1206 sends responses and a determination 1208 identifies whether or not new relations, e.g., supplier-customer relationship, were found in the periodic data process 1202. If new relations are not found the process proceeds to end step 1222. If new relations were found the process proceeds to loop over extracted supply chain relations in step 1210. An identified and determined list of relations is then processed at 1212 to get existing snippets. A deduplication "dedup" process is performed at step 1214. An aggregate score is calculated, e.g., in the manner as described hereinabove, at 1216 on the output of the dedup process 1214. The cm-well (corpus) is updated in step 1218. A determination 1220 identifies if additional relations need to be processed and if so returns to step 1212, if not the process ends at step 1222.

Figure 26:
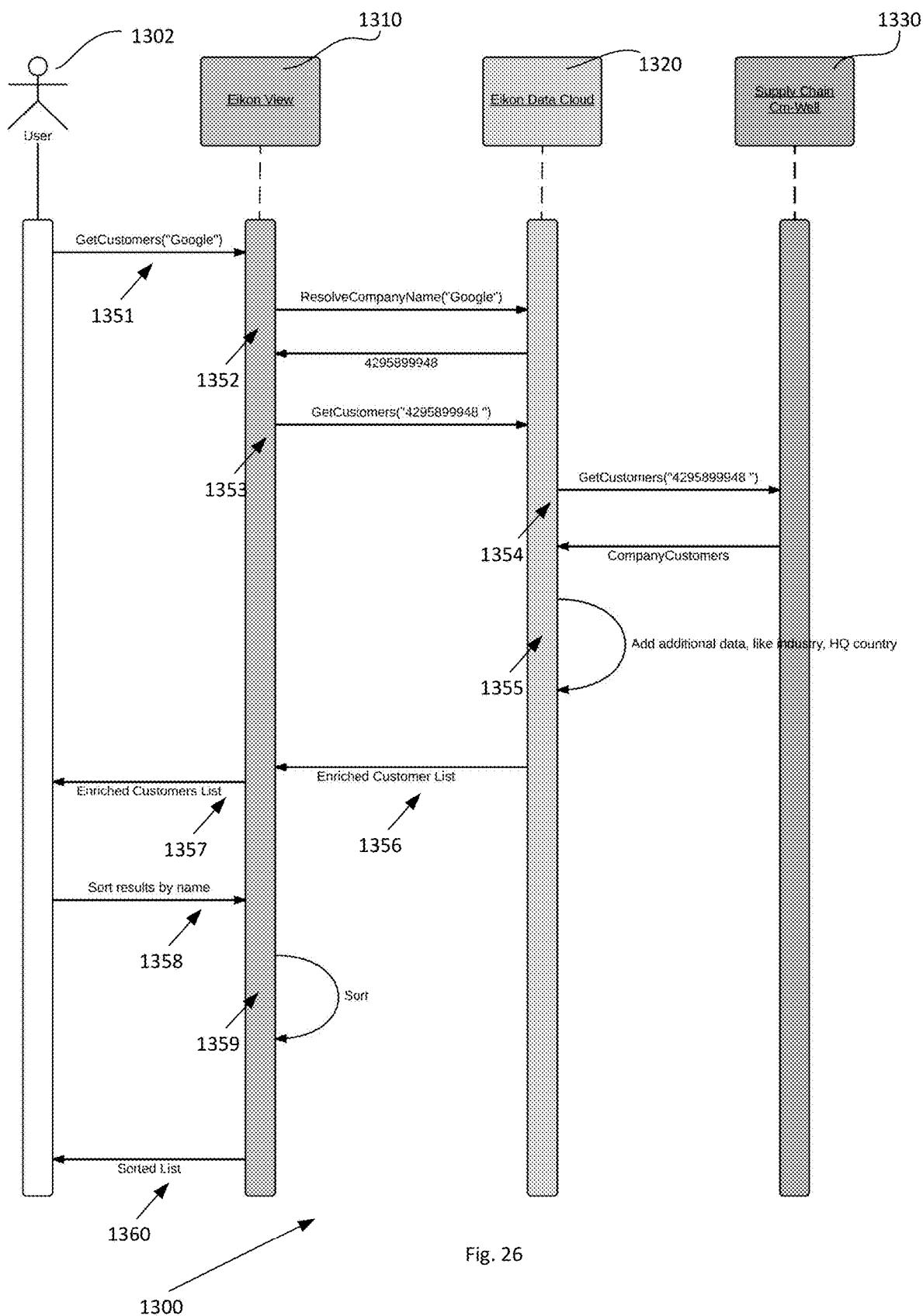
FIG. 26 is a flowchart illustrating a relationship finder process according to the present invention.

FIG. 26 is a sequence diagram illustrating an exemplary Eikon view access sequence 1300 according to one implementation of the present invention operating in connection with TR Eikon platform. A user 1302 submits a query for customers of "Google" at step 1351 to TR Eikon View 1310. Eikon View 1310 resolves the company name "Google" and sends the resolved company name "Google" at step 1352 to the Eikon Data Cloud 1320 which returns an ID of "4295899948." Eikon View 1310 requests customers for entity ID "4295899948" at step 1353. The request is passed by Eikon Data Cloud 1310 to Supply Chain Cm-Well 1330 which returns the company customers to Eikon Data Cloud 1320 at step 1354. Eikon Data Cloud 1320 identifies and adds additional data such as industry, headquarters, and country to the data returned by Supply Chain Cm-Well 1330 to enrich the data at step 1355 and returns the data as an enriched customer list with the list of customer and enriched data to Eikon View 1310 at step 1356. The Eikon View 1310 provides the enriched customer list to the user 1302 at step 1357. The user 1302 may request to sort this information by name at step 1358 and Eikon View 1310 may sort the information at step 1359 and provide the sorted information to the user 1302 as a sorted list at step 1360.

Figure 28:
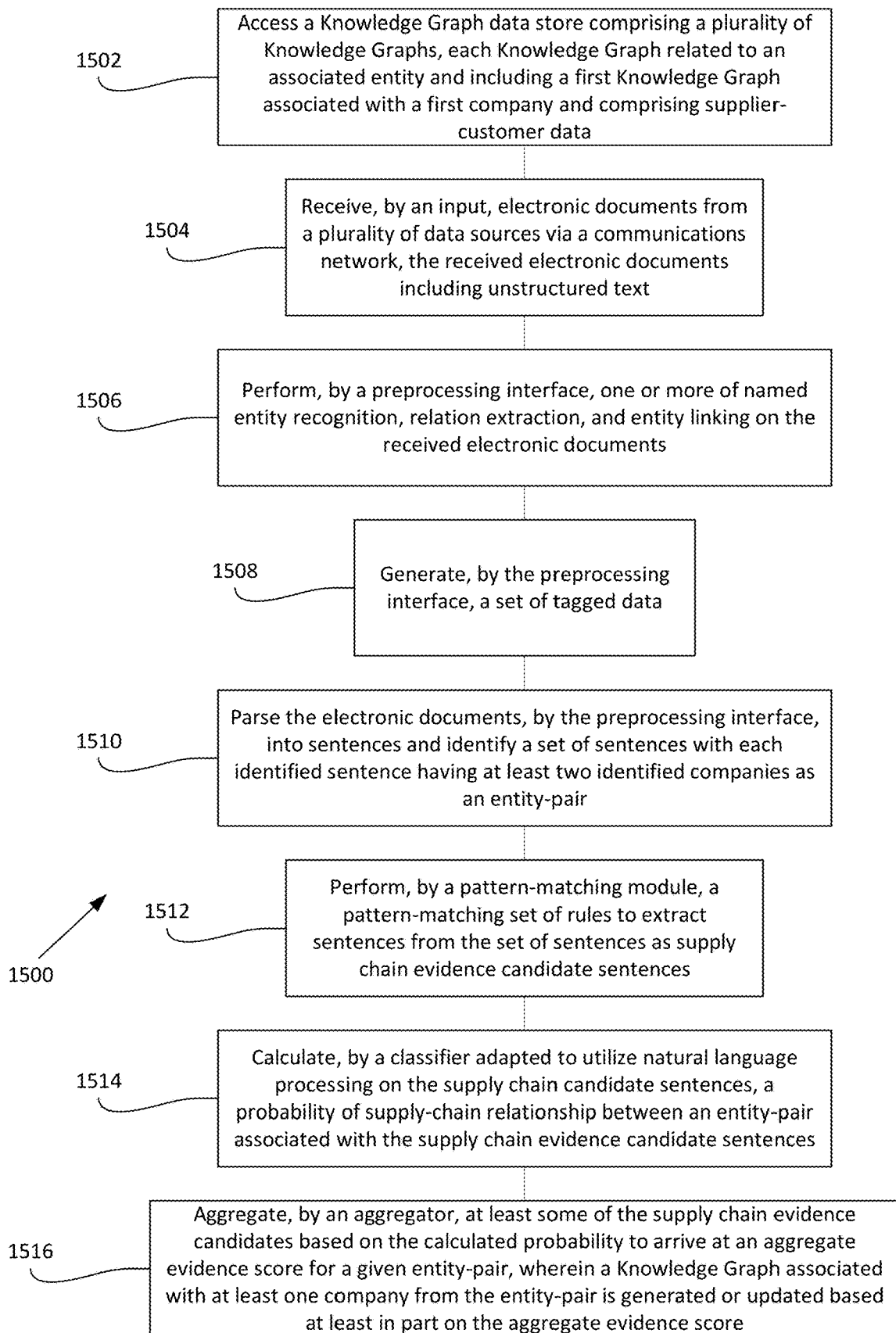
FIG. 28 is a flowchart illustrating a method for identifying supply chain relationships according to the present invention.

FIG. 28 is a flowchart of a method 1500 for identifying supply chain relationships. The first step 1502 provides for accessing a Knowledge Graph data store comprising a plurality of Knowledge Graphs, each Knowledge Graph related to an associated entity and including a first Knowledge Graph associated with a first company and comprising supplier-customer data. In the second step 1504 electronic documents are received by an input from a plurality of data sources via a communications network, the received documents comprise unstructured text. The third step 1506 performs, by a preprocessing interface, one or more of named entity recognition, relation extraction, and entity linking on the received electronic documents. In the fourth step 1508 the preprocessing interface generates a set of tagged data. The fifth step 1510 provides for the parsing of the electronic documents by the preprocessing interface into sentences and identification of a set of sentences with each identified sentence having at least two identified companies as an entity-pair. In step 1512 a pattern-matching module performs a pattern-matching set of rules to extract sentences from the set of sentences as supply chain evidence candidate sentences. Next in step 1514, a classifier adapted to utilize natural language processing on the supply chain candidate sentences calculates a probability of a supply-chain relationship between an entity-pair associated with the supply chain evidence candidate sentences. Finally, in step 1516 an aggregator aggregates at least some of the supply chain evidence candidates based on the calculated probability to arrive at an aggregate evidence score for a given entity-pair, wherein a Knowledge Graph associated with at least one company from the entity-pair is updated based on the aggregate evidence score.

Intelligent Tagging

Intelligent Tagging adds structure to volumes of data so that intelligence can be more easily drawn from it by processing millions of text documents daily for financial professionals. Intelligent Tagging provides the fastest, easiest, and most accurate way to tag the people, places, facts, and events in content to increase its value, accessibility, and interoperability. Each entity extracted receives a relevance score that accurately indicates how important that entity is to the document. All of this makes content more accessible and valuable via the automatic generation of rich metadata. Intelligent Tagging uses Natural Language Processing, text analytics, and data-mining technologies to derive meaning from unstructured information—including research reports, news articles, blog posts, and more. Additionally, it appends a Thomson Reuters PermID® (Permanent Identifier) to text for easier access to the most relevant information.

An advantage of assigning unique identifiers, or PermIDs, which go beyond keywords, is the identification of connections that would otherwise be missed.

PermID Model of Identity

As data is exchanged and shared in an increasingly widespread fashion, the need grows for a means by which all parties involved can communicate identity. Identity is information intended to uniquely pick out an individual, salient thing in the real world. This information is captured as a set of defining characteristics; properties of the object most commonly used to differentiate it, but which do not require highly committed forms of agreement in advance of their use. In human and machine communication, signifying the object of description or reference involves sharing an identifier that acts as a proxy for those defining characteristics. Objects are "dubbed" with names, knowing that when the name is used, the characteristics by which the object is known can be pictured. Machines give objects unique identifiers in order that the data recorded about the object may be retrieved, compared or updated.

Machine use of identifiers in communication has historically required all participating devices to agree on the selection, nature, and form of the characteristics used to uniquely distinguish the members of a given object type. For example, machines exchanging data on people need to have agreed upon the common characteristics of people that identify individuals as unique in the population concerned. (In this way of working, identity might be said to be 'tightly coupled' between the participants.)

Figure 30:
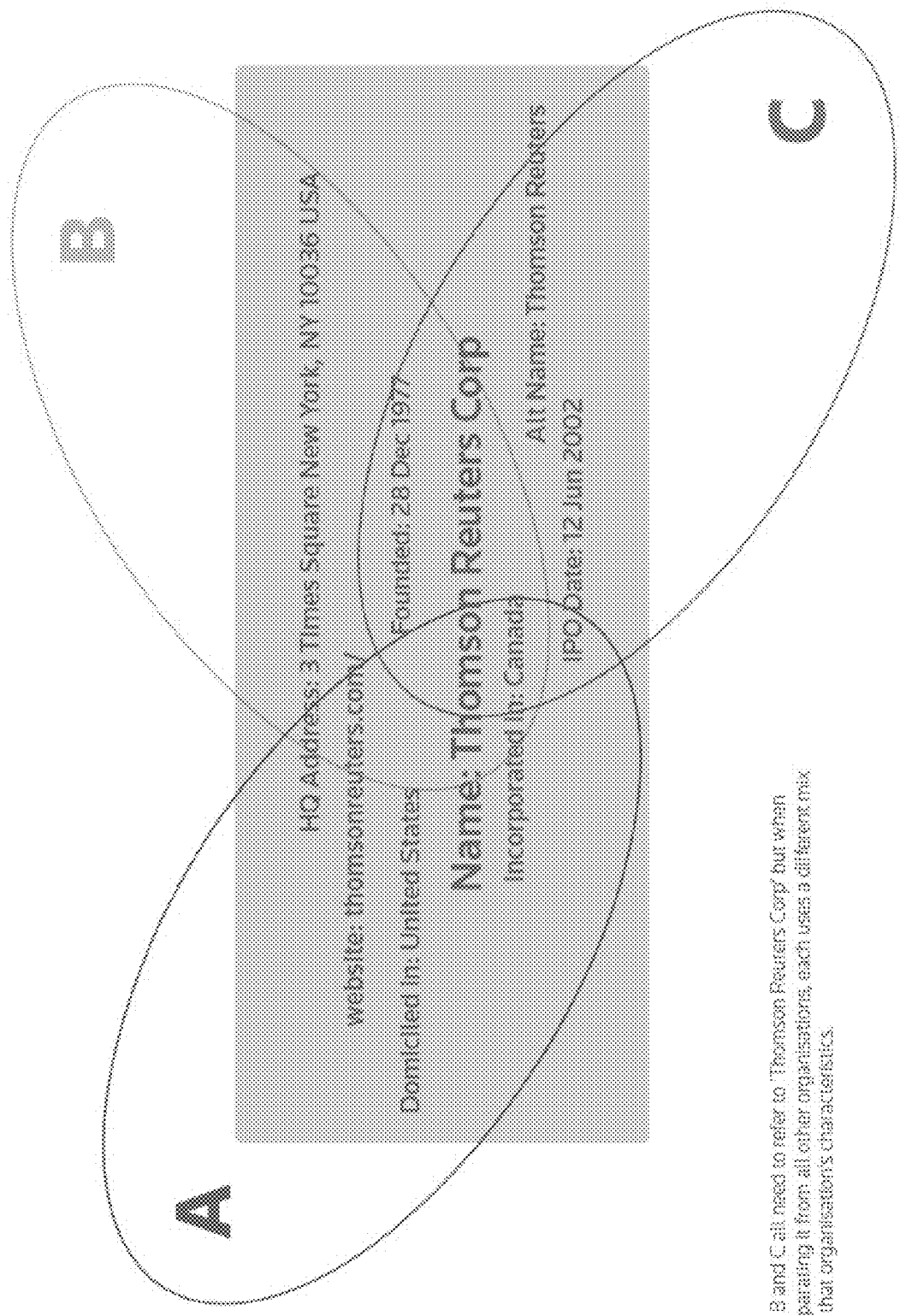
FIGS. 30 and 31 provide graphic illustrations of references and information related to a specific entity according to the present invention.

The scale of the Web makes such agreement difficult to achieve and even more difficult to maintain, as new participants become independently involved, the population of individuals described increases, and the outlier set—members of the population who cannot be separated by the chosen characteristics—grows. The solution to this problem is to adopt "loose coupling" of identity as shown in FIG. 30. People do this all the time in conversation. When discussing a specific person, company, or any other object by name, there is no expectation of a previously agreed-upon set of characteristics that corresponds to the name.

Instead people draw on their own experience. Provided that each person converts the identifier (name) used in communication to a set of characteristics that is unique to each of us and overlaps enough between us, there is a high probability that the same person is being discussed. This "loosely coupled" scheme of identity can be improved if the participants refer to a common lookup and synchronization point. By pooling together a wider selection of characteristics by which individuals might uniquely identify the members of a set, and by giving each member of the set an opaque identifier, participants can exchange the identifier and each use their preferred subset of characteristics to convert the identifier back into what it means to them. The maintenance by a shared authority of a managed set of characteristics for each object significantly raises the accuracy and precision of the method.

Figure 31:
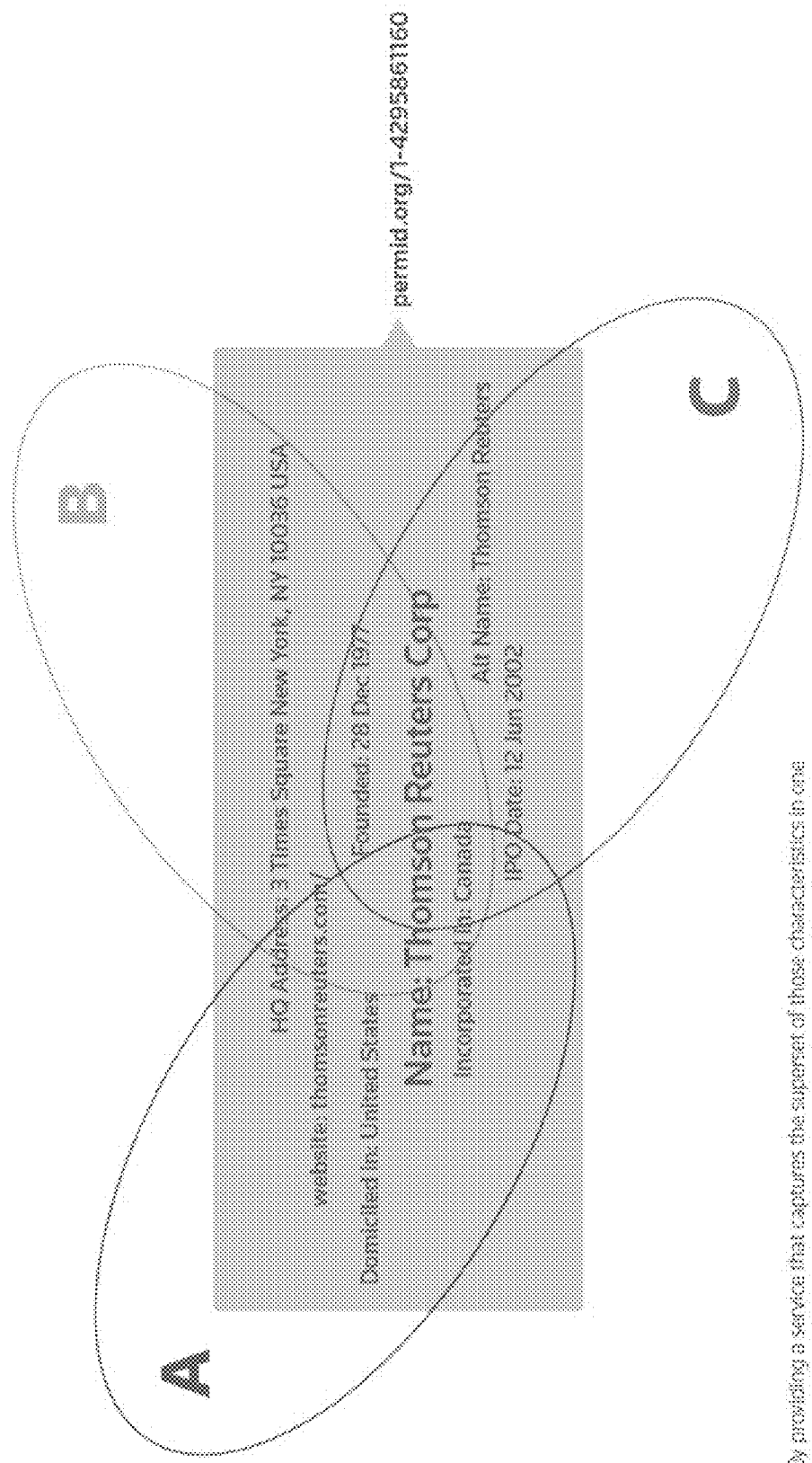

Furthermore, comparing the identifier for equality is the same as comparing the understanding of identity; if both participants have the same identity for an object it can be known that both are referring to the same object as shown in FIG. 31. The operation of such a model might be as shown as follows. 1. An authority collects information about objects that are interesting to the community and how they are known and differentiated across the community. It does this using specialized understanding of the community and of the objects in question. 2. This information is used by the authority to build a registry of known objects. 3. Each object's registry entry is assigned an immutable Open PermID. 4. Users may perform two-way resolution of the information and the Open PermID according to whatever subset of the registry entry they are familiar with. 5. Consequently the Open PermID acts as a "lingua franca" for identity: it can be ascertained from and converted to whatever subset of the registry data any of the users are familiar with. It can be used as an anchor for communicated information or as a consistent identity for workflow integration. 6. By contributing to the range of data inputs used by the authority, individual participants may improve the precision and range of information held in the registry.

For example: 1. The authority sources data from major and minor providers concerning commercial organizations. 2. The authority disambiguates and matches/organizes that data into a registry of unique organizations, each comprising multiple characteristics taken from across the sources. 3. Each organization so represented in the registry is assigned an Open PermID. 4. User A searches the registry for an organization that has the characteristics: a. Name: Thomson Reuters Corp.; b. Address: 3 Times Square, New York, N.Y., 10036, United States. The Registry returns three 'hits'. All the characteristics for each entry are returned. From the additional data, User A selects the second hit as the right one. From this, he gets the permid.org/1-4295861160. 5. User A communicates some specific information concerning permid.org/1-4295861160 to User B. 6. User B dereferences permid.org/1-4295861160 using the registry and sees all of the characteristics for that entry. 7. From that, User B can see that she knows the object as the organization: a. Alternate Name: Thomson Reuters; b. Incorporated in: Canada.

Figure 32:
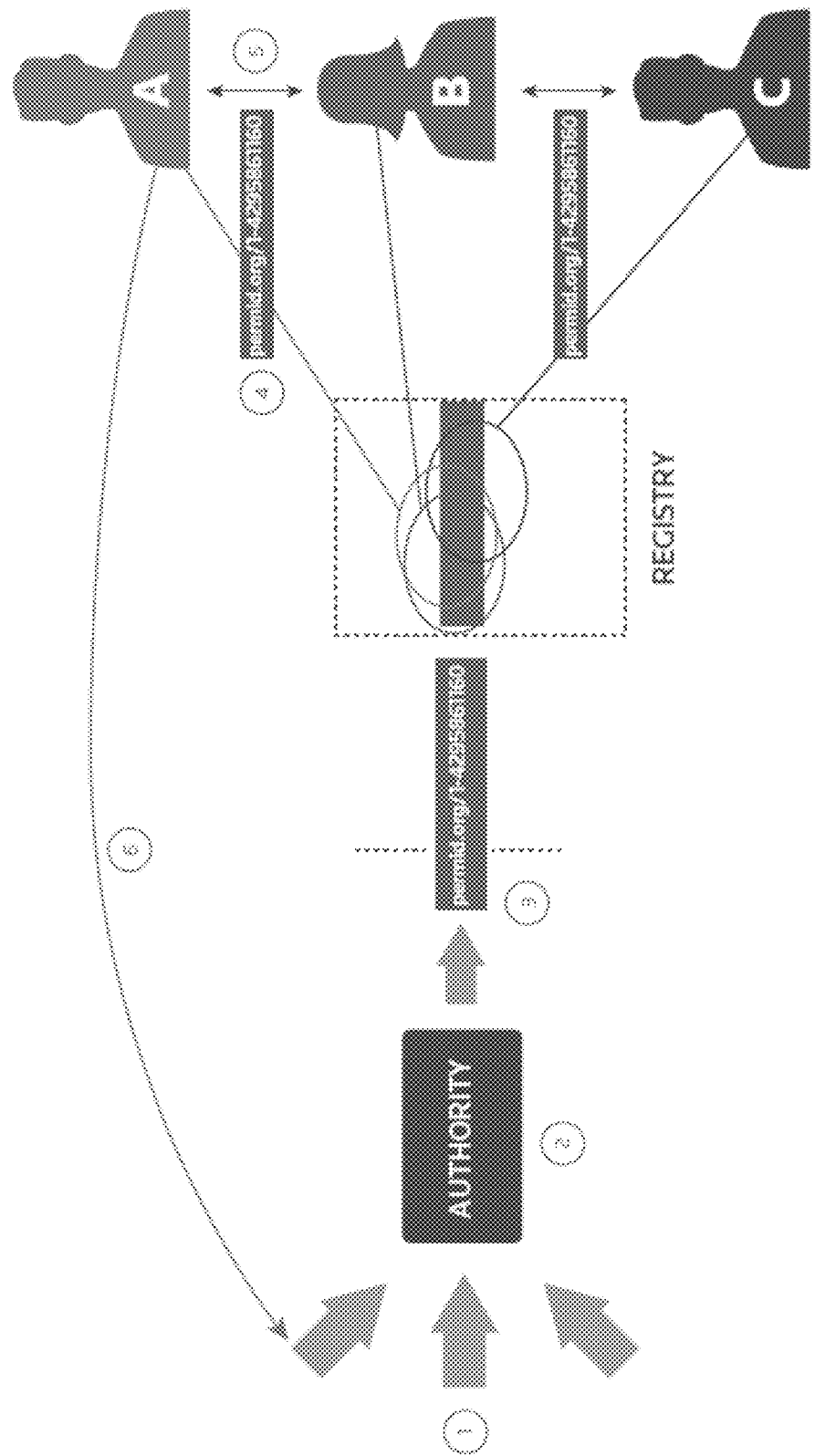
FIG. 32 provides a diagram of an operational model for a permanent identifier according to the present invention.

This system and method, as shown in FIG. 32, has the advantages, in that: a) no fixed scheme of identity has to be agreed by all participants in advance, yet the set of defining characteristics is understood by all; b) the facility decouples individual community participants—each acts independently; c) each participant has a lower cost, yet more precise, means of communicating identity (over meshed conversion, e.g., using mapping tables); and d) the same facility can be extended to many sorts of objects and can be improved by participant contribution on an optional basis.

The Open PermID

The Thomson Reuters Open PermID is an opaque identifier that corresponds to entries managed in a federated registry of objects. An Open PermID uniquely represents the defining characteristics of one specific object in the real world. Assignment of an Open PermID to a specific set of defining characteristics represents capture of the existence of that object.

The Open PermID facility is a mechanism by which groups who share a professional, commercially-based interest in the world can agree upon, pool, and share identity of the objects they need to describe and communicate. A shared facility ensures a stronger consensus and reduces overall costs. The Open PermID facility is designed to ensure that: sufficient defining characteristics are maintained to enable common but isolated agreement on an object of description or communication; all Open PermIDs can be easily and predictably converted to the defining characteristics they represent; all defining characteristics can be searched as one universal set when looking for the appropriate Open PermID with which to label an object; only one Open PermID corresponds to each identity (no duplication); any given identity is seen by all as having a common state and all changes in its state are synchronized with all interested users as quickly as possible; open PermIDs and identities share common rules and can be consistently used irrespective of the object identified or the authority responsible for maintenance; all Open PermIDs are persistent and the corresponding identities are held forever (no reuse, no deletion); authorities may be any authorized party (they do not have to be operated by Thomson Reuters). "Authorization" is by common agreement amongst the users of the Open PermID facility; and anyone using an Open PermID-enabled identity should provide feedback to the authority responsible for it, in order to improve its accuracy or provision.

These Open PermIDs are intended for machine use, not for human readability. Their purpose is to make machine communication of identity more precise and efficient and to reduce the use of computational resources. However, they may be converted to human readable form before display to people, using the systems and methods described below.

A centrally accessed system may be used for the lookup, reconciliation, dereferencing and synchronization of Open PermIDs with the federated registry. The Open PermID is created as a URI, with the following syntax:

permid.org/xxx-xxxxxxxxxx

There is a numeric element to the Open PermID, which is referred to internally as a PermID and conforms to the same rules as the Open PermID. This is what may be exposed in our existing product models.

The Information Model

The Information Model is a representation of the real-world things or concepts that can uniquely be identified. It is a framework for describing content so that it can be delivered and reused in a variety of ways. It's important to note that the Information Model is not a type of data model.

Figure 33:
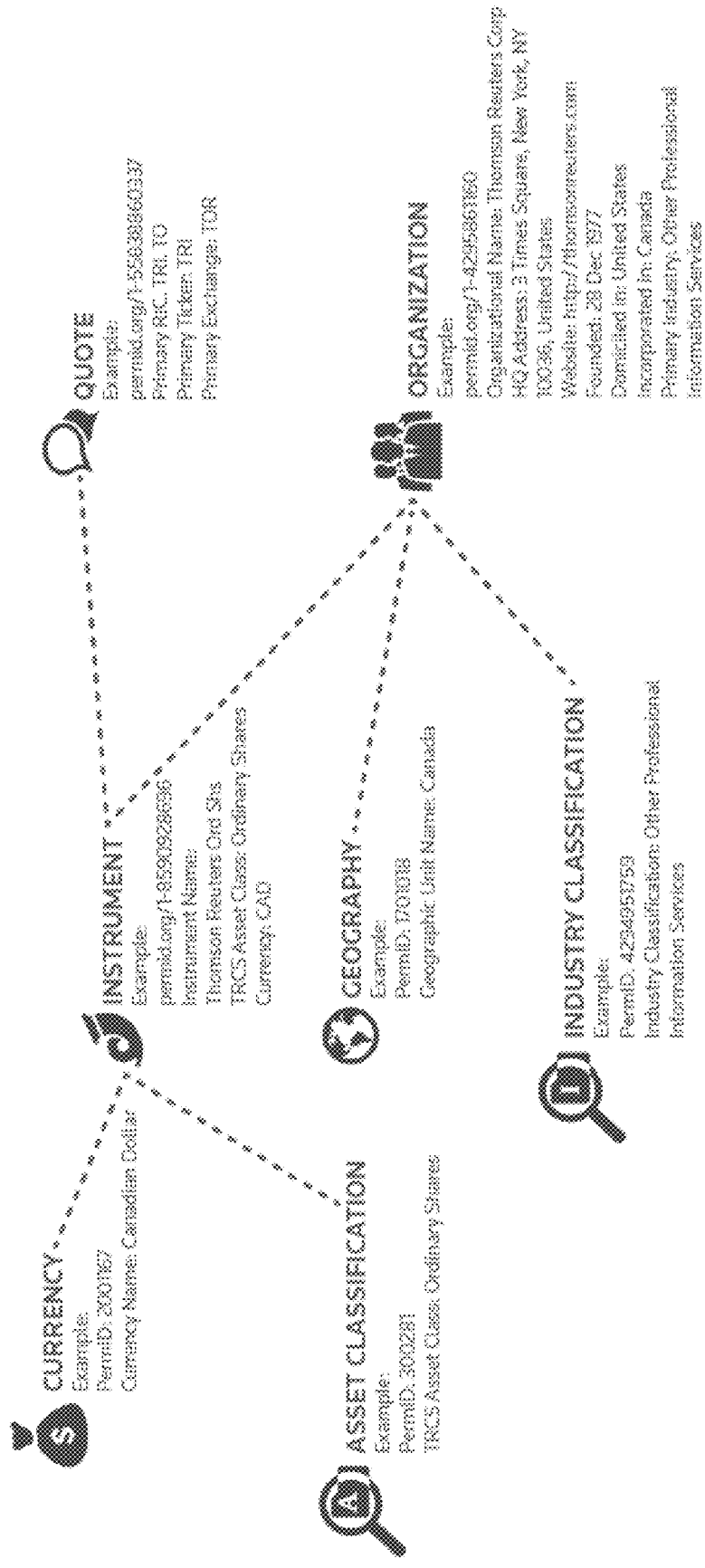
FIG. 33 provides a diagram of an informational model according to the present invention.

The diagram in FIG. 33 shows a small sample of the different types of objects that may be identified and the defining characteristics captured for each instance. Not every object identified is published as open data today, therefore the diagram highlights where an Open PermID has been published vs. where a PermID has been assigned and is currently being used internally only. The Information Model captures the distinct sets of objects for which there is an authority, whose members' defining characteristics are captured and uniquely identified. It also captures dependency between the defining characteristics of objects maintained by different authorities (e.g., instruments and organizations).

All objects managed, may be of an agreed "type": an entity is anything that needs to be uniquely referenced, in order to refer to it, reason about it, describe some aspect of it or use it to describe something else; a relationship is an association between two information objects and acts as a connection or navigation path between them. The different types of object are agreed within the community using exactly the same criteria, for example, for an entity: the object must be externally recognized by participants; the object should have at least one associated public identification scheme; and the object should have a legal status. Other object types are supported internally and may well be exposed externally in the future. There are two major elements to the operation of PermIDs: population of and reference to the federated registry.

The Federated Registry: The Authority and the Master Database

An authority is an organization or group responsible for maintaining defining characteristics about—and assigning PermIDs to—some set of objects in the real world within a registry on behalf of the entire community. Rather than one instance of authority and registry for all types of objects, the operation is federated, typically with distinct authorities managing registries for distinct types of objects. For example, the "Organization Authority" manages a registry of organizations. Each registry has a single point of physical storage and resolution from which all use of PermIDs is synchronized. This is called the master database. The authority is responsible for capturing the existence of the right set of objects described, not for curating any other information properties or characteristics that describe those objects. Properties and characteristics may be subsequently associated with the object, added by other groups and systems using the PermID as their reference point.

Population of a Registry

The goal of the authority is to ensure that the registry contains entries that reflect the state of the objects of description in the real world and the information interests of the community of PermID users.

This requires that the authority understand the community and the available sources of information and also seek continuous, explicit input from those sources and from the community as to new needs, changes in the real world, data corrections that may be required, etc. The authority "curates" a set of identities, each one affirming the existence of a corresponding object of description, either in the present time or in the past. For each identity, the authority must maintain sufficient breadth of "defining characteristics" such that anyone in the community can confidently reconcile their identification of an object with the corresponding PermID. The authority will: use a variety of information sources, open and closed, Thomson Reuters and third-party; include in the set of maintained 'defining characteristics' a range of symbols, names and other identities by which the object might also be known within the community; use their specialist knowledge to reconcile distinct objects (one reason for federating authorities based on type of object); assign each discrete new object a PermID (from a ranged set rather than algorithmically, to avoid possibility of duplicates); use understanding of the community, seeking continuous, explicit input from the community as to new needs, changes in the real world, data corrections that may be required, etc.; use a standard administrative life cycle (Appendix B) to maintain the administrative state of each object (e.g., live, obsolete, superseded, etc.) across all types of objects; detect and resolve any duplicate or erroneous objects (using the administrative life cycle: once created, objects and their PermIDs are never deleted); and ensure that changes in the state of the registry are timely as required by the community of users.

Life Cycle of an Object

Since information changes over time, the authority maintains both administrative and native life cycle states for each object. The administrative life cycle describes the relevance and currentness of an object; it captures a full history of the changes in state in the lifespan, starting with its creation. The administrative life cycle is common for all objects. The native life cycle is independent of the administrative life cycle and depicts the evolution of an object over a period of time. The native life cycle is unique to each object type.

Information Rights

Since the authority uses some licensed, third-party sources as a basis to establish and maintain some registry entries, changes in owner license may require Thomson Reuters to remove any entries based fully on their data. If this happens, an administrative life-cycle state may be used to reflect this and "logically delete" the entry—"nulling" all of the values of the defining characteristics. The registry entry and the PermID will continue to exist as a "null" reference point to avoid dangling references and to allow any such references to retrieve the status of the entry. The authority will work to re-establish the entry based on other sources. If this is possible, the authority will attempt to ensure the same PermID is used. If it cannot, it may be superseded in the standard manner.

Identity Reference Services

A small set of standard services are made available to the user community, each operating across the full universe of described objects (i.e., the aggregate set of objects published by the federation of registries): Search: Essential for finding the right PermID to use by passing in values for some subset of the "defining characteristics". One or more registry entries each with their respective PermID may be returned: by examination of the full set of defining characteristics for the entries, the user may select the appropriate PermID. Search can operate "by type" or across types, by using common attributes such as name; Reconciliation: Cross-referencing between one or more PermIDs and corresponding identifier or symbol schemes commonly used in the community. This will require exchange of some defining characteristics as well as the identifiers or symbols; Dereferencing: Lookup of the defining characteristics, status, metadata and other limited data elements including common relationships that all correspond to a specific PermID; Feedback: A means by which the community is encouraged and motivated to provide information on needs and data accuracy; Bulk Feed: A mechanism for obtaining large amounts of information, which in turn will enable caching closer to a third party. Additional services may be added in the future.

For this scheme users of identity services should: 1. Synchronize any copy of a registry entry with the Thomson Reuters master registry in a timely fashion; 2. Follow changes in the status of registry entries as communicated by the identity reference services. If an entry is superseded, references and relationships should be updated replacing the superseded entry's PermID with the superseding entry's PermID; and 3. Search for registry entries using the common service or a synchronized privately cached copy.

Search, Reconciliation and Selection from a Candidate List

The nature and role of the search and reconciliation services are important in the system. While dereferencing is completely deterministic (a PermID refers to a specific and unique object of description), search & reconciliation take a user-selected subset of "defining characteristics" and identifiers or symbols and return one or more candidate entries in the registry (along with their PermIDs). The resulting user action to select the right candidate (or to note that there was no candidate that appears correct) is what decouples the user activities from those of the registry. This compulsory activity on the part of the user might be performed by a human or more probably by some kind of machine intelligence—simple rules or AI algorithm of some kind.

Open PermID Interface

The Open PermID capability is provided on the Internet through a web-based user interface. The Open PermID capability encodes and exchanges PermIDs as URIs with the following syntax:

permid.org/xxx-xxxxxxxxxx

These URIs are intended to be completely opaque and persistent, containing no useful information in themselves. The Open PermID capability comprises two elements: 1. A Web-based user interface intended for use by developers and data maintenance staff. It provides a search interface and value-added services for bulk, file-based reconciliation and object extraction from documents; and 2. An interface allowing machine dereference of a URI-represented Open PermID into an RDF representation of the defining characteristics, state and metadata of the registry entry that corresponds to that Open PermID. Not all defining characteristics or all object types are supported through the Open PermID interface.

Support for PermIDs may be added and extended over time. PermIDs may be added to existing product models as a foreign key. Support may be limited to selected product platforms. PermIDs may be encoded and supplied as 64-bit numbers (not URIs). Support may be limited to use as a "foreign key". PermIDs may be added as an extra column or field in order that they can be externally used to correlate objects across products. PermIDs may not be supported as a retrieval key. Search UI interfaces may support lookup by PermID, and the full universe of objects of description and their corresponding PermIDs that exist in the federated registries may not be supported by existing products, which will continue to maintain their own distinct product models and coverage. Some object types may not be supported at all in some products. Coverage across product types and customer entitlement configurations will vary.

As a result the Open PermID capability may be used alongside existing products. While it is possible to convert a 64-bit PermID number to the URI syntax and vice versa, the difference between product and Open PermID coverage may mean that not all such conversions may be supported. A PermID obtained from a paid product converted to a URI format and dereferenced from the Open PermID capability may result in failed lookup [http 404]. A PermID URI obtained from the Open PermID capability converted into a 64 bit number may not be found using a specific product search interface.

Practical Use of the Open PermID Facility

Use in the Community

It is an explicit design goal that Open PermID may be used between participants in the community as a means of exchanging and communicating the identity of described objects. For this to work accurately, participants should: 1. Communicate Open PermIDs in URI format. 2. Dereference Open PermIDs to check their status and meaning when passed and when received. 3. Dereference Open PermIDs using Thomson Reuters provided services or from cached copies that are maintained so as to be faithfully synchronized with the master versions. 4. Reconcile commonly used identifiers or symbols to Open PermIDs using Thomson Reuters reconciliation service. 5. When reconciling local data with Open PermIDs, ensure that: a. The widest set of defining characteristics is used (to ensure best candidate set); b. The intelligence used to make selection from the candidate set is suitably expert. 6. Provide as much feedback as possible.

Extending the Community

In making the Open PermID facility open to all, an explicit goal is to dramatically increase the extent to which the objects whose identity is captured and the basis of that capture (the range of "defining characteristics") is based on community feedback. This is in addition to working for services and data to be provided under open license and according to the agreed best practices of the open-data community. PermID minting is the process and mechanism to enable clients and partners to participate in the creation and maintenance of identities, therefore enhancing the ever-expanding universe within the community. The community may take on the roles of the: Contributor, providing instance-level data on specific subsets of objects on a regular basis, thus enlarging the set of data from which Thomson Reuters manages the registry; and/or Authority: Managing specific instances of object (all defining characteristics, status and metadata) through a managed service provided by Thomson Reuters. In effect this equates to federating the authority that manages a set of objects. This could extend to one owner managing a whole set through Thomson Reuters provided services, such that the master system resides in Thomson Reuters while the authority resides in another organization. Being an authority means managing identity for the whole community of users and sourcing and maintaining a corresponding range of defining characteristics.

Design Goals

The Open PermID system and method originally arose from an internal need to work in a truly scalable, federated means yet have the result of our efforts—information—be usable as a set by our customers, in ways we understood well but also in ways we could not predict.

Some key goals of the system and method include: 1. Maintaining the same form and method of identity irrespective of the subject or form of the information. 2. Ensuring that the precision of identity improves as the use of the facility increases, as a result of wider input about needs, relevance and quality. 3. The ability to consistently and accurately represent relationships and references between objects and information maintained by isolated groups. 4. The immutable identity of objects—once a PermID is assigned, the PermID cannot change. If the object changes, a new PermID is created and chain of supersedence is constructed to enable users to follow how it has changed. Objects and their PermIDs cannot be deleted, only marked as obsolete. Use of PermIDs for communication of historical information is therefore supported. 5. Bi-temporality; the model supports representation of valid time and transaction time where applicable. 6. Convergent consistency. The method is designed for federated environments in which general transactionality across sources is not relevant and consistency of information converges rather than being enforced. Consistency of identity (consistent state of the 'defining characteristics' for a given instance of object with a given PermID) is guaranteed. 7. The ability to be realistic and honest about change. The real world changes, and the immutability of objects and their related PermIDs ensures that we can reflect and record that change. It is also true that people and machines make mistakes. Corrections in identity (e.g., removal of duplicates) must be reflected consistently and swiftly and communicated to all PermID users in a timely fashion. A standard administrative life cycle that applies to all object types helps ensure that this happens. 8. Standards rather than systems. Being explicit about the rules of the method ensure that any implementation can join it as an authority or as a user.

Anatomy of the Permanent Identifier

The following properties of the Open PermID system and method are intended to be consistent, reliable and durable to users of the system and method: Defining Characteristics: The characteristics of an object considered sufficient to establish a unique reference between different parties within the community; Syntax: The Open PermID is created as a URI, with the following syntax: permid.org/xxx-xxxxxxxxxx There is a numeric element to the Open PermID, which is referred to internally as a PermID and conforms to the same rules as the Open PermID. This may be exposed in our existing product models as a 64-bit number; Context & Granularity: permanent identifiers are intended to support their user community in terms of the range of defining characteristics supported and the granularity of their formation. As the community grows this may mean that objects previously regarded as one may divide to become two or more. The standard administrative life cycle will ensure that any such change is communicated to users consistently. However, granularity and scope will not shrink; Scope: permanent identifiers are not dataset specific: they are intended to be usable in any dataset maintained by the user community; Authority: permanent identifiers organize a mixture of coordinating authority function and community contribution; Discoverability: permanent identifiers are discoverable through dereferencing services; Stability: permanent identifiers are never reused and the objects they identify are never deleted from the registry; Timeliness & Synchronization: The Open PermID facility is intended to be timely in terms of real-world change or notifications of administrative change. Synchronization is in general supported through both push and pull methods, although Open services may not support push; Temporality: The Open PermID facility is intended to be able to support both post-corrected and point-in-time historical methods.

Information Objects

An information object is the perception or "surrogate" of the real-world thing or concept that it represents. All mastered information objects may be of an agreed "type": An entity is anything we need to uniquely reference, in order to refer to it, reason about it, describe some aspect of it or use it to describe something else; A relationship is the association between two information objects and acts as a connection or navigation path between them. Information object types are subject to approval. Information object types may be recorded in a single registry. Each information object type may be allocated a permanent identifier.

Information Object Master

A master is a database system that specializes in the management of a registry of the existence of an information object type and is the sole storage and maintenance point for those objects. All instances of a given information object type may be managed by only one master. The attributes recorded for a given information object can be mastered in multiple databases, but they do not all have to be recorded in the master.

Information Object Authority

Information objects are created, maintained, and owned by authorities. An authority is an organizational unit, e.g., a group of content specialists, not systems, which create and maintain information objects. The authority is responsible for creating information objects within its own domain. The authority owns the content in the master and specifies the requirements for the system. There will normally be one authority for a given type, but it can be federated and if so, all authorities for the type will collectively adhere to the principles. An authority will not create an instance of an information object type that it does not own. If a master needs to reference an information object which does not exist and is of a type of which it is not the owner, it will request the owning authority to create it. An authority will have a process to address the request for information object creation from other systems and may build the functionality into the master.

Uniqueness of an Instance

An information object will not be created or registered without a set of attribute values that can be used to uniquely differentiate its existence. Where there are multiple sources or there is a reliance on third-party content for an information-object type, there may be the ability to create a concordance and to highlight and reconcile any inconsistencies. This will prevent the creation of duplicate instances by an authority.

Permanent Identifiers

When an information object is registered, it may be allocated a unique and unchanging identifier, a permanent identifier. This is used to uniquely identify information object type instances across the entire namespace. Each information object created by a master is assigned a PermID from an allocated range which remains static throughout the life of the instance and can never be reassigned. PermID ranges may be allocated to mastering systems and not per information object type being mastered. When ownership of an information object is transferred from one authority to another, the PermID is retained if there is no significant change to the object.

Persistence

Once published, an information object will never be physically deleted and PermIDs will not be reused. If an information object needs to be deleted, the record may be retained and the administrative states used to imply the logical deleted.

Administrative Life Cycle

An administrative life cycle may be implemented for all information objects. The administrative life cycle focuses on streamlining the process for the capture and publication of the information objects within the masters. Data collection and maintenance actions may be segregated from the natural evolution of the entities. An information object can be: Created. At this point a PermID is not allocated; Registered. A PermID is allocated; Published. All the defining characteristics are confirmed, a PermID has been allocated, and the content can be sent out in a strategic data interface; Deleted. This state can only be applied if the content has not been published; Superseded. Replaced by another one; Suspended. The master ceases to provide updates for the content, e.g., the supplier has withdrawn it or the information object is perceived to be of a different "type." For example, changing "organization" to "building," but no home for the new object type exists. This state is expected to be temporary; Obsolete. A logical deletion. Masters will maintain and publish a full history of administrative life-cycle states for all information objects.

Native Life Cycle

An authority should develop and implement a native life cycle for the information object types it masters. The native life cycle of an information object is its internal life cycle based on its inherent nature. The native life cycle is independent of the administrative life cycle.

Temporal Data Support

Mastering systems support temporal dimensions for their content. Authorities determine the temporal dimensions required and which data items are managed on which dimensions, i.e., what we want to keep for business history and what we want to keep for correction history.

Entity De-Duplication

Duplicate instances of the same entity are not be created and maintained. However, if one is created in error, it may be de-duplicated. Masters may be able to remove the duplicate entity occurrences by selecting a survivor, merging data into the survivor, marking the other as superseded and recording the supersession relationship to the survivor. This means that the downstream system can always trace a superseded record to the one which replaced it.

Withdrawal of Information Objects

Masters can support the withdrawal of published objects in a non-disruptive manner. They will also be able to withdraw attributes. Legal, privacy, and/or licensing obligations require that we are able to withdraw published content while ensuring that the consumer experience is not disrupted. Legal obligations related to retaining and distributing personally identifiable data vary across geographies. To support the withdrawal of such data after publication, we will ensure it is suitably identified as such. The master will evaluate content to enable the identification and publication of any that is subject to possible withdrawal.

Relationships

Relationships describe the manner of association between two independent, meaningful information objects. Each relationship will have a subject, an object and a predicate, each referring to an independent and meaningful information object. Relationships connect information objects and form the basis of navigation between them. They may be defined unambiguously (in direction) and may be consumable by machines as well as interpretable by humans. The existence of objects at the endpoints of the relationship will not be dependent upon the existence of the relationship. Alternatively speaking, an object that the relationship connects will have its own meaning and may be interpretable on its own in the absence of any other objects, including other relationships. Therefore, a relationship instance cannot be used to determine the uniqueness of information objects. If a relationship should exist but complete information is not available, it may be published but may be marked as undetermined. In some cases there is a need to indicate the existence of a relationship to an entity where the entity is not known, but where there is semantic information that needs to be conveyed. All "Published" relationship instances will have "Published" information objects at both its ends. Some relationship types are mastered and behave as objects within the information model. Instances of objectified relationships are published with relationship permanent identifiers.

Various features of the system may be implemented in hardware, software, or a combination of hardware and software. For example, some features of the system may be implemented in one or more computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

What is claimed is:

1. A system for generating an improved user interface for displaying a significance of an association between one entity and a set of other entities, the system comprising:
    a processor and a memory, the memory comprising a set of services accessible using client-based applications on an other system, the set of services adapted to:
        generate, by a fingerprint extraction module, a fingerprint for the one entity and a set of fingerprints for the set of other entities, wherein the fingerprint for the one entity comprises a data structure having a quadruple that identifies a characteristic of the one entity, wherein the quadruple comprises an attribute identifier that identifies an entity characteristic, an attribute-type identifier that identifies a category for the entity characteristic, an attribute value for the attribute identifier, and an attribute weight that identifies a level of significance of the characteristic, and wherein each fingerprint in the set of fingerprints is associated with an entity in the set of other entities;
        determine the significance of the association between the one entity and each of the entities in the set of other entities based at least in part on the fingerprint and the set of fingerprints, and based at least in part on a set of association criteria, the significance of the relationship being a derived numerical value;
        generate an interactive user interface that provides access to a graphical representation of the significance of the association between the one entity and the set of other entities, the interactive user interface comprising:
            a query frame adapted to provide for user specification of the one entity;
            a matrix frame adapted to display a set of significantly associated entities from the set of other entities and corresponding fingerprints from the set fingerprints, the set of significantly associated entities being entities from the set of other entities meeting a threshold value for the significance of the association with the one entity; and
            wherein the fingerprint extraction module adds a new quadruple to the data structure based on a connected vertex in the graphical representation between the one entity and an entity in the set of other entities;
            wherein the connected vertex is defined by user-specified criteria; and
            wherein the connected vertex is identified by processing a set of edges in the graphical representation.

2. The system of claim 1, wherein the fingerprint extraction module adds a new quadruple to the data structure based on each entity in the set of other entities determined to be associated with the one entity.

3. The system of claim 1, wherein the fingerprint extraction module adds a new quadruple to the data structure based on an information source determined to be associated with the one entity.

4. The system of claim 1, wherein the fingerprint extraction module adds a new quadruple to the data structure based on an identified document that meets a set of user-specified criteria.

5. The system of claim 1, wherein the graphical representation is a directed graph distributed between a plurality of nodes in a decentralized peer network, each node in the plurality of nodes comprising a subset of documents and entities.

6. The system of claim 1, wherein the graphical representation is represented by a persisted, serialized Java object.

7. The system of claim 1, wherein the wherein the fingerprint, the set of fingerprints, and the set of significantly associated entities are stored in a data store, and wherein the data store is a lightweight directory access protocol relational database.

8. The system of claim 1, wherein the association criteria comprises a set of contingency tables associated with a set of interestingness measures.

9. The system of claim 1, wherein the graphical representation further comprises a selectable trend line associated with the one entity and the set of significantly associated entities.

10. The system of claim 1, wherein the interactive user interface further comprises:
    an overlay adapted to provide a detailed set of information for an event related to the one entity; and
    a headline frame adapted to display items of interest related to the one entity and the significantly related entities.

11. The system of claim 1, wherein the interactive user interface further comprises a plurality of adjacent navigation options for viewing entities in the set of significantly associated entities and entities in the set of other entities having a higher or lower significance of the association with the one entity.

12. The system of claim 1, wherein the interactive user interface is further adapted to display the one entity and an entity from the set of significantly associated entities side-by-side in the graphical representation.

13. A computer-implemented method for generating, by a system comprising a processor and a memory, an improved user interface for displaying a significance of an association between one entity and a set of other entities, the improved user interface accessible by a client-based application on another system, the method comprising:

generating, by a fingerprint extraction module, a fingerprint for the one entity and a set of fingerprints for the set of other entities, wherein the fingerprint for the one entity comprises a data structure having a quadruple that identifies a characteristic of the one entity, wherein the quadruple comprises an attribute identifier that identifies an entity characteristic, an attribute-type identifier that identifies a category for the entity characteristic, an attribute value for the attribute identifier, and an attribute weight that identifies a level of significance of the characteristic, and wherein each fingerprint in the set of fingerprints is associated with an entity in the set of other entities;

determining, by an association module, the significance of the association between the one entity and each of the entities in the set of other entities based at least in part on the fingerprint and the set of fingerprints, and based at least in part on a set of association criteria, the significance of the relationship being a derived numerical value;

generating, by an interface module, an interactive user interface that provides access to a graphical representation of the significance of the association between the one entity and the set of other entities, the generated interactive user interface comprising:

a query frame adapted to provide for user specification of the one entity;

a matrix frame adapted to display a set of significantly associated entities from the set of other entities and corresponding fingerprints from the set fingerprints, the set of significantly associated entities being entities from the set of other entities meeting a threshold value for the significance of the association with the one entity; and wherein the fingerprint extraction module adds a new quadruple to the data structure based on a connected vertex in the graphical representation between the one entity and an entity in the set of other entities;

wherein the connected vertex is defined by user-specified criteria; and wherein the connected vertex is identified by processing a set of edges in the graphical representation.

14. The method of claim 13, wherein the graphical representation is a directed graph distributed between a plurality of nodes in a decentralized peer network, each node in the plurality of nodes comprising a subset of documents and entities.

15. The method of claim 13, wherein the graphical representation is represented by a persisted, serialized Java object.

16. The method of claim 13, wherein the graphical representation further comprises a selectable trend line associated with the one entity and the set of significantly associated entities.

17. The method of claim 13, wherein the interactive user interface further comprises:

an overlay adapted to provide a detailed set of information for an event related to the one entity; and a headline frame adapted to display items of interest related to the one entity and the significantly related entities.

18. The method of claim 13, wherein the interactive user interface further comprises a plurality of adjacent navigation options for viewing entities in the set of significantly associated entities and entities in the set of other entities having a higher or lower significance of the association with the one entity.

19. The method of claim 13, wherein the interactive user interface is further adapted to display the one entity and an entity from the set of significantly associated entities side-by-side in the graphical representation.

* * * * *